(12) United States Patent
Desai et al.

(10) Patent No.: US 12,517,700 B1
(45) Date of Patent: Jan. 6, 2026

(54) SYSTOLIC ARRAY WITH OUTPUT ROUNDING FOR MULTIPLE SOURCE/DESTINATION DATA TYPE PAIRS

(71) Applicant: Amazon Technologies, Inc., Seattle, WA (US)

(72) Inventors: Nishith Desai, Seattle, WA (US); Thomas A. Volpe, Seattle, WA (US); Thomas Elmer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 863 days.

(21) Appl. No.: 17/657,300

(22) Filed: Mar. 30, 2022

(51) Int. Cl.
  *G06F 7/499*  (2006.01)
  *G06F 7/58*  (2006.01)
  *G06F 15/80*  (2006.01)

(52) U.S. Cl.
  CPC .......... *G06F 7/49947* (2013.01); *G06F 7/584* (2013.01); *G06F 15/8046* (2013.01)

(58) Field of Classification Search
  CPC ........ G06F 7/49947; G06F 7/483; G06F 7/58; G06F 7/582; G06F 7/584; G06F 2207/581; G06F 2207/582; G06F 15/8046; G06N 3/06; G06N 3/063
  See application file for complete search history.

(56) References Cited

U.S. PATENT DOCUMENTS

| | | | |
|---|---|---|---|
| 4,937,774 A | 6/1990 | Malinowski | |
| 5,138,695 A | 8/1992 | Means et al. | |
| 5,151,953 A | 9/1992 | Landeta | |
| 5,168,499 A | 12/1992 | Peterson et al. | |
| 5,659,781 A | 8/1997 | Larson | |
| 5,692,147 A | 11/1997 | Larsen et al. | |
| 5,764,556 A | 6/1998 | Stiles | |
| 5,844,925 A * | 12/1998 | Dent | H04L 9/0668 714/819 |

(Continued)

FOREIGN PATENT DOCUMENTS

| | | |
|---|---|---|
| CN | 107168678 A | 9/2017 |
| CN | 108804077 A | 11/2018 |

(Continued)

OTHER PUBLICATIONS

Hu et al., "Systolic Arrays," 2019, Spring Inti. Publishing, pp. 939-977. (Year: 2019).

(Continued)

*Primary Examiner* — Andrew Caldwell
*Assistant Examiner* — Phat N Le
(74) *Attorney, Agent, or Firm* — Knobbe, Martens, Olson & Bear, LLP

(57) ABSTRACT

Systems and methods are provided to round the numbers produced by a systolic array. A rounder can obtain a number from the systolic array and identify a data type conversion associated with the number. The data type conversion may indicate a first bit-length and a second bit-length of the number. The rounder can select a random number generator for rounding the number based on the data type conversion. The bit-length of the random number generator may be equal to a difference in bit-length between the first bit-length and the second bit-length. The rounder can perform a rounding operation using a random number generated by the random number generator.

20 Claims, 30 Drawing Sheets

(56) References Cited

U.S. PATENT DOCUMENTS

| | | |
|---|---|---|
| 6,205,462 B1 | 3/2001 | Wyland et al. |
| 6,463,453 B1 | 10/2002 | Dang |
| 6,480,872 B1 | 11/2002 | Choquette |
| 6,801,924 B1 | 10/2004 | Green et al. |
| 7,724,261 B2 | 5/2010 | Thekkath et al. |
| 7,814,137 B1 | 10/2010 | Mauer |
| 8,184,696 B1 | 5/2012 | Chirila-Rus et al. |
| 8,549,055 B2 | 10/2013 | Streicher et al. |
| 8,610,729 B2 | 12/2013 | Airey et al. |
| 8,924,455 B1 | 12/2014 | Barman et al. |
| 9,552,189 B1 | 1/2017 | Langhammer et al. |
| 9,805,304 B2 | 10/2017 | Ross |
| 10,769,238 B2 | 9/2020 | Chen et al. |
| 10,790,830 B1 | 9/2020 | Pugh et al. |
| 10,817,260 B1 | 10/2020 | Huang et al. |
| 10,872,295 B1 | 12/2020 | Liu et al. |
| 10,879,904 B1 | 12/2020 | Gunter et al. |
| 10,915,297 B1 | 2/2021 | Halutz et al. |
| 11,088,694 B1 | 8/2021 | Gunter et al. |
| 11,113,233 B1 | 9/2021 | Volpe |
| 11,232,062 B1 | 1/2022 | Volpe et al. |
| 11,308,026 B1 | 4/2022 | Volpe et al. |
| 11,308,027 B1 | 4/2022 | Volpe et al. |
| 11,422,773 B1 | 8/2022 | Volpe et al. |
| 11,467,806 B2 | 10/2022 | Elmer |
| 11,762,803 B2 | 9/2023 | Volpe et al. |
| 11,816,446 B2 | 11/2023 | Elmer et al. |
| 11,842,169 B1 | 12/2023 | Elmer |
| 11,880,682 B2 | 1/2024 | Meyer et al. |
| 12,067,375 B2 | 8/2024 | Elmer |
| 12,182,064 B2 | 12/2024 | Volpe et al. |
| 2003/0081489 A1 | 5/2003 | Scheuerlein et al. |
| 2004/0044896 A1* | 3/2004 | Kelley .................. G06F 21/46 726/6 |
| 2004/0139274 A1 | 7/2004 | Hui |
| 2006/0149803 A1 | 7/2006 | Siu et al. |
| 2007/0028076 A1 | 2/2007 | Wezelenburg |
| 2007/0185953 A1 | 8/2007 | Prokopenko et al. |
| 2009/0083519 A1 | 3/2009 | Yang et al. |
| 2009/0113169 A1 | 4/2009 | Yang et al. |
| 2009/0248769 A1 | 10/2009 | Chua |
| 2010/0281235 A1 | 11/2010 | Vorbach et al. |
| 2011/0025900 A1 | 2/2011 | Kondo |
| 2011/0058569 A1 | 3/2011 | Harrand |
| 2011/0225116 A1 | 9/2011 | Gupta et al. |
| 2016/0004506 A1 | 1/2016 | Elmer |
| 2016/0210121 A1* | 7/2016 | Gammel ................ G06F 7/584 |
| 2016/0342890 A1 | 11/2016 | Young |
| 2016/0342892 A1 | 11/2016 | Ross |
| 2016/0358069 A1 | 12/2016 | Brothers et al. |
| 2017/0010863 A1 | 1/2017 | Nystad |
| 2017/0097824 A1 | 4/2017 | Elmer et al. |
| 2017/0103311 A1 | 4/2017 | Henry et al. |
| 2017/0115958 A1 | 4/2017 | Langhammer |
| 2017/0235515 A1 | 8/2017 | Lea et al. |
| 2018/0036165 A1 | 2/2018 | Fallon |
| 2018/0052660 A1 | 2/2018 | Lutz |
| 2018/0121168 A1 | 5/2018 | Langhammer |
| 2018/0164866 A1 | 6/2018 | Turakhia et al. |
| 2018/0218518 A1 | 8/2018 | Yan et al. |
| 2018/0225116 A1 | 8/2018 | Henry et al. |
| 2018/0314671 A1 | 11/2018 | Zhang et al. |
| 2018/0315398 A1 | 11/2018 | Kaul et al. |
| 2018/0336163 A1 | 11/2018 | Phelps et al. |
| 2018/0336164 A1 | 11/2018 | Phelps et al. |
| 2018/0336165 A1 | 11/2018 | Phelps et al. |
| 2019/0004997 A1 | 1/2019 | Cohen et al. |
| 2019/0012295 A1 | 1/2019 | Yinger et al. |
| 2019/0026077 A1 | 1/2019 | Manzo |
| 2019/0041961 A1 | 2/2019 | Desai et al. |
| 2019/0079801 A1 | 3/2019 | Lyuh et al. |
| 2019/0138882 A1 | 5/2019 | Choi et al. |
| 2019/0236049 A1 | 8/2019 | Vantrease et al. |
| 2019/0294413 A1 | 9/2019 | Vantrease et al. |
| 2019/0311243 A1 | 10/2019 | Whatmough et al. |
| 2019/0377549 A1 | 12/2019 | Alben et al. |
| 2019/0385050 A1 | 12/2019 | Wang et al. |
| 2020/0026494 A1 | 1/2020 | Langhammer et al. |
| 2020/0026497 A1 | 1/2020 | Park et al. |
| 2020/0117988 A1 | 4/2020 | Arthur et al. |
| 2020/0150958 A1 | 5/2020 | Ahmed |
| 2020/0159809 A1 | 5/2020 | Catthoor et al. |
| 2020/0192701 A1 | 6/2020 | Horowitz et al. |
| 2020/0201576 A1 | 6/2020 | Yudanov et al. |
| 2020/0226473 A1 | 7/2020 | Sharma et al. |
| 2020/0285605 A1 | 9/2020 | Nam |
| 2020/0302298 A1 | 9/2020 | Van et al. |
| 2020/0349106 A1 | 11/2020 | Ovsiannikov |
| 2020/0380370 A1* | 12/2020 | Lie .......................... G06F 17/10 |
| 2021/0019591 A1 | 1/2021 | Venkatesh et al. |
| 2021/0042087 A1 | 2/2021 | Pugh et al. |
| 2021/0064985 A1 | 3/2021 | Sun et al. |
| 2021/0072955 A1 | 3/2021 | Mellempudi et al. |
| 2021/0089316 A1 | 3/2021 | Rash et al. |
| 2021/0091794 A1 | 3/2021 | Snelgrove et al. |
| 2021/0103429 A1 | 4/2021 | Nair et al. |
| 2021/0150770 A1 | 5/2021 | Appu et al. |
| 2021/0157548 A1 | 5/2021 | Elmer |
| 2021/0157549 A1 | 5/2021 | Elmer et al. |
| 2021/0390367 A1 | 12/2021 | Liu et al. |
| 2022/0019431 A1 | 1/2022 | Kaul et al. |
| 2022/0334798 A1 | 10/2022 | Lin et al. |
| 2022/0350567 A1 | 11/2022 | Pan et al. |
| 2022/0350775 A1 | 11/2022 | Volpe |
| 2023/0004384 A1 | 1/2023 | Meyer et al. |
| 2023/0004523 A1 | 1/2023 | Meyer et al. |
| 2023/0010054 A1 | 1/2023 | Elmer |
| 2023/0236799 A1* | 7/2023 | Waters .................... G06F 17/15 708/252 |
| 2023/0385233 A1 | 11/2023 | Volpe et al. |
| 2024/0361986 A1 | 10/2024 | Elmer |

FOREIGN PATENT DOCUMENTS

| | | |
|---|---|---|
| CN | 114868108 A | 8/2022 |
| CN | 115039067 A | 9/2022 |
| CN | 115935875 A * | 4/2023 |
| EP | 3396524 A1 | 10/2018 |
| EP | 4066101 A1 | 10/2022 |
| EP | 4066100 A1 | 3/2024 |
| KR | 20090030498 A | 3/2009 |
| WO | 1994/10638 A1 | 5/1994 |
| WO | 2021/108644 A1 | 6/2021 |
| WO | 2021/108660 A1 | 6/2021 |
| WO | 2023/278475 A1 | 1/2023 |

OTHER PUBLICATIONS

Office Action received for Chinese Application No. 202080086382, mailed on May 21, 2025, 18 pages (9 pages of original office action and 9 pages of English Translation).

Office Action received for Chinese Application No. 202280052183, mailed on Jul. 18, 2024, 13 pages (7 pages of original office action and 6 pages of English Translation).

Office Action received for Chinese Application No. 202280052183, mailed on May 13, 2025, 12 pages (5 pages of original office action and 7 pages of English Translation).

Office Action received for Chinese Application No. 202080086461, mailed on May 29, 2025, 18 pages (9 pages of original office action and 9 pages of English Translation).

Arnould, et al., A Systolic Array Computer., 1985, IEEE., pp. 232-235. (Year: 1985).

Bao, et al., A Reconfigurable Macro-Pipelined Systolic Accelerator Architecture, 2011, IEEE., 6 pages. (Year: 2011).

Dick, Computing the Discrete Fourier Transform on FPGA Based Systolic Arrays, 1996, Proc of the 4th Intl. ACM Symposium on Field Programmable Gate Arrays, 7 pages. (Year: 1996).

Garland, et al. "Low Complexity Multiple Accumulate Units for Convolutional Neural Networks with Weight Sharing," ACM, 24 pages (2018).

(56) References Cited

OTHER PUBLICATIONS

Grout, "Chapter 5—Introduction to Digital Logic Design," Digital Systems Design with FPGAS and CPLDS, Ed. Burlington: Newnes, 2008, p. 217-331.

Henry, "Leveraging the bfloat16 Artificial Intelligence Datatype for Higher-Precision Computations," 2019 IEEE 26th Symposium on Computer Arithmetic, 2019, p. 69-76.

Hu, et al., Systolic Arrays, 2018, SpringerLink, Handbook or Signal Processing Systems, pp. 939-977. (Year: 2018).

International Search Report and Written Opinion in PCT Application No. PCT/US2022/035353, mailed Oct. 14, 2022, 26 pages.

International Search Report and Written Opinion received for PCT Patent Application No. PCT/US2020/062337, mailed on Mar. 4, 2021, 8 pages.

International Search Report and Written Opinion received for PCT Patent Application No. PCT/US2020/062356, mailed on Mar. 4, 2021, 8 pages.

Kung, "Why Systolic Architectures," IEEE pp. 37-48 (1982).

Kung, et al. "Design Algorithms for VLSI Systems," Dept. of Computer Science, Carnegie Mellon Univ, Pittsburgh (Jan. 1979).

Kung, et al. "Packing Sparse Convolutional Neural Networks for Efficient Systolic Array Implementations: Column Combining under Joint Optimization," ACM. pp. 821-834 (2019).

Kung, et al. "Systolic Arrays for VLSI," Dept. of Computer Science, Carnegie Mellon, Pittsburgh (Apr. 1978).

Liu, et al., An Energy-Efficient Systolic Pipeline Architecture for Binary Conbolutional Neural Network, 2019, IEEE, 4 pages. (Year: 2019).

Pedram, et al. A High performance, Low Power Linear Algebra Core, 2011, IEEE, pp. 35-42 (Year 2011).

Tannenbaum, Structured Computer Organization, 2nd Edition, 1984, Prentice-Hall, Inc., p. 1-5.

U.S. Appl. No. 16/915,937, Multiple Busses Within a Systolic Array Processing Element, filed Jun. 29, 2020.

Wah et al. Systolic Programming for Dynamic Programming Problems, 1999, Circuits Systems Signal Processing vol. 7, No. 2, pp. 119-149. (Year:1999).

Yang, et al., "Systolic Array Based Accelerator and Algorithm Mapping for Deep Learning Algorithms", Network and Parallel Computing, 2018, pp. 153-158.

\* cited by examiner

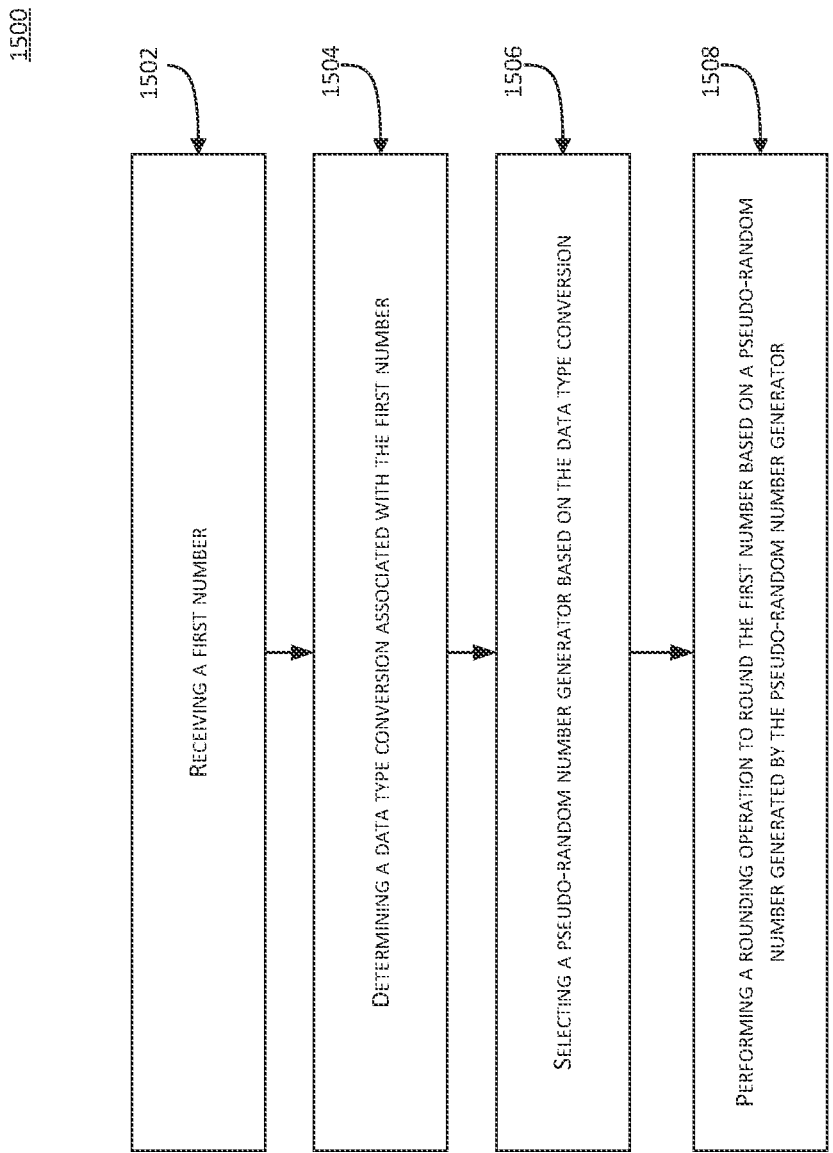

US 12,517,700 B1

SYSTOLIC ARRAY WITH OUTPUT ROUNDING FOR MULTIPLE SOURCE/DESTINATION DATA TYPE PAIRS

BACKGROUND

Artificial neural networks are computing systems with an architecture based on biological neural networks. A neural network may be implemented by circuitries and data paths, such as a systolic array. Systolic arrays can accelerate the performance of the training and inference phases of artificial neural networks. During the training phase, input data can be provided to train a model. During the inference phase, new inputs can be processed according to the model to obtain a predicted result. User applications often use the model in the inference phase, so the inference phase can often have time sensitivities, and latency during the inference phase can negatively impact the user experience.

BRIEF DESCRIPTION OF THE DRAWINGS

Various features will now be described with reference to the following drawings Throughout the drawings, reference numbers may be re-used to indicate correspondence between referenced elements. The drawings are provided to illustrate examples described herein and are not intended to limit the scope of the disclosure.

FIG. 15 shows a method executed by a reducer and a processing element for neural network computations, according to some examples of the disclosed technologies.

DETAILED DESCRIPTION

Figure 1A:
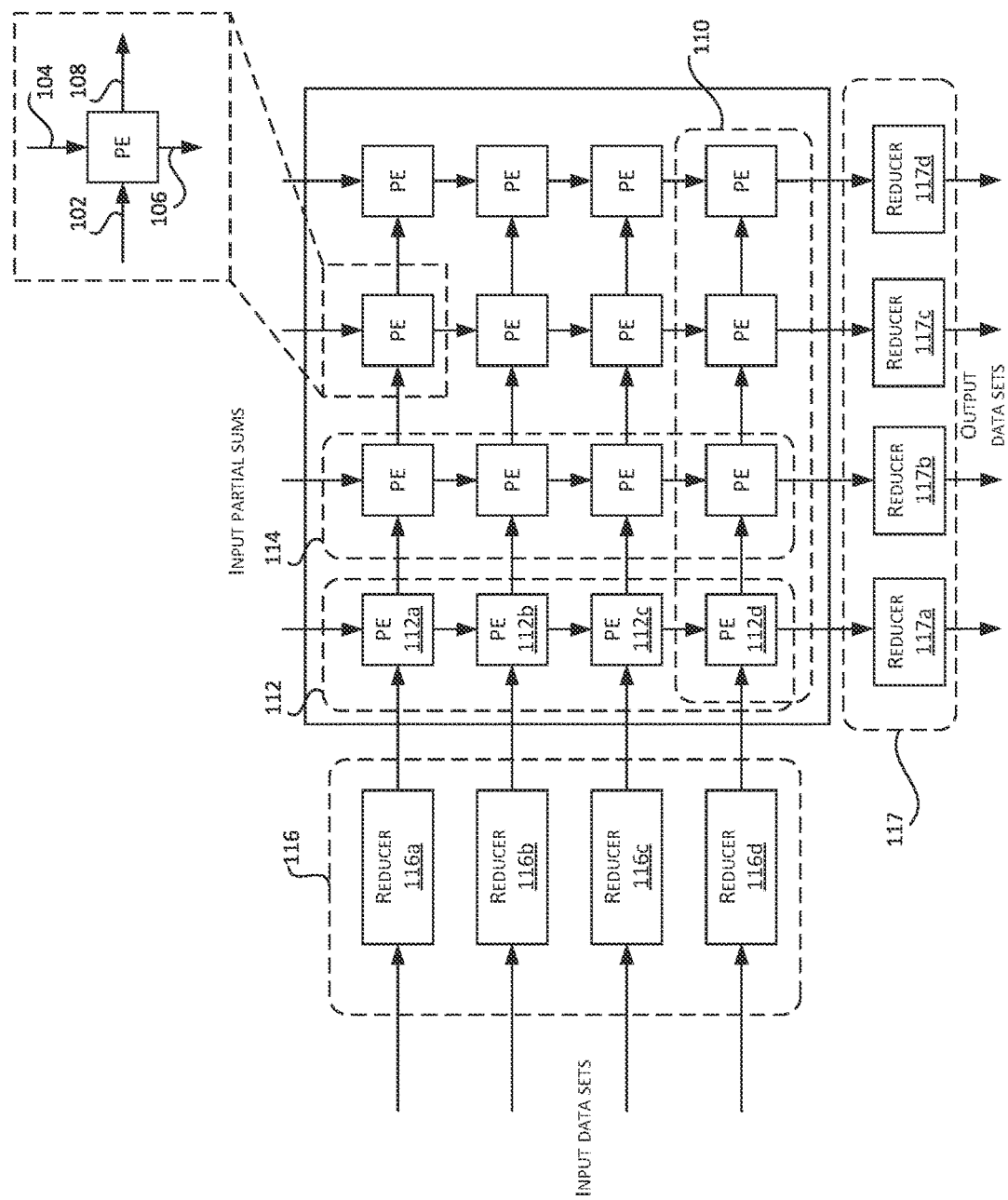
FIG. 1A illustrates an example 4×4 systolic array and an example column of reducers.

Generally described, the present disclosure relates to a systolic array supporting stochastic rounding of outputs. A systolic array may be used to carry out mathematical operations, such as matrix multiplication. Often, such multiplication occurs with respect to floating point numbers of a given bit length, such as 16-bit floating point numbers, which are represented using a sign bit, a set of exponent bits, and a set of significand (or mantissa) bits. When mathematical operations are performed on two such floating point numbers, the significand of the result may exceed the length of the significand bits. To continue storing the result in the given bit length, the significand can be rounded. However, rounding the significand results in a loss of information, which may be of value as an output. This may be particularly true in instances of large computations, such as in machine learning applications, where results of many matrix multiplication operations may be combined to obtain a result. To address this, a systolic array is disclosed herein that provides for stochastic rounding of outputs. Rather than truncating each output floating point value or conducting a round-to-nearest operation, each floating point value output by the systolic array may be rounded according to a probability determined by a distance between the unrounded value and a truncated (floor) value (or conversely, a distance between the unrounded value and a next higher value representable in the rounded bit length, sometimes referred to as a "ceiling" value). This stochastic rounding can maintain statistical information within the output, such that the expected error of all rounded values is equal to zero. This low expected error, in turn, can increase the accuracy of computations conducted on the outputs of a systolic array. Accordingly, stochastic rounding, when applied to the output of a systolic array, can increase the accuracy of computations conducted on such an array, even when lower-bit-length data formats are used. While some embodiments may be described with reference to systolic arrays, it will be understood that certain embodiments may be used in other applications of stochastic rounding an output, e.g. stochastically rounding the output of an engine—including systolic arrays and other processing engines, such as central processing units (CPUs), graphics processing units (GPUs), and other processors—that performs one or more operations on an input, without deviating from the scope of the technologies.

In some embodiments, a systolic array as disclosed herein can include a set of processing elements that perform mathematical operations, such as multiply-accumulate operations, at specific bit-length, such as 32-bits. However, the systolic array may be configured to provide outputs of lower bit lengths. To provide such an output, the systolic array can include a reducer coupled to outputs of the processing elements that performs rounding on those outputs. Generally, stochastic rounding relies on random or pseudo-random number generation. For example, one mechanism for performing stochastic rounding of a number n between x and y (e.g., a ceiling and a floor) of a given bit length is to add a random number between 0 and x-y to the number n, and truncate the result to the given bit length. For example, in decimal terms, to perform stochastic rounding to a single decimal place on the number 7.25 (e.g., to result in a value of either 7.2 or 7.3), a random number may be selected between 0 and 0.1 (7.3−7.2) and added to the number 7.25. The result is then truncated to the desired length of one decimal place. If the random number is equal to 0.05 or greater (e.g., a 50% probability, because the unrounded number is halfway between the ceiling and floor), the addition result will be greater than 7.3, and the truncated result will be 7.3. If the random number is less than 0.05 (e.g., at a 50% probability), the addition result will be less than 7.3, and the truncated result will be 7.2. Thus, the probability of rounding up or down is dependent on the distance between the value, 7.25, and the two rounding options.

To support stochastic rounding, the reducer can include one or more pseudo-random number generators that generate pseudo-random numbers. In some embodiments, the reducer can include a number generator (e.g., a non-random number generator) that generates a number in a consecutive sequence of numbers. The pseudo-random number generators are illustratively unbiased, such that each pseudo-random number generator may have an equal possibility of generating each number within a given range. One skilled in the art will appreciate that pseudo-random numbers are in some cases contrasted with truly random numbers. For brevity, it should be understood that the term "random number" (e.g., used alone or to describe a "random number generator"), unless specifically defined as referring to a truly random number, refers to a pseudo-random number.

In one embodiment, the range of each random number generator is equal to a difference in bit-length between an unrounded number and a rounded number. For example, when rounding a 23-bit significand to a 10-bit significand, a random number of 13 bits (23 minus 10) may be used. This can provide a maximum granularity of the random number for purposes of the conversion, providing an error distribution in stochastically rounded results closer to an ideal distribution. While lower bit-length random number generators may be used, such lower bit length random numbers may increase the expected error distribution. For example, a single bit length random number—in always being either 0 or 1—would always provide a 50% probability of rounding up or down. While such probability is appropriate where only a single bit of precision is lost to stochastic rounding (because the unrounded number will always be equally close to both its ceiling and floor), it may be inappropriate for rounding more than a single bit.

In one embodiment, rather than relying on truly random number generators, a reducer may rely on one or more pseudo random number generators. For example, the use of random number generators that generate truly random numbers may be problematic as the random number generators may not be repeatable and the reducer may not be deterministic. Use of one or more random number generators that generate deterministic pseudo-random numbers may therefore provide for deterministic operation of the systolic array.

One example of random number generators used by the reducer to generate deterministic pseudo-random numbers may be linear feedback shift registers (LFSRs). The linear feedback shift registers may be maximal length linear feedback shift registers. Maximal length linear feedback shift registers may cycle through all or nearly all possible output values (e.g., each possible random number) within their range of possible values, generally determined by the bit-length of the register. In some embodiments, the maximal length linear feedback shift registers may not cycle through a particular value (e.g., all zeros and/or all ones).

In some embodiments, a systolic array may operate with respect to multiple data streams. For example, the systolic array may facilitate parallel arithmetic operations with respect to two or more data streams (e.g., collections of sequential data). Accordingly, it may be beneficial to support systolic rounding of such data streams in parallel. As noted above, it may be beneficial to match the bit length of a random number used to support systolic rounding to the reduction in precision due to rounding (e.g., by having a 13-bit random number when reducing from 23 significand bits to 10). Moreover, each LFSR may produce random numbers of a given bit length, e.g., equal to the bit length of the LFSR, with each LFSR producing a non-biased, deterministic set of random numbers in a range corresponding to that bit length. However, it may be desirable for the output corresponding to each stream to include outputs of different bit lengths. Accordingly, if data items of multiple data streams are rounded using pseudo-random numbers from a common LFSR (e.g., because both data items are rounded to a common bit length) the rounding may be deterministic across the multiple data streams and not across each individual data stream alone (e.g., the error distribution for each data stream may not be at or close to 0). To provide deterministic rounding across each data stream, the reducer can maintain a state value for particular data stream. The reducer may identify that a particular number is associated with a particular data stream (based on stream identifier). For example, the reducer may receive the stream identifier from a data store, the reducer may receive the stream identifier in band with the data stream, the reducer may receive the stream identifier in a band separate from the data stream, etc. The reducer can determine a state value associated with the data stream and representing a current position for the data stream. The reducer can initialize, using the state value, a random number generator to generate random numbers for rounding data associated with the particular data stream. Therefore, the reducer is able to maintain an error distribution at or close to 0 for the entire data stream by maintaining a state value for each data stream.

As discussed above, the systolic array may produce a plurality of outputs and provide the plurality of outputs to the reducer for the generation of a plurality of rounded outputs. As the systolic array may operate in parallel, it may be important for the reducer to round multiple outputs in parallel. Accordingly, a reducer as disclosed herein may include multiple LFSRs to support multiple parallel rounding operations. One difficulty with the use of multiple LFSRs is that while each may provide a deterministic output independently, changing the level of parallelism may alter their output overall. That is, using 16 independent LFSRs may result in a different rounding result than using a single LFSR. To address this, embodiments of the present disclosure can enable distinct LFSRs to share a state register maintaining a shared state of the LFSR. For each set of random numbers calculated in parallel, each LFSR may be configured to initialize itself with the shared state, as indicated in the state register, and to cycle through n states, where n is the relative number of the LFSR within the set of LFSRs. For example, where 8 random numbers are generated in parallel, a first LFSR may calculate a first next state after that indicated in the state register, a second LFSR may calculate a second next state, etc. The final LFSR may save its state to the shared state register, enabling subsequent random number generation. In this manner, the set of LFSRs will, in combination, step through each possible state. Moreover, this pattern is deterministic even as parallelism is altered.

To provide a better understanding of the present disclosure, a brief description is provided regarding operation of an illustrative systolic array. As described herein, a systolic array includes an array of processing elements (PEs), often arranged into two dimensions (e.g., columns and rows). The PEs of the array can be interconnected to enable data to pass through the PEs, which may conduct one or more mathematical operations on the data. For example, each PE may conduct a "multiply accumulate" operation, whereby inputs are fed horizontally into PEs of each row of the array, with each PE multiplying its respective input by a stored weight value and passing the product result to a PE in a subsequent row. Each column of the systolic array may generate an output for rounding by the reducer.

One illustrative use of a systolic array is in conducting an inference phase of a machine learning application. Machine learning generally requires at least two phases: a "learning phase," where a model is trained against training data, and an "inference phase," in which the trained model is applied to production data to predict a result. Inference phase applications are often latency sensitive, in that they operate in production environments. Moreover, inference phase applications—and particularly neural network applications—often require dense algebraic calculations, such as matrix multiplications. Systolic arrays may be used to accelerate inference-phase workloads in machine learning applications.

As noted above, the PEs of a systolic array may be divided into rows and columns. Each PE in the input layer may receive an element of an input dataset, and scale the element with a weight (e.g., a filter) to indicate the element's degree of influence on the output. Each PE in the intermediate layers may receive at least one of the element and the weight (or filter) from another PE in the systolic array. Each PE in the intermediate layers may combine the elements received from a corresponding PE of the systolic array to compute a set of intermediate outputs. For example, each PE in the intermediate layers may compute a sum of element-weight products, and then produce the sum for application of an activation function to the sum (e.g., by a system separate from the PEs of the systolic array).

Generally, an input dataset (e.g., an input feature map) may be fed, one input data element at a time, into its respective row of the systolic array, and passed from one PE to another PE in a given row starting, for example, from a leftmost PE. Each row receives a specific input data element and weight which are fed into a first PE, in a row, and subsequently passed to an adjacent PE located to the right of the first PE in the same row. Further, an input partial sum may be fed, one input partial sum at a time, into its respective column of the systolic array, and passed from one PE to another PE in a given column starting from a topmost PE. Generally, an input partial sum may be fed from a first PE, in one column, to an adjacent PE located directly beneath the first PE in the same column. Further, each column corresponds to a specific input partial sum which is passed through each PE of a given column. This can be done to allow each PE of a given column to perform a mathematical operation on the input partial sum to produce an output partial sum. As the input data element passes through a PE, the input data element can be multiplied with the weight value, and accumulated with the input partial sum. The first PE, in one column, is provided an input partial sum and generates an output partial sum based on the mathematical operations performed by that PE. The output partial sum is then provided to an adjacent PE in the same column as an input partial sum. The adjacent PE may then perform further mathematical operations before generating an output partial sum and passing the output partial sum to a further adjacent PE. In some embodiments, input data may be fed into a systolic array in a cascading fashion, with a PE in a first column and row (a position that may be designated as [0, 0], indicating row and column 0) receiving an input data element and an input partial sum in a first clock cycle. Thereafter, data can generally flow to subsequent rows and columns at a given rate (e.g., advancing one PE per cycle). For example, the output partial sum of the PE at [0, 0] can be fed to the PE at [1, 0], along with an input data element for row 1, such that the PE at [1, 0] performs a mathematical operations on that input data element and partial sum during a second clock cycle. Similarly, the input data element of PE [0, 0] can be passed to a PE of a subsequent column (e.g., at position [0, 1]), which can also be fed an input partial sum, such that the PE at [0, 1] conducts a mathematical operation on that input partial sum and input data element during the second clock cycle. Assuming a convention in which rows advance downward and columns advance to the right, data therefore can generally flow down and to the right during operation of the array. To assist in these calculations, PEs within the array may be provided with weights prior to the first clock cycle, or may receive weights in the first clock cycle or during calculations.

As machine learning applications and neural network applications proliferate, the demand for increased processing capabilities (e.g., the capability to handle larger numbers and/or more precise numbers) while achieving higher precision and maintaining performance has also increased. For example, the demand to support numbers with increased precision (e.g., the decimal places for a number and/or the significand for a number) has increased. Therefore, a systolic array may internally support a high bit-length, such as 32-bits. Nevertheless, because calculation on high-bit-length numbers can require more computational resources and time, inputs to the systolic array may be of a lower bit-length, such as 16-bits. Similarly, the expected output of the systolic array may be a lower bit length. Therefore, the systolic array can provide outputs of an internal bit-length, such as 32-bits, to a reducer for reducing and rounding of the output to a desired bit length, such as 16-bits. In accordance with embodiments of the present disclosure, such a reducer may implement stochastic rounding in order to preserve, within rounded outputs, statistical information that might otherwise be lost. Moreover, the reducer may be configured to operate on multiple data streams in parallel, or to parallelize processing of a single data stream, while maintaining deterministic operation with respect to each data stream.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, the present disclosure relates to rounding the output of a systolic array using stochastic rounding. For purposes of explanation, the present disclosure describes the operation of the systolic array generally. Subsequently, the present disclosure describes the rounding of the output of the systolic array using stochastic rounding.

FIG. 1A illustrates an example 4×4 systolic array 100A. The systolic array 100A illustratively includes four columns of PEs and four rows of PEs with four PEs in each row, and four PEs in each column. It will be understood that the systolic array 100A is simplified for the purpose of description, and that a systolic array 100A in accordance with the present disclosure may include any number of PEs in each row and column. Further, the number of PEs in each row may be different than the number of PEs in each column. It will be further understood that such a systolic array 100A may be logically organized in any number of rows and any number of columns. Further, the number of rows may be different than the number of columns. The systolic array 100A may be part of a neural network processor in a computer system. For example, the computer system may provide multi-tenant compute services for data processing applications such as an image recognition service, text-based data processing (e.g., processing of search queries), audio or video data processing, etc.

Each PE may include a respective row input bus 102, a respective column input bus 104, a respective column output bus 106, and a respective row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic computations based on the inputs, and transmit the result of the arithmetic computations to a PE of the same column below (or to the external circuitries) via the column output bus 106. The PE may also forward the inputs received via the row input bus 102 to a right PE of the same row via the row output bus 108.

The systolic array 100A may perform arithmetic computations, including multiplication and addition operations, for the processing elements of a neural network. For example, each PE may include arithmetic units such as a multiplier and an adder. In some embodiments, the multiplier and the adder may be a fused multiplier adder. In the example of FIG. 1A, each row of the PEs may handle one set of input data, and each column of the PEs may generate one set of output data based on the sets of input data received by each PE in a given column.

A column 112 of the PEs (the leftmost column) may receive four sets of input data, with each set of input data being handled by one row of the PEs. A column 116 of reducers may provide four sets of reduced input data to the column 112 of the PEs, with each set of input data being provided by one reducer which can increase the overall performance of the array as compared to traditional arrays. It will be understood that the column 116 of reducers may provide any number of sets of reduced input to the column 112 of the PEs. For example, the number of reducers and/or the number of sets of reduced input may be based on a quantity of PEs in a given column. In the example of FIG. 1A, the column 112 of the PEs includes four PEs (PE 112a, PE 112b, PE 112c, PE 112d) and the column 116 of reducers include four corresponding reducers (reducer 116a, reducer 116b, reducer 116c, reducer 116d). It will be understood that the column 116 of reducers may include any number of reducers. Each reducer in the column 116 of reducers may provide a set of reduced input data for a particular PE of the column 112 of PEs, wherein each set of reduced input data includes two or more reduced inputs. For example, the reducer 116a may provide a reduced input data element and a reduced weight to the PE 112a. Each reducer in the column 116 of reducers may convert the inputs into reduced inputs. For example, the reducer 116a may convert a 32-bit input data element into a reduced 22-bit input data element.

Each reducer in the column 116 of reducers may further select a reduced input to provide to each PE in the column 112 of the PEs. For example, each reducer in the column 116 of reducers may contain a multiplexer to select a reduced weight or a reduced input data element to provide to the PE. In some embodiments, each reducer 116a-116d may be implemented as multiple reducers (e.g., a first reducer and a second reducer). Further, the first reducer and the second reducer may provide one or more inputs to the column 112 of the PEs. For example, a first reducer of the reducer 116a may provide a reduced input data element to the PE 112a and a second reducer of a reducer 116a may provide a reduced weight to the PE 112a. In some embodiments, a PE may receive a reduced input (e.g., a reduced input data element) and a non-reduced input (e.g., a non-reduced weight) for arithmetic operations.

Each PE in the column 112 may obtain, from the corresponding input dataset received via the row input bus 102, the reduced input data element and the reduced weight. Each PE in the column 112 may multiply the reduced input data element with the reduced weight to generate a scaled input. The scaled inputs generated by the PEs within any column (including the column 112) can be accumulated by the adder of each PE. For example, a PE 112a (of the column 112) may generate a first scaled input (from the first input dataset), wherein the first scaled input may be based on the outputs of the adder. For example, the adder may generate a first output partial sum and the PE 112a may generate a first scaled input based at least in part on the first output partial sum. The PE 112a may transmit the first scaled input to a PE 112b via the column output bus 106 as a partial sum. The PE 112b may also generate a second scaled input (from the second input dataset) and add the second scaled input to the partial sum. The updated partial sum, accumulated with the first scaled input and the second scaled input, is then transmitted to a PE 112c via the column output bus 106. The partial sums are updated and propagated across the column 112, and a PE 112d may generate a sum of the scaled inputs from the four input datasets.

The sum generated by the PE 112d may correspond to an output dataset, and may be fed back to the leftmost PEs after going through an activation function. Moreover, each PE in the column 112 can also propagate the input datasets to other PE columns (e.g., a column 114), which can scale the input datasets with a different set of weights from the column 112. Each column of the PEs can perform the arithmetic operations (multiplications and additions) to generate the output data elements for other processing elements in parallel. In the example of FIG. 1A, the systolic array 100A can generate output data elements for four PEs corresponding to the four columns of the systolic array 100A.

A row 110 of the PEs (the bottommost row) may generate four sets of output data, with each set of output data being generated by one column of the PEs. A row 117 of reducers may receive the sets of output data generated by the row 110 of the PEs, with each set of output data being provided to one reducer. Each reducer of the row 117 of reducers can perform stochastic rounding on a respective output data set of the systolic array 100A which can increase the accuracy of the systolic array 100A as compared to traditional arrays. It will be understood that the row 117 of reducers may receive any number of sets of output data from the systolic array 100A. For example, the number of reducers and/or the number of sets of reduced output generated by the row 117 of reducers may be based on a quantity of PEs in a given row. In the example of FIG. 1A, the row 110 of the PEs includes four PEs and the row 117 of reducers include four corresponding reducers (reducer 117a, reducer 117b, reducer 117c, reducer 117d). It will be understood that the row 117 of reducers may include any number of reducers. Each reducer in the row 117 of reducers may round and reduce an output of a particular PE of the row 110 of PEs. For example, each reducer in the row 117 of reducers may convert the outputs into reduced outputs. For example, the reducer 117a may convert a 32-bit input data element into a reduced 22-bit input data element.

The systolic array 100A may perform convolution computations in multiple waves. In one embodiment, a wave represents a stream of input data elements processed while reusing the same weights in the systolic array 100A. For example, the respective weights may have been pre-loaded in each PE in the systolic array 100A, sequentially or in parallel prior to starting a wave computation. The partial sums generated by the PEs may correspond to a single wave. As the PEs of the systolic array 100A perform arithmetic operations for the convolution computations, dynamic power dissipated by all the multipliers in the PEs may be significant. This problem may be further exacerbated for a systolic array comprising a large number of PEs (e.g., several thousands). The arithmetic operations performed by a PE are further explained with reference to FIG. 2A and FIG. 2B.

Figure 1B:
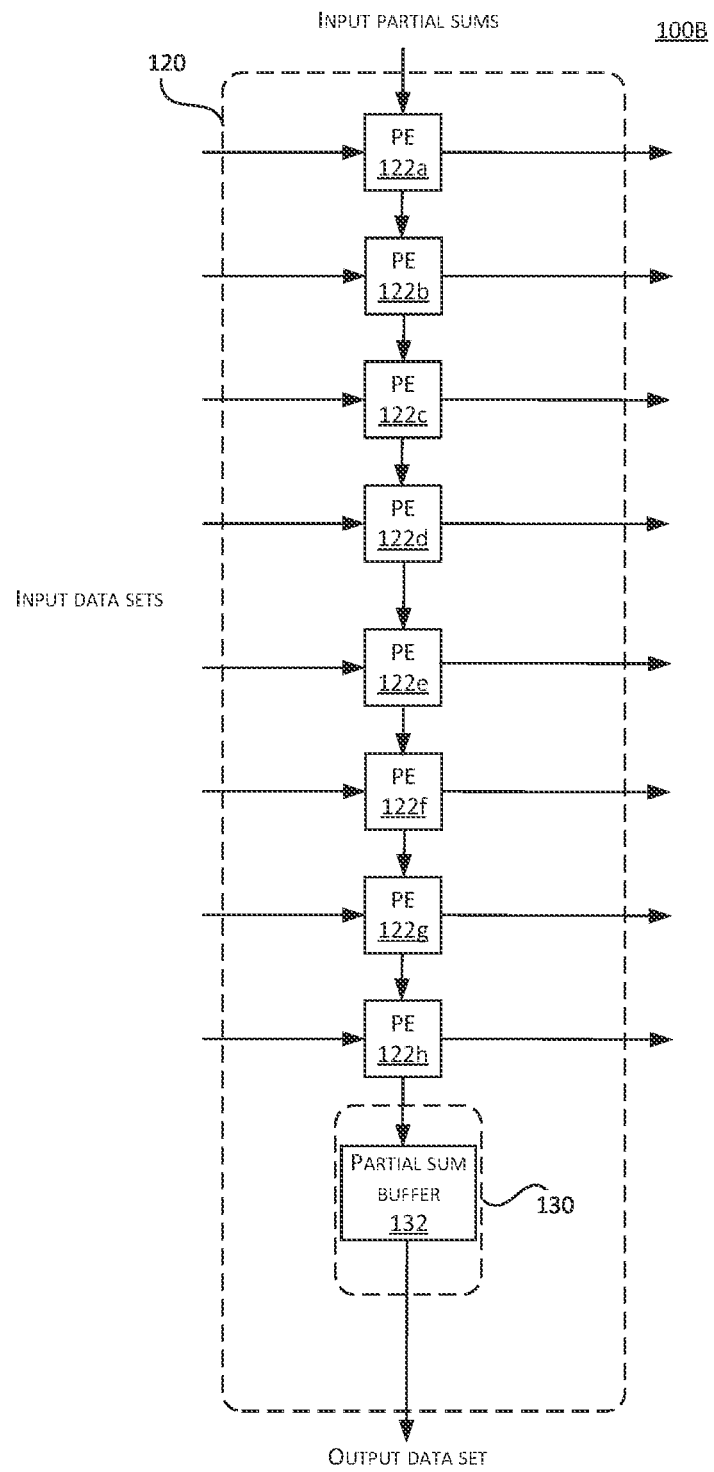
FIG. 1B illustrates an example 1×8 column of a systolic array.

As noted above, an input may be reduced to generate a reduced input that is provided to the systolic array. Further, the input may be reduced into multiple reduced inputs for multiple single reduced precision computations that are combinable into a higher precision computation. The systolic array may include an aggregator in order to combine partial outputs into the higher precision output (e.g., a higher precision output relative to the single-pass computation). FIG. 1B illustrates an example configuration of an eight-PE column 120 within a systolic array 100B. The array 100B may be similar to the array 100A of FIG. 1A, but illustratively includes 8 rows and one column. Specifically, as shown in FIG. 1B, an input may be converted into multiple reduced inputs and each PE may perform a multiply-accumulate operation on each combination of reduced inputs and provide a partial output partial sum to corresponding adjacent PE. By varying the number of reduced inputs, the number of partial output partial sums generated and the number of multiply-accumulate operations may be similarly varied. Thus, each higher bit-length input may be converted into any number of reduced inputs with lower bit-lengths by the reducer for the systolic array in order to satisfy the bit-lengths natively supported by the systolic array.

To facilitate calculation of a total output sum for a column, the column 120 in FIG. 1B includes an aggregator 130. The aggregator 130 may be located within or outside the array 100B. For each pass through the array for a given input (e.g., for each combination of reduced inputs associated with a particular input), the aggregator 130 may store and sum the partial outputs. The aggregator 130 may add the partial sums generated for each combination of reduced inputs. The aggregator 130 may calculate a running sum (e.g., by iteratively adding the partial output sums for a given set of reduced inputs) for output as the total output sum. For example, the aggregator 130 may include a partial sum buffer 132.

In some embodiments, the systolic array may identify a particular order to pass the reduced inputs and the reduced weights through the array. For example, the reduced inputs and the reduced weights may be passed first through the array in order to retain the accuracy of the numbers with a lower magnitude. Therefore, the reduced inputs with lower magnitude may be accumulated first in order to retain accuracy. For example, the product of a low reduced input data element and a low reduced weight may be added to the product of a high reduced input data element and a low reduced weight (or a low reduced input data element and a high reduced weight) to generate a first partial output. Further, the first partial output may be added to the product of a low reduced input data element and a high reduced weight (or a product of the high reduced input data element and a low reduced weight) to generate a second partial output. Further, the second partial output may be added to the other of the product of the low reduced input data element and the high reduced weight or the product of the high reduced input data element and the low reduced weight to generate a third partial output. The third partial output may be added to the product of a high reduced input data element and a high reduced weight to generate a total output. By adding the reduced inputs with the lower magnitude first, the precision of the reduced inputs may be maintained in order to minimize the loss of precision of the low reduced inputs when added to the high reduced inputs.

While an aggregator 130 providing pairwise summation is shown in FIG. 1B, the aggregator 130 may alternatively implement other aggregation techniques. In some implementations, the column 120 of the PEs may not include an aggregator 130 and may provide an output dataset consisting of partial sums for each combination of reduced inputs. In one implementation, the column 120 may not include an aggregator 130 and the column 120 may provide multiple partial output datasets. In some embodiments, the multiple output datasets may each correspond to a partial sum generated for each combination of reduced inputs of the column 120. In another implementation, the aggregator 130 may provide more or less output datasets. The aggregator 130 may provide one or more output datasets each corresponding to one or more partial sums. In some instances, output of the aggregator 130 may be configurable according to a desired use of the array, and may therefore accept instructions as to what outputs should be provided. In some instances, the aggregator 130 may provide a combination of the above outputs (e.g., by providing the four partial sums corresponding to each combination of reduced inputs, as well as a final sum for the non-reduced input). In some embodiments, a portion of the aggregation of the partial sums may occur within the systolic array. For example, the systolic array may add (using one or more components) a first partial sum and a second partial sum to generate a third partial sum and may add a fourth partial sum and a fifth partial sum to generate a sixth partial sum. Further, the systolic array may provide the third partial sum and the sixth partial sum for accumulation to the aggregator 130.

Figure 2A:
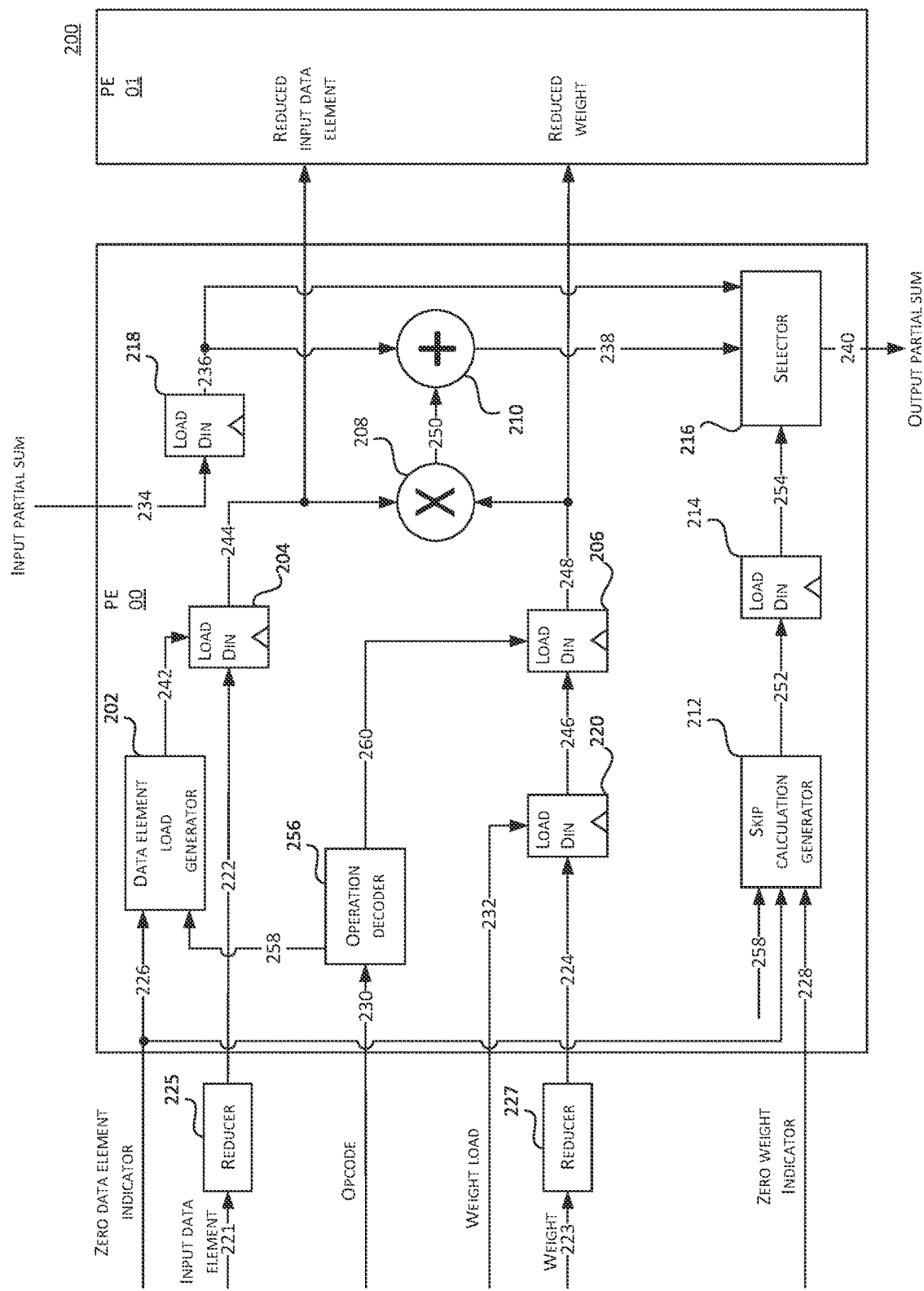
FIG. 2A illustrates a processing element for neural network computations with the inputs entering through separate reducers, according to certain examples of the disclosed technologies.
Figure 4A:
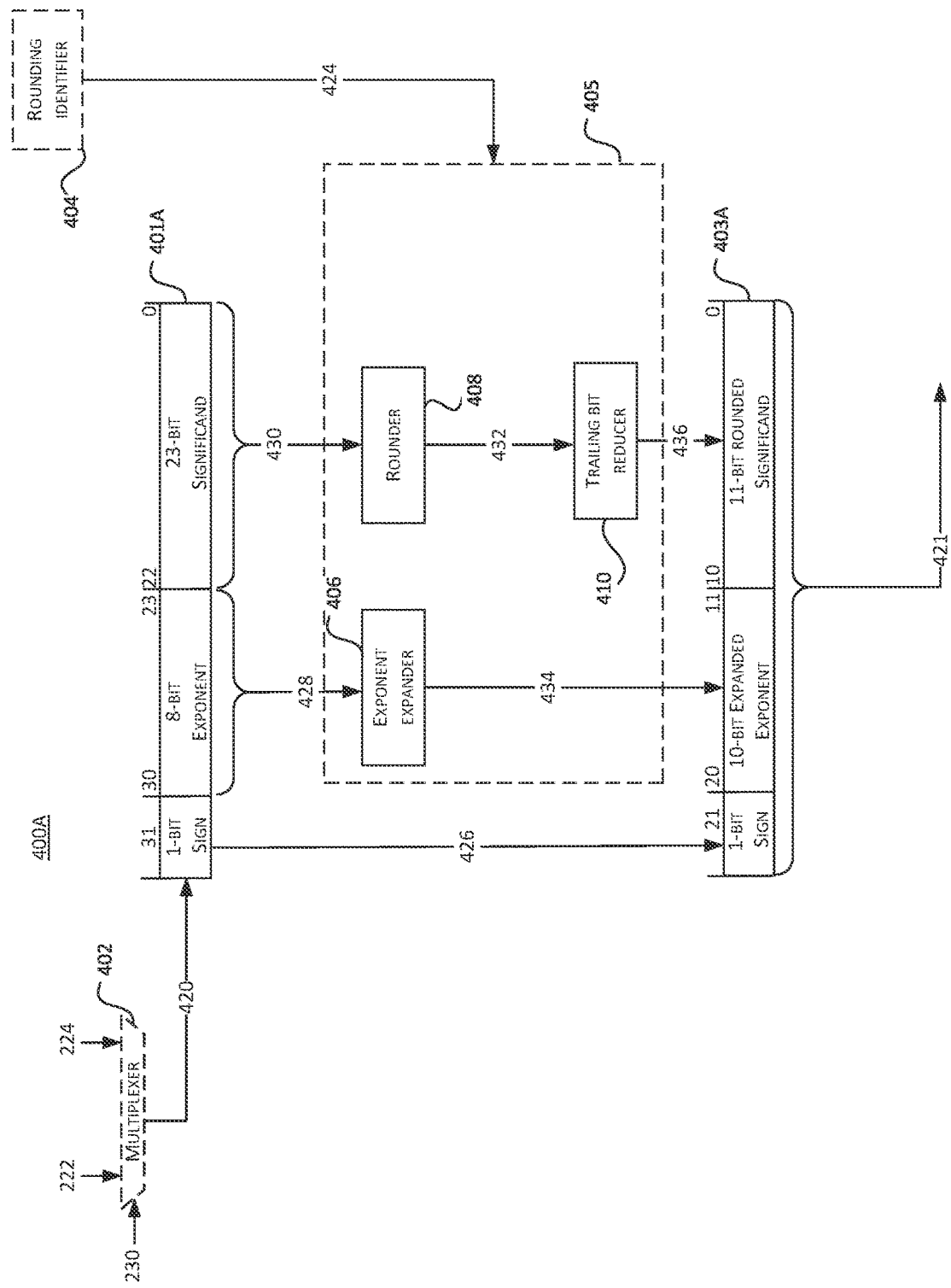
FIG. 4A illustrates a reducer showing the selection of an input to be reduced and rounded, according to some examples of the disclosed technologies.
Figure 4B:
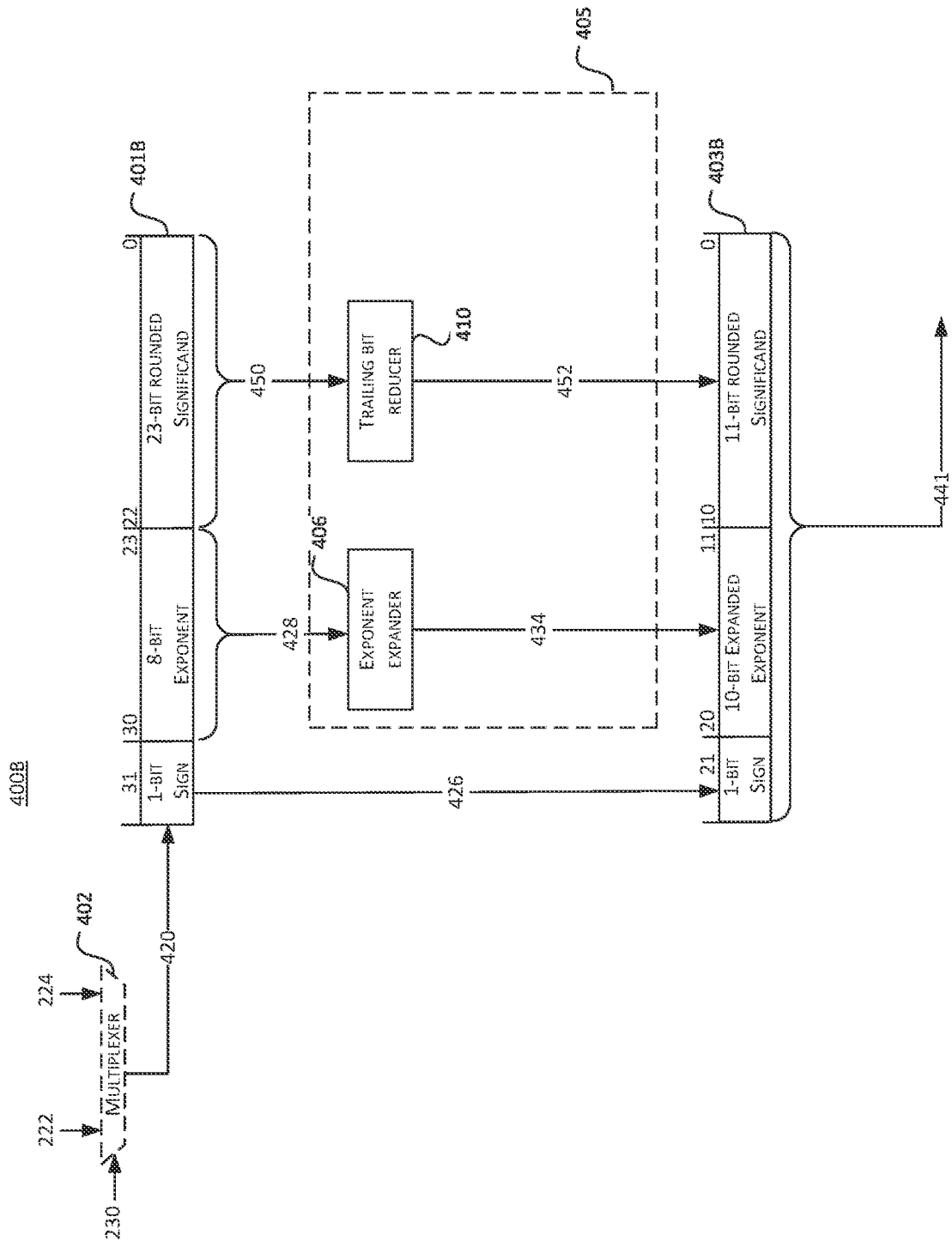
FIG. 4B illustrates a reducer showing the selection of a rounded input to be reduced, according to some examples of the disclosed technologies.

FIG. 2A illustrates a PE 00 in a systolic array for neural network computations, according to certain embodiments of the disclosed technologies. The PE 00 may be part of a systolic array similar to the systolic array 100A in FIG. 1A. FIG. 4A and FIG. 4B show additional details of the reducers 225, 227 of FIG. 2A. Some embodiments may be described with reference to neural networks, however, it will be understood that certain embodiments may be used in other applications, e.g. pattern recognition, image processing, audio processing, video processing, etc., without deviating from the scope of the technologies.

The systolic array 200 includes reducers 225, 227 and a plurality of processing elements including PE 00 and PE 01. The PE 00 may include one or more of a data element load generator 202, an input data element register 204, a weight register 206, a multiplier 208, an adder 210, a skip calculation generator 212, a skip calculation register 214, a selector circuit 216, an input partial sum register 218, a cached weight register 220, and an operation decoder 256. The PE 00 may receive one or more of a reduced input data element 222, a reduced weight 224, a zero data element indicator 226, a zero weight indicator 228, an opcode 230, a weight load 232, and an input partial sum 234 to perform the convolution computations according to some embodiments.

The PE 00 may be connected to a first reducer 225 and a second reducer 227. The first reducer 225 may receive a first input (such as input data element 221), and the second reducer 227 may receive a second input (such as weight 223). The first reducer 225 may convert the first input into a first reduced input, and the second reducer 227 may convert the second input into a second reduced input. The first reducer 225 may provide the PE 00 with the reduced input data element 222 (e.g., a reduced version of the input data element 221). Further, the second reducer 227 may provide the PE 00 with the reduced weight 224 (e.g., a reduced version of the weight 223). In some embodiments, one or more of the first reducer 225 or the second reducer 227 may round the input and/or the reduced input. The rounding may be based on a rounding method identified by the system, a user, etc. (e.g., a user input may specify a particular rounding method). In other embodiments, one or more of the first reducer 225 or the second reducer 227 may reduce a pre-rounded input (e.g., the pre-rounded input may be rounded by a system local to or remote to the systolic array). Further, the first reducer 225 and the second reducer 227 may convert one or more floating-point inputs into a reduced representation. The floating-point inputs may include bit-lengths of 32-bits, 64-bits, or any number of bits.

In some embodiments, one or more of the first reducer 225 or the second reducer 227 may detect when one or both of the input data element 221 and the weight 223 exceed a particular bit-length. For example, the first reducer 225 may determine if the input data element 221 exceeds 22-bits and the second reducer 227 may determine if the weight 223 exceeds 22-bits. Further, a user, the system, etc. may provide the particular bit-length for comparison with the bit-length of the input data element 221 and the weight 223. Upon determining that a particular input (e.g., the input data element 221) exceeds the identified bit-length, one or more of the first reducer 225 or the second reducer 227 can generate a reduced input (e.g., a reduced input data element 222).

In order to reduce the bit-length of the input data element 221 and/or the weight 223, the first reducer 225 and/or the second reducer 227 can reduce the bit-length of a significand portion of the particular length. The first reducer 225 and/or the second reducer 227 can reduce the bit-length of the significand portion to match the maximum bit-length of the significand supported by components of the systolic array (e.g., the multiplier of each processing element). For example, the first reducer 225 and/or the second reducer 227 can reduce the bit-length of a significand portion of the input from 23-bits to 11-bits. In some embodiments, the first reducer 225 and/or the second reducer can expand an exponent portion of the input to a particular format required by the multiplier. For example, the first reducer 225 and/or the second reducer 227 can expand the bit-length of the exponent portion of the input from 8-bits to 10-bits.

In the event that the significand portion of one or both of the input data element 221 and the weight 223 are already reduced, the first reducer 225 and the second reducer 227 can still extend the number of bits used to represent the exponent portion of each. Accordingly, subsequent arithmetic circuits such as the multiplier 208 can perform computations on numbers of a single format (e.g., 22-bit floating-point format).

The PE 00 may receive the reduced input data element 222 via a first input port. The reduced input data element 222 may be an input dataset, or any array of input data elements. The PE 00 may receive one reduced input data element at a time, in uniform time periods, from the input dataset. For example, a uniform time period may correspond to a clock cycle. The input dataset may be similar to an input feature map comprising input feature map elements. As an example, the input dataset may correspond to an input image, an audio clip, a video clip, a text portion, or any other data which may be provided for data processing to identify a certain pattern or an object. In some instances, the input dataset may be an intermediate output dataset, which has gone through an activation function, e.g., ReLu or Sigmoid, as discussed with reference to FIG. 1A. Each reduced input data element 222 may a floating-point data type or any suitable data type. Each reduced input data element 222 may include 22-bits, 21-bits, 20-bits, or any suitable number of bits. The reduced input data element 222 may be stored in the input data element register 204 for a period of time.

The PE 00 may receive the reduced weight 224 via a second input port. In some embodiments, the reduced weight 224 may belong to a set of weight values corresponding to a convolution filter. The reduced weight 224 may be pre-loaded in the PE 00 prior to receiving the reduced input data element 222. In some embodiments, the PE 00 may receive one reduced weight value at a time, in uniform time periods, from the set of reduced weight values, to pre-load each PE in a given row with a respective reduced weight value. The PE may pass the reduced weight value to the next PE in the respective row until each PE in the given row has been pre-loaded. Each PE may cache the respective reduced weight value to use for computations with the reduced input data elements. Each reduced weight 224 may be a floating-point data type or any suitable data type. Each reduced weight 224 may include 22-bits, 21-bits, 20-bits, or any suitable number of bits. The reduced weight 224 may be stored in a cached weight register 220 for a period of time.

The PE 00 may receive the input partial sum 236 for a current operation via a third input port. In some embodiments, the input partial sum 236 can be a 16 bit, 18 bit, 32, bit, 33 bit, 34 bit number or have any number of bits.

The PE 00 may receive the zero data element indicator 226 for a current operation via a fourth port. The zero data element indicator 226 may include a single bit or multiple bits. The zero data element indicator 226 may indicate (or be used to indicate) whether the reduced input data element 222 is zero. The zero data element indicator 226 may indicate whether the input data element 221 is zero. For example, a value of "1" for the zero data element indicator 226 may indicate that the reduced input data element 222 associated with the zero data element indicator 226 is zero, and a value of "0" for the zero data element indicator 226 may indicate that the reduced input data element 222 associated with the zero data element indicator 226 is not zero. Further, a "0" may correspond to a logical zero or a logical low, and a "1" may correspond to a logical one or a logical high. For example, the logical zero may be represented by a first range of voltage levels (e.g., 0-2 volts), and the logical one may be represented by a second range of voltage levels (e.g., 3-5 volts). It will be understood that other implementations to represent a "0" value and a '1' value are possible without deviating from the scope of the disclosed technologies. The zero data element indicator 226 may be generated by a circuit external to the PE 00, and passed to all the PEs in the same row sequentially, in the uniform time periods.

The PE 00 may receive the zero weight indicator 228 via a fifth port. The zero weight indicator 228 may include a single bit or multiple bits. The zero weight indicator 228 may indicate whether the reduced weight 224 associated with the zero weight indicator 228 is zero. The zero weight indicator 228 may also indicate whether the weight 223 associated with the zero weight indicator 228 is zero. For example, a value of "1" for the zero weight indicator 228 may indicate that the reduced weight 224 is zero, and a value of "0" for the zero weight indicator 228 may indicate that the reduced weight 224 is not zero. The zero weight indicator 228 may be generated by a circuit external to the PE 00, and passed to all the PEs in the same row sequentially along with the reduced weight 224.

The weight load 232 may load the reduced weight 224 into the cached weight register 220 to provide a cached weight 246. The weight load 232 may be asserted to cache the reduced weight 224 for the PE 00 in the cached weight register 220 before the reduced input data element 222 is fed into the array. As the weights are shifted into the array to pre-load each PE with a respective weight value, the weight load 232 may be asserted for each PE at certain time periods in order to pre-load each PE with the appropriate weight value.

The operation decoder 256 may decode the opcode 230 to determine an operation to be executed by the PE 00 for different instructions represented by different opcode values. In some embodiments, a first opcode value may correspond to an instruction to shift the reduced weights from one PE to another in the systolic array. A second opcode value may correspond to an instruction to start the arithmetic computations by the PE. For example, once the reduced weights have been pre-loaded in the systolic arrays, the reduced input data elements may be read from the memory and the arithmetic computations may be performed as the reduced input data elements pass through the array. A third opcode value may correspond to an instruction to execute NOPs.

The NOPS may be used to space two systolic array instructions, or when there are no reduced input data elements to be read from the memory. For example, the NOPs may be used to space the instructions to shift the reduced weights, and the instructions to start the arithmetic computations. For example, for a 4×4 array, it may take up to 15 cycles to shift the reduced weights into all the PEs in the array before starting the arithmetic computations so 15 NOP cycles may be needed. The operation decoder 256 may decode the opcode 230 to generate a NOP 258, and the start computations signal 260. The operation decoder 256 may provide the start computations signal 260 to the weight register 206 that is connected to the multiplier 208 and to the adder 210. The operation decoder 256 may also provide the start computations signal 260 to the multiplier 208. The opcode 230 may include any suitable number of bits, e.g., two, four, etc. In some embodiments, the operation decoder 256 can also decode the opcode to determine a data type to provide a data type control signal.

In some embodiments, the reduced input data element 222, the reduced weight 224, the opcode 230, the zero data element indicator 226, and the zero weight indicator 228 may belong to the row input bus 102, as discussed with reference to FIG. 1A. In other embodiments, a splitter (not shown) may be used in the PE 00 to split the row input bus 102 into different internal buses to carry the reduced input data element 222, the reduced weight 224, the opcode 230, the zero data element indicator 226, and the zero weight indicator 228 within the PE 00. For example, the reduced input data element 222 and the reduced weight 224 may belong to a first row input bus and the opcode 230, the zero data element indicator 226, and the zero weight indicator 228 may belong to a second row input bus.

The data element load generator 202 may generate a data load signal 242 that may be used to allow the input data element register 204 to skip storing of the reduced input data element 222 in certain conditions. In some embodiments, the reduced input data element 222 may be loaded into the input data element register 204 when the data load signal 242 is asserted based on the zero data element indicator 226 and the NOP 258. The data load signal 242 may be asserted when the zero data element indicator 226 corresponding to the reduced input data element 222 is "0" and the opcode 230 does not indicate a NOP (e.g., the NOP 258 is "0"). The data load signal 242 may not be asserted when the zero data element indicator 226 corresponding to the reduced input data element 222 or the NOP 258 is "1." The data element load generator 202 may be implemented using an OR, NOR, NAND, or any suitable circuit.

The input data element register 204 may store the reduced input data element 222, or skip storing of the reduced input data element 222 to provide a stored input data element 244 based on the data load signal 242 for a current operation. In some embodiments, the input data element register 204 may store a Din input if a load input is "1", and may hold the previous value if the load input is "0." For example, if the data load signal 242 is "1," the input data element register 204 may store a new value for the reduced input data element 222, and if the data load signal 242 is "0," the input data element register 204 may skip storing the new value for the reduced input data element 222. Thus, in some instances, the input data element register 204 may only store non-zero value of the reduced input data element 222. According to certain embodiments, skipping the storing of the new value by the input data element register 204 may result in not toggling the stored input data element 244 and holding the previous value of the stored input data element 244.

The weight register 206 may store the cached weight 246 to provide a stored weight value 248 based on the start computations signal 260. In some embodiments, the weight register 206 may store a Din input if a load input is "1," and may hold the previous value if the load input is "0." For example, if the start computations signal 260 is asserted (e.g., the start computations signal 260 is "1"), the cached weight 246 may be loaded into the weight register 206, else the weight register 206 may hold the previous value. Thus, the reduced weight 224 previously loaded into the cached weight register 220 using the weight load 232 may be shifted into the weight register 206 at the start of the arithmetic computations. In some embodiments, the stored weight value 248, once loaded at the start of the arithmetic computations, remains unchanged as the input data element is fed into the PE 00, one element at a time, for computations corresponding to one or more waves through the systolic array.

The PE 00 may provide the stored input data element 244 to a PE 01 based on the data load signal 242 for a current operation. The PE 01 may receive the stored input data element 244 via a first port as a reduced input data element 222. In some embodiments, the input data element register 204 may store a Din input if a load input is "1", and may hold the previous value if the load input is "0." The PE 00 may provide the stored weight value 248 to a PE 01 based on a start computations signal 260. The PE 01 may receive the stored weight value 248 via a second port as a reduced weight 224. In some embodiments, the weight register 206 may store a Din input if a load input is "1," and may hold the previous value if the load input is "0."

The multiplier 208 may perform a multiplication operation between the stored input data element 244 and the stored weight value 248. The multiplier 208 may generate a product 250 based on the multiplication operation. The multiplier 208 may receive inputs of a fixed bit-length. For example, the multiplier 208 may receive 22-bit floating-point inputs. Therefore, the reducer can enable the systolic array to receive inputs of an arbitrary bit-length and provide the multiplier 208 with a reduced input of a bit-length supported by the multiplier 208. In some embodiments, the product 250 may be an integer product, a floating-point product, or any other product. Further, the multiplier 208 may generate a product 250 of 8-bits, 16-bits, 18-bits, 32-bits, 34-bits, or any other number of bits. The multiplier 208 may be implemented using a multiplier circuit. The multiplier 208 may perform floating-point multiplication, integer multiplication, or multiplication involving any other data type. The multiplier 208 may be implemented using a 16-bit multiplier data path, an 18-bit multiplier data path, a 22-bit multiplier data path, or a multiplier data path with any number of bits. The multiplier 208 may support at least n-bits operations, wherein n is greater than or equal to the number of bits in the input (e.g., the input data element).

Figure 5:
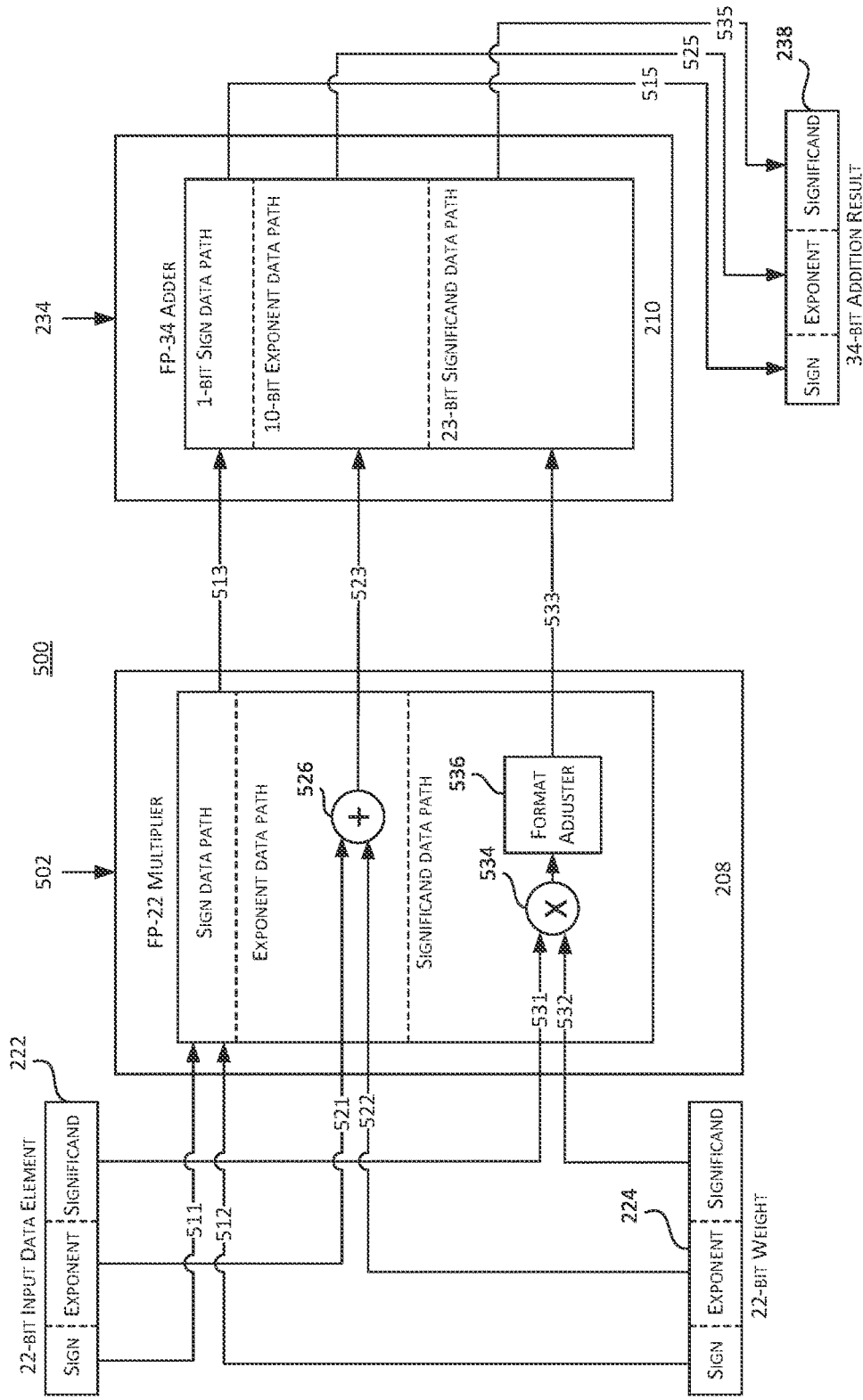
FIG. 5 illustrates a multiply accumulate datapath for neural network computations, according to certain examples of the disclosed technologies.

The multiplier 208 may contain multiple data paths, for example, as further discussed with respect to FIG. 5. With respect to FIG. 2A, the multiplier 208 may contain separate data paths for computing a sign bit, a significand, and an exponent. It will be understood that the significand data path and the exponent data path may include data of any number of bits.

The multiplier 208 may provide the product 250 to the adder 210. The adder 210 may perform an addition operation on the product 250 and the stored input partial sum 236 to provide an addition result 238. The adder 210 may be implemented using an adder circuit. The adder 210 may perform floating-point addition, integer addition, or non-integer addition. The adder 210 may perform addition on inputs with 8-bits, 16-bits, 18-bits, 32-bits, 34-bits, or any number of bits. The adder 210 may be implemented using a 16-bit adder data path, an 18-bit adder data path, a 32-bit adder data path, a 34-bit adder data path, or an adder data path with any number of bits. In one embodiment, the adder 210 is implemented with given bit-size (e.g., with an adder data path of the given bit-size), which may represent a maximum bit size of an expected input to the array. In some embodiments, each processing element may include an adder with a larger bit-size and a multiplier with a smaller bit-size as adders of increased bit-sizes may be more cost efficient than multipliers of the same increased bit-sizes. Therefore, this disclose enables a systolic array to support, at reduced precision, larger bit-sizes using lower bit-size multipliers. In another embodiment, the adder 210 may be implemented with a smaller bit size than a maximum bit size of an expected input to the array. The adder 210 may support at least m-bits operations where m is equal to or larger than the value of the multiplier data path. The adder data path may be a superset of the multiplier data path.

The multiplier 208 and the adder 210 may provide a fused multiply-accumulate operation. The multiplier 208 and the adder 210 may be integrated together to perform a single step multiply add operation. In some embodiments, no rounding may be performed on the output of the multiplier 208 prior to providing the output to the adder 210. Further, the multiplier 208 may provide an accurate product 250 to the adder 210. In other embodiments, the PE 00 may perform rounding on the output of the multiplier 208.

The selector circuit 216 may receive the addition result 238, the input partial sum 236, and the stored skip calculation indicator 254. The selector circuit 216 may select either the addition result 238 or the input partial sum 236 to provide as an output partial sum 240 via a sixth port. In some embodiments, the selector circuit 216 may contain at least one multiplexer, the multiplexer may select the addition result 238 or the input partial sum 236 to be produced. The selector circuit 216 may select either the addition result 238 or the input partial sum 236, based on the stored skip calculation indicator 254, to provide as an output partial sum 240 via a sixth port. According to some embodiments, when a value of either the reduced input data element 222 or the reduced weight 224 for a current operation is zero, or the NOP 258 is asserted, the addition result 238 since the product 250 may hold a value for the previous operation. In such cases, the stored skip calculation indicator 254 may allow bypassing the addition result 238, and selecting the input partial sum 236 to provide as the output partial sum 240. For example, when the stored skip calculation indicator 254 provides a skip calculation signal of "1", the input partial sum 236 may be selected as the output partial sum 240 for a systolic cycle, and when the stored skip calculation indicator 254 provides a skip calculation signal of "0", either the addition result 238 may be selected as the output partial sum 240 for the systolic cycle.

Figure 2B:
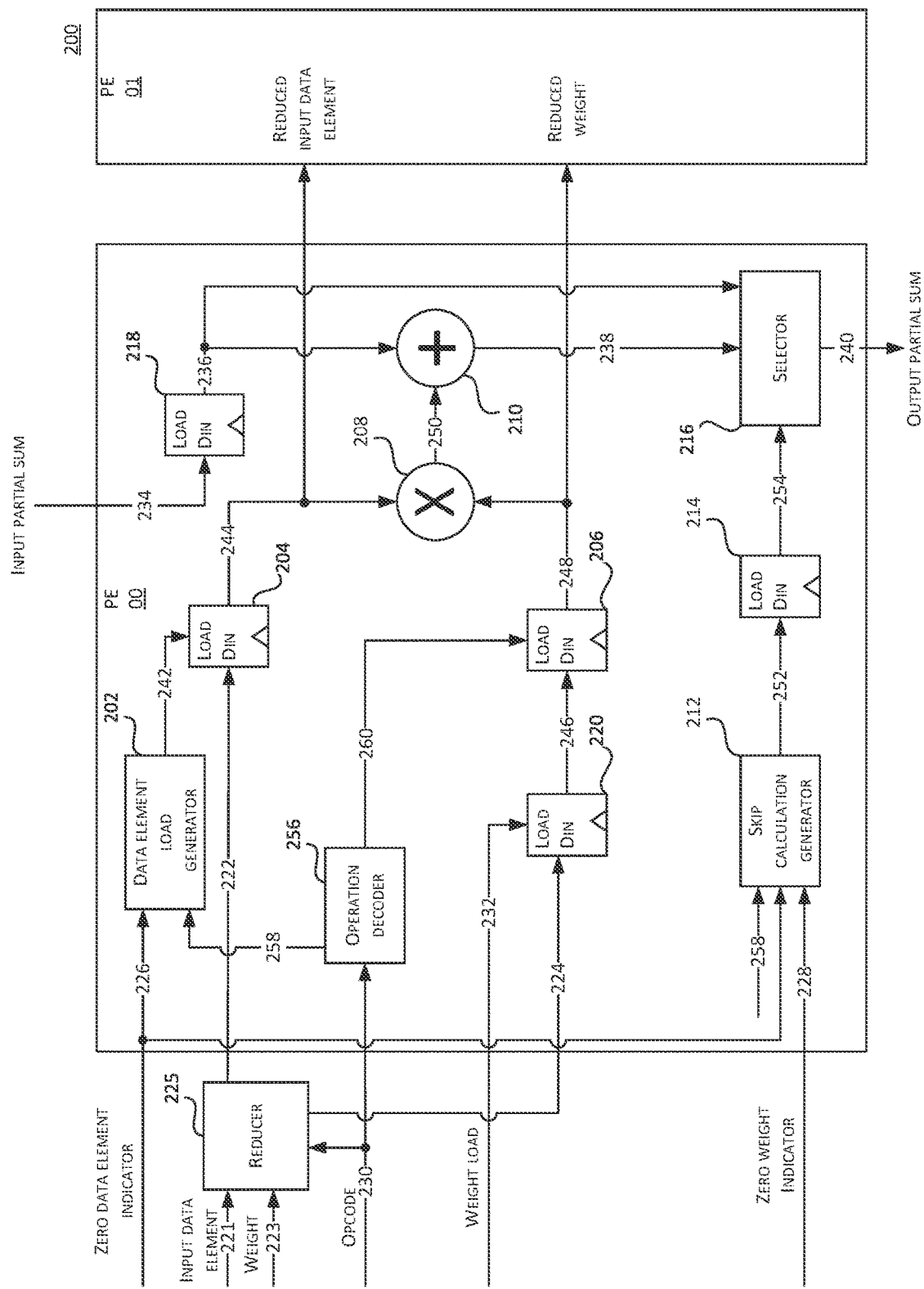
FIG. 2B illustrates a processing element for neural network computations with the inputs entering through the same reducer, according to certain examples of the disclosed technologies.

FIG. 2B illustrates the figure shown in FIG. 2A with a shared reducer 225 replacing the first reducer 225 and the second reducer 227. The shared reducer 225 may receive the input data element 221 and the weight 223. The shared reducer 225 may also receive the opcode 230. The shared reducer 225 may perform a selection operation on the input data element 221 and the weight 223 based at least in part upon the opcode 230. In some embodiments, the shared reducer 225 will produce a reduced input based at least in part upon the opcode 230. For example, when the opcode 230 is a particular value, the shared reducer 225 may reduce the weight 223 and provide the reduced weight 224 to the PE 00. Further, when the opcode 230 provides some other set value, the shared reducer 225 may reduce the input data element 221 and provide the reduced input data element 222 to the PE 00. Therefore, the shared reducer 225 can reduce the bit-length of the significand portion of both the input data element 221 and the weight 223 to match the maximum bit-length of the significand supported by components of the systolic array (e.g., the multiplier of each processing element). In some embodiments, the shared reducer 225 may receive multiple input data elements and/or multiple weights and produce multiple reduced input data elements and/or multiple reduced weights. For example, the shared reducer 225 can produce any number of reduced input data elements (e.g., four) and/or any number of reduced weights (e.g., four).

The shared reducer 225 may use a multiplexer to select between the input data element 221 and the weight 223. In some embodiments, the reduced input data element 222 and the reduced weight 224 may be delivered to the PE 00 on separate buses. In other embodiments, the reduced input data element 222 and the reduced weight 224 may be delivered on the same bus. Further, the shared reducer 225 may reduce both the input data element 221 and the weight 223 in the same clock cycle and provide the reduced input data element 222 and the reduced weight 224 to the PE 00. In some embodiments, the shared reducer 225 may reduce the weight 223 and provide the reduced weight 224 to the PE 00 during a clock cycle. The shared reducer 225 may then reduce the input data element 221 and provide the reduced input data element 222 to the PE 00 during a second clock cycle.

Figure 3:
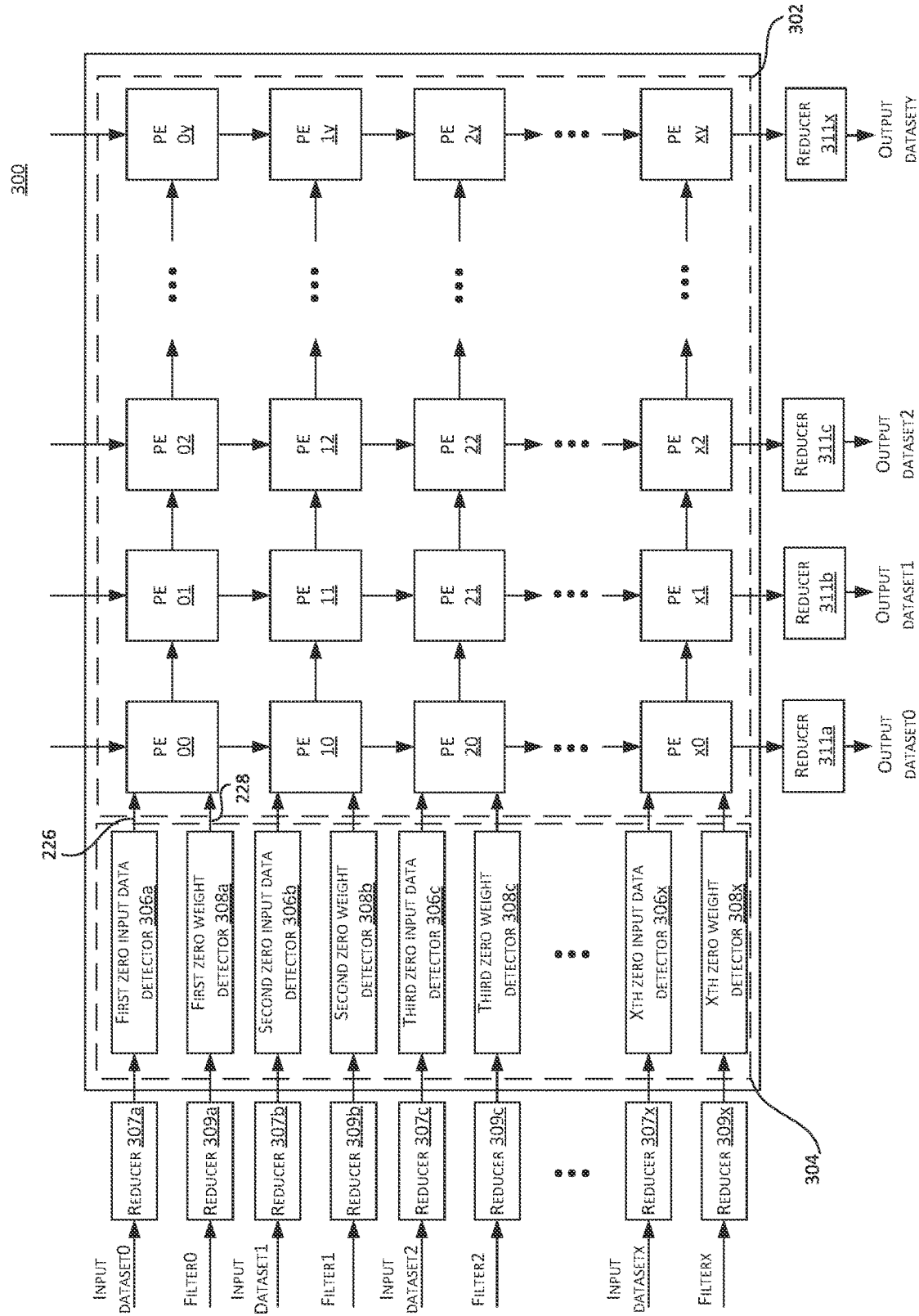
FIG. 3 illustrates an apparatus including zero detector circuits for reduced input data elements and reduced weights entering a systolic array for neural network computations, according to certain examples of the disclosed technologies.

FIG. 3 illustrates an apparatus 300 including zero detector circuits for reduced input data elements and reduced weights entering a systolic array for neural network computations, according to certain embodiments of the disclosed technologies.

The apparatus 300 may include a two-dimensional systolic array 302 comprising PEs arranged into rows and columns. The systolic array 302 may be similar to the systolic array 100A in FIG. 1A. A first row of the systolic array 302 may include PE 00, PE 01, PE 02, . . . , PE 0y, a second row of the systolic array 302 may include PE 10, PE 11, PE 12, . . . , PE 1y, a third row of the systolic array 302 may include PE 20, PE 21, PE 22, . . . , PE 2y, and an Xth row of the systolic array 302 may include PE x0, PE x1, PE x2, . . . , PE xy. The x and y may include positive integers, e.g., 32, 64, 128, or any suitable number. Each PE of the systolic array 302 may be similar to the PE 01, and include means to perform arithmetic computations on reduced inputs using power efficient methods, as discussed with reference to FIG. 2A, FIG. 2B.

In certain embodiments, a first (e.g., leftmost) PE in each row of the systolic array 302 may be coupled to a respective zero input data detector circuit to detect a zero value on an input data element, and a respective zero weight detector circuit to detect a zero value on a weight value entering the systolic array 302. For example, the PE 00 in the first row may be coupled to a first zero input data detector 306a and a first zero weight detector 308a, the PE 10 in the second row may be coupled to a second zero input data detector 306b and a second zero weight detector 308b, the PE 20 in the third row may be coupled to a third zero input data detector 306c and a third zero weight detector 308c, and the PE x0 in the Xth row may be coupled to an Xth zero input data detector 306x and an Xth zero weight detector 308x. The first zero input data detector 306a, the second zero input data detector 306b, the third zero input data detector 306c, . . . , and the Xth zero input data detector 306x may detect a zero value on a respective reduced input data element in an input dataset0, an input dataset1, an input dataset2, . . . , and an input datasetx respectively. Similarly, the first zero weight detector 308a, the second zero weight detector 308b, the third zero weight detector 308c, . . . , and the Xth zero weight detector 308x may detect a zero value on a respective reduced weight value in a filter0, a filter1, a filter2, . . . , and a filterx respectively.

Each zero input data detector and each zero weight detector in each row of the systolic array 302 may be coupled to a respective reducer to receive a reduced input. Each zero input data detector may receive a reduced input data element and each zero weight detector may receive a reduced weight. For example, the first zero input data detector 306a may be coupled to a first reducer 307a and the first zero weight detector 308a may be coupled to a second reducer 309a, the second zero input data detector 306b may be coupled to a third reducer 307b and the second zero weight detector 308b may be coupled to a fourth reducer 309b, the third zero input data detector 306c may be coupled to a fifth reducer 307c and the third zero weight detector 308c may be coupled to a sixth reducer 309c, and the Xth zero input data detector 306x may be coupled to an Xth reducer 307x and the Xth zero weight detector 308x may be coupled to an Yth reducer 309x.

The reducers 307a-307x and 309a-309x may be implemented as a separate entity external to the systolic array 302. For example, the reducers 307a-307x and 309a-309x may be part of a circuit separate from the systolic array. In some embodiments, the circuit and the systolic array 302 may be part of a computing engine, which may perform arithmetic computations for the convolution operations. In other embodiments, the reducers 307a-307x and 309a-309x may be implemented as part of the systolic array 302.

In some embodiments, the first reducer 307a and the second reducer 309a may be a first shared reducer and the third reducer 307b and the fourth reducer 309b may be a second shared reducer and the fifth reducer 307c and the sixth reducer 309c may be a third shared reducer and the Xth reducer 307x and the Yth reducer 309x may be an Xth shared reducer. Each shared reducer may provide a reduced input data element and a reduced weight. In some embodiments, each shared reducer may contain one output bus and may select a reduced input to produce. In other embodiments, each shared reducer may contain multiple output buses and may output a reduced input data element and a reduced weight.

The zero input data detectors 306a-306x and/or zero weight detectors 308a-308x can be arranged before the respective reducers 307a-307x, 309a-309x such that a zero input can be detected, and if the zero input is detected, then the respective reducer(s) 307a-307x, 309a-309x can be non-operational to conserve power. In some embodiments, both the zero input data detectors 306a-306x and respective reducers 307a-307x can receive the input datasets and operate in parallel instead of sequentially. Further, both the zero weight detectors 308a-308x and the respective reducers 309a-309x can receive the filters and operate in parallel instead of sequentially.

Each of the input dataset0, the input dataset1, the input dataset2, . . . , and the input datasetx may belong to an image, a text, a video clip, an audio clip, or another type of dataset which may need to be processed by a neural network processor for convolution computations.

In some instances, the input dataset0, the input dataset1, the input dataset2, . . . , and the input datasetx may be associated with output dataset0, output dataset1, output dataset2, ..., output datasety generated by an intermediate layer of the convolution operation. For example, the output dataset0, output dataset1, output dataset2, ..., output datasety may go through activation functions and be fed back to the systolic array 302 as the input dataset0, the input dataset1, the input dataset2, ..., and the input datasetx. The filter0, the filter1, the filter2, ..., and the filterx may include different sets of weight values to convolve with the input dataset0, the input dataset1, the input dataset2, ..., and the input datasetx. The weight values in the filter0, the filter1, the filter2, ..., and the filterx may be pre-determined using supervised learning, non-supervised learning, or any suitable method of determining convolution filters.

Each zero input data detector for the respective row may detect whether a reduced input data element from the input dataset entering the respective row is "0" and generate a corresponding zero input data indicator for that reduced input data element. Further, each zero input data detector for the respective row may also detect whether an input data element from the input dataset entering the respective reducer is "0" and generate a corresponding zero input data indicator for that input data element. The corresponding zero data element indicator may be passed into the first PE of the respective row along with the reduced input data element. For example, the PE 00 may be the first PE of the first row in the systolic array 302. The PE 00 may receive reduced input data elements from the input dataset0 prior to other PEs in the first row (e.g., PE 01, PE 02, ..., PE 0y). In some embodiments, one reduced input data element at a time may be fed sequentially, in uniform time periods, from the input dataset0 to the PE 00. The first zero input data detector 306a may generate the zero data element indicator 226 in each of the uniform time periods (e.g. clock cycles) for each input data element from the input dataset0. The zero data element indicator 226 may be fed to the PE 00 sequentially, in uniform time periods, along with each reduced input data element. The PE 00 may or may not store the reduced input data element 222 based on the value of the respective data load signal 242. In some embodiments, the first zero input data detector 306a may include a comparator to compare the incoming reduced input data element with a zero to assert (e.g., set to "1") or de-assert (e.g., set to "0") the zero data element indicator 226 based on the value of the incoming reduced input data element. For example, the comparator may be implemented using an OR, XOR, NAND, or any suitable circuit.

Each zero weight detector for the respective row may detect whether a reduced weight from a set of reduced weights entering the respective row is zero and generate a corresponding zero weight indicator for the reduced weight. Further, each zero weight detector may also detect whether a weight from a set of filters entering the respective reducers is zero and generate a corresponding zero weight indicator for that weight. For example, the first zero weight detector 308a may detect whether a reduced weight from the filter0 (e.g., the reduced weight 224) includes a zero value and generate the zero weight indicator 228 for the reduced weight. In some embodiments, the first zero weight detector 308a may include a comparator to compare the reduced weight with a zero to assert (e.g., set to "1") or de-assert (e.g., set to "0") the zero weight indicator 228. For example, the comparator may be implemented using an OR, XOR, NAND, or any suitable circuit. In one embodiment, a reduced weight, one at a time, may be fed sequentially, in uniform time periods, from the filter0 to the PE 00 for pre-loading the respective reduced weights to the PE 00 to the PE 0y prior to starting the arithmetic computations. The first zero weight detector 308a may generate a corresponding zero weight indicator for each of those reduced weights which may be fed to the PE 00 sequentially, in uniform time periods, along with the corresponding reduced weight. The PE 00 may pass the respective reduced weight and the corresponding zero weight indicators sequentially to the next neighboring PE until all the PEs in the first row have been preloaded with the respective reduced weights and the corresponding zero weight indicators. The respective reduced weights and the corresponding zero weight indicator may be cached in each PE before the respective reduced input data elements are fed to each row in the systolic array 302.

The second zero input data detector 306b, the third zero input data detector 306c, ..., and the Xth zero input data detector 306x may be similar to the first zero input data detector 306a, and may generate a respective zero data element indicator, similar to the zero data element indicator 226, to provide to the PE 10, PE 20, ..., and PE x0, sequentially, in the uniform time periods, for power optimization. The respective zero data element indicator generated for each row may be received by a respective first PE in each row via the respective row input bus 102, and propagated, sequentially, in the uniform time periods, by the first PE to all the PEs in the given row. The second zero weight detector 308b, the third zero weight detector 308c, ..., and the Xth zero weight detector 308x may be similar to the first zero weight detector 308a, and may generate a respective zero weight indicator, similar to the zero weight indicator 228, to provide to the PE 10, PE 20, ..., and PE x0, sequentially, to pre-load each PE in the respective row along with the respective weight value prior to starting the arithmetic computations.

In some embodiments, the zero input data detectors 306a-306x, and the zero weight detectors 308a-308x may be implemented as a separate entity external to the systolic array 302. For example, the zero input data detectors 306a-306x, and the zero weight detectors 308a-308x may be part of a circuit 304. In other embodiments, the circuit 304 and the systolic array 302 may be part of a computing engine, which may perform arithmetic computations for the convolution operations. Some embodiments of the disclosed technologies can provide reduced gate count and dynamic power consumption by detecting zeros on the input data elements and the weights entering a respective first PE in each row of the systolic array, and passing the zero indicators to all the PEs in the array as compared to using respective zero detectors within each PE in the systolic array 302.

The outputs of a row of the systolic array 302 can be provided to a plurality of reducers for reducing and rounding the outputs using stochastic rounding. For example, PE x0 of the systolic array 302 can provide an output to reducer 311a, PE x1 can provide an output to reducer 311b, PEx2 can provide an output to reducer 311c, and PExy can provide an output to reducer 311x. The reducers 311a-311x may be implemented as a separate entity external to the systolic array 302. For example, the reducers 311a-311x may be part of a circuit separate from the systolic array 302. Further, the reducers 311a-311x may be part of an output buffer of the systolic array 302. In some embodiments, the circuit and the systolic array 302 may be part of a computing engine, which may perform arithmetic computations for the convolution operations. In other embodiments, the reducers 311a-311x may be implemented as part of the systolic array 302.

Note that FIG. 3 only shows the respective zero data element indicator and the zero weight indicator entering the first PE in each row of the systolic array 302 for ease of illustration, however it will be understood that each PE in the respective row of the systolic array 302 may also receive the respective reduced input data element and the respective reduced weight along with some control signals (e.g., opcode 230, weight load 232, data type, etc.), which may be propagated from the left to the right of the systolic array 302 for each row.

FIG. 4A shows an example reduction system 400A (e.g., a 32-bit floating-point ("FP32") reduction system) according to an example implementation. The reduction system 400A includes a multiplexer 402, a rounding identifier, and a reducer 405. The reducer 405 may reduce input of an arbitrary bit-length to the maximum bit-length supported by elements of a systolic array during a single-pass computation. For example, the reducer 405 may reduce input to a 22-bit input where 22-bits is the maximum bit-length supported by a multiplier of the systolic array. The reducer 405 can include an exponent expander 406, a rounder 408, and a trailing bit reducer 410. In some embodiments, the reducer 405 may include the exponent expander 406. In other embodiments, the reducer 405 may not include the exponent expander 406. For example, the reducer 405 may not expand the exponent of an input to generate the reduced input. In some embodiments, the multiplexer 402 may be separate from the reducer 405. In other embodiments, the reducer 405 may include the multiplexer 402. As previously discussed, the reducer 405 processes an original number 401A to result in a reduced number 403A.

The reduction system 400A may receive one or more numbers to be reduced. The one or more numbers may include one or more of an input data element 221 and/or a weight 223. For example, the reduction system 400A can receive a FP32 weight and an FP32 input data element. In some embodiments, the reduction system 400A may receive the input data element 221 or the weight 223 without a multiplexer.

The multiplexer 402 may receive the one or more numbers received by the reduction system 400A. The multiplexer 402 may also receive an opcode 230 or other indicator of whether a weight or input data element should be selected. The multiplexer 402 may decode the opcode 230 to select a number to be operated on by the reduction system 400A. The multiplexer 402 may output a different number for the reduction operation based on the value of the opcode 230. In some embodiments, a first opcode value may correspond to an instruction to output the weight 223 as the multiplexer output 420 and a second opcode value may correspond to an instruction to output the input data element 221 as the multiplexer output 420. For example, once the input data element 221 and the weight 223 have been provided to the reduction system 400A, the multiplexer 402 may output the input data element 221 and, at a later time, the weight 223, based at least in part on the opcode 230.

In the example of FIG. 4A, the original number 401A is an FP32 number with a sign bit portion, an exponent bit portion, and a significand bit portion. It will be understood that the original number 401A can be any arbitrary bit-length number with any exponent bit-length and/or significand bit-length. The FP32 format of the original number 401 includes a 1-bit sign, an 8-bit exponent, and a 23-bit significand. In some embodiments, the original number 401A may include more, less, or different bits. Further, the original number 401A may include more, less, or different bits for the sign bit portion, the exponent bit portion, and/or the significand bit portion.

The exponent expander 406 may receive the 8-bit exponent 428 from the original number 401A. The exponent expander 406 may increase a quantity of bits representing the exponent 428 from 8 bits to 10 bits. In some embodiments, the exponent expander 406 may add 1, 2, 3, or any number of bits to the exponent 428. The added quantity of bits can be sufficient to represent the number in a format expected by the PE (e.g., the PE may expect a 10-bit exponent). In other embodiments, the exponent expander 406 may not add any bits to the exponent 428. For example, the exponent expander 406 (or another component) may determine that a sufficient (e.g., adequate) quantity of bits are included in the exponent 428 and may not expand the exponent 428.

The exponent expander 406 may expand the exponent 428 and retain the value of the exponent 428. The exponent expander 406 may expand the exponent using range translation by copying the most significant bit, appending a second, inverted, copy of the most significant bit, and appending the other bits of the exponent 428 to the end of the expanded exponent 434. For example, if the exponent 428 has a value of "10101010", the exponent expander 406 may copy the most significant bit "1", invert the most significant bit once "0", and append the final seven bits "0101010" such that the expanded exponent 434 is "100101010". In some embodiments, the expand expander 406 may perform a different operation if the exponent begins with a leading zero. Further, the exponent expander 406 may expand the exponent using range translation by copying the most significant bit, appending a second copy of the most significant bit, and appending the other bits of the exponent 428 to the end of the expanded exponent 434. For example, if the exponent 428 is "00000000," the exponent expander 406 may expand the exponent 428 such that the expanded exponent 434 is "000000000." In some embodiments, the exponent expander 406 might add the extra bits of data to any location of the exponent field depending on the endian format and signed or unsigned representation of the exponent. Therefore, the exponent expander 406 can expand the exponent 428 to generate the expanded exponent 434.

The exponent expander 406 may provide the expanded version of the exponent 434 as the 10-bit expanded exponent field of the reduced number 403A.

The reducer 405 may further receive the rounding identifier 404. The rounding identifier 404 may identify a type of rounding to be performed by the reducer 405. For example, the rounding identifier 404 may identify a rounding method such as stochastic rounding, rounding to nearest even, rounding to zero, rounding down, rounding up, or any other rounding method. Stochastic rounding may include randomly rounding to the next larger or smaller number. For example, stochastic rounding may include a 50% probability of rounding down and a 50% probability of rounding up. Further, in stochastic rounding, the probability of rounding up or rounding down may be based on the relative position of the number to be rounded. For example, a number x between y and z may have a first probability of rounding up to z equal to $(x-y)/(z-y)$ and a second probability of rounding down to y equal to $(z-x)/(z-y)$ where y and z can be any numbers and x can be any number between y and z. Rounding to the nearest even may include rounding to the nearest even number with a particular number of bits, rounding to zero may include rounding a particular number of bits to zero, rounding up may include rounding a particular number of bits up, and rounding down may include rounding a particular number of bits down. The rounding identifier 404 may be provided by a user (e.g., via a user interface), another system, etc. Further, the rounding identifier 404 may be a custom rounding identifier or a default rounding identifier.

The reducer 405 may contain a rounder 408 to round the significand 430. The rounder 408 may perform rounding based on the rounding method identified by the rounding identifier 404. For example, the rounding method may be stochastic rounding, rounding to nearest even, rounding to zero, rounding down, rounding up, or any other rounding method. The rounder 408 may perform the rounding based on any bit of the significand. Further, the rounder 408 may determine a number of bits to be reduced by the trailing bit reducer 410 (e.g., a number of bits to be zeroed) and may initiate the rounding at the bit immediately prior to the bits to be reduced. Further, the rounder 408 can round the bits to be reduced by the trailing bit reducer 410. For example, if the significand 430 includes bits "1110111" and the trailing bit reducer 410 determines that the trailing bit reducer 410 will reduce the three trailing bits (e.g., the first three bits reading from the left to right), the rounder 408 may perform rounding based on the "0" in position 4. Further, if the rounder 408 determines to perform rounding to zero, the rounder 408 may produce a rounded significand 432 "1110000," if the rounder 408 determines to perform rounding up, the rounder 408 may produce a rounded significand 432 "1111000," etc. In some embodiments, the rounder 408 may be located logically after the trailing bit reducer 410 and the rounder 408 may round a reduced significand.

The reducer 405 may further contain the trailing bit reducer 410 to reduce the bit representation of the rounded significand 432. The trailing bit reducer 410 may receive the rounded significand 432 as input. The trailing bit reducer 410 may identify a number of bits to reduce from the rounded significand 432. The number of bits to reduce may be based on a difference between the bit-length of the rounded significand 432 and a maximum single-pass computational bit-length supported by elements of the systolic array. Further, the number of bits may be based on a user input or system input (e.g., an input identifying a maximum number of bits supported). The number of bits may be trailing bits of the rounded significand 432 (e.g., a number of rightmost bits or the least significant bits). For example, if the trailing bit reducer 410 determines 3 bits should be reduced from the rounded significand 432, the trailing bit reducer 410 may identify the 3 bits from right to left in the rounded significand 432. Further, the bits may correspond to positions 0, 1, and 2 within the original number 401A. The trailing bit reducer 410 may identify the bits and zero the bits (e.g., reduce, eliminate, push to logical zero). In the example of FIG. 4A, the trailing bit reducer 410 identifies that 12 bits should be reduced from the rounded significand 432 and zeros the trailing 12 bits of the rounded significand 432. By reducing the bit representation of the rounded significand 432, the trailing bit reducer 410 can generate a reduced significand 436 that includes only the non-reduced (non-zeroed) bits of the significand 430.

The trailing bit reducer 410 may provide the reduced significand 436 as the 11-bit rounded significand of the reduced number 403A.

The reduced number 403A may be a second bit-length wherein the second bit-length is any number of bits smaller than the first bit-length. In some embodiments, the second bit-length may be the maximum bit-length supported by elements of the systolic array. It will be understood that the reduced number 403A can be any arbitrary bit-length number with any exponent bit-length and/or significand bit-length. In the example of FIG. 4A, the reduced number 403A may be an 22-bit floating-point number with a sign bit portion, an exponent bit portion, and a significand bit portion and the original number 401A may be a 32-bit floating-point number. The reduced number 403A may contain a 1-bit sign (e.g., the sign 426), a 10-bit exponent (e.g., the expanded exponent 434), and an 11-bit significand (e.g., the reduced significand 436). The reduction system 400A may provide the reduced number 403A as a reduced output 421. The reduced output 421 may be a reduced input data element 222, a reduced weight 224, or any other reduced number.

FIG. 4B shows an example reduction system 400B (e.g., a 32-bit floating-point ("FP32") reduction system) according to an example implementation. The reduction system 400B may include a reducer 405 that may reduce input of an arbitrary bit-length to the maximum bit-length supported by elements of a systolic array during a single-pass computation. For example, the reducer 405 may reduce input to a 22-bit input where 22-bits is the maximum bit-length supported by a multiplier of the systolic array. The reduction system 400B includes components similar to the reduction system 400A except that in FIG. 4B an original number 401B is rounded by a system prior to provision to the reduction system 400B.

In the example of FIG. 4B, the original number 401B may be a FP32 number with a sign bit portion, an exponent bit portion, and a significand bit portion. It will be understood that the original number 401B can be any arbitrary bit-length number with any exponent bit-length and/or significand bit-length The FP32 format of the original number 401B includes a 1-bit sign, an 8-bit exponent, and a 23-bit rounded significand. In some embodiments, the original number 401B can include any number of bits or be associated with any other bit format. The 23-bit rounded significand may be rounded by a system external or internal to the reduction system 400B.

The reducer 405 may further contain the trailing bit reducer 410 to reduce the rounded significand 450. The trailing bit reducer 410 may receive the rounded significand 432 as input and reduce the quantity of bits representing the rounded significand 450 (e.g., from 23-bits to 11-bits). The trailing bit reducer 410 can generate a reduced significand 452 that includes only the non-reduced (non-zeroed) bits of the rounded significand 450. Further, the trailing bit reducer 410 may provide the reduced significand 452 as the 11-bit rounded significand of the reduced number 403B.

In some embodiments, the reduction system 400B may not receive the rounding identifier 404. For example, the rounding identifier 404 may be provided to the system rounding generating the rounded significand 450 in order to identify a rounding method. The reduction system 400B may provide the reduced number 403B as a reduced output 441. The reduced output 441 may be a reduced input data element 222, a reduced weight 224, or any other reduced number.

Figure 4C:
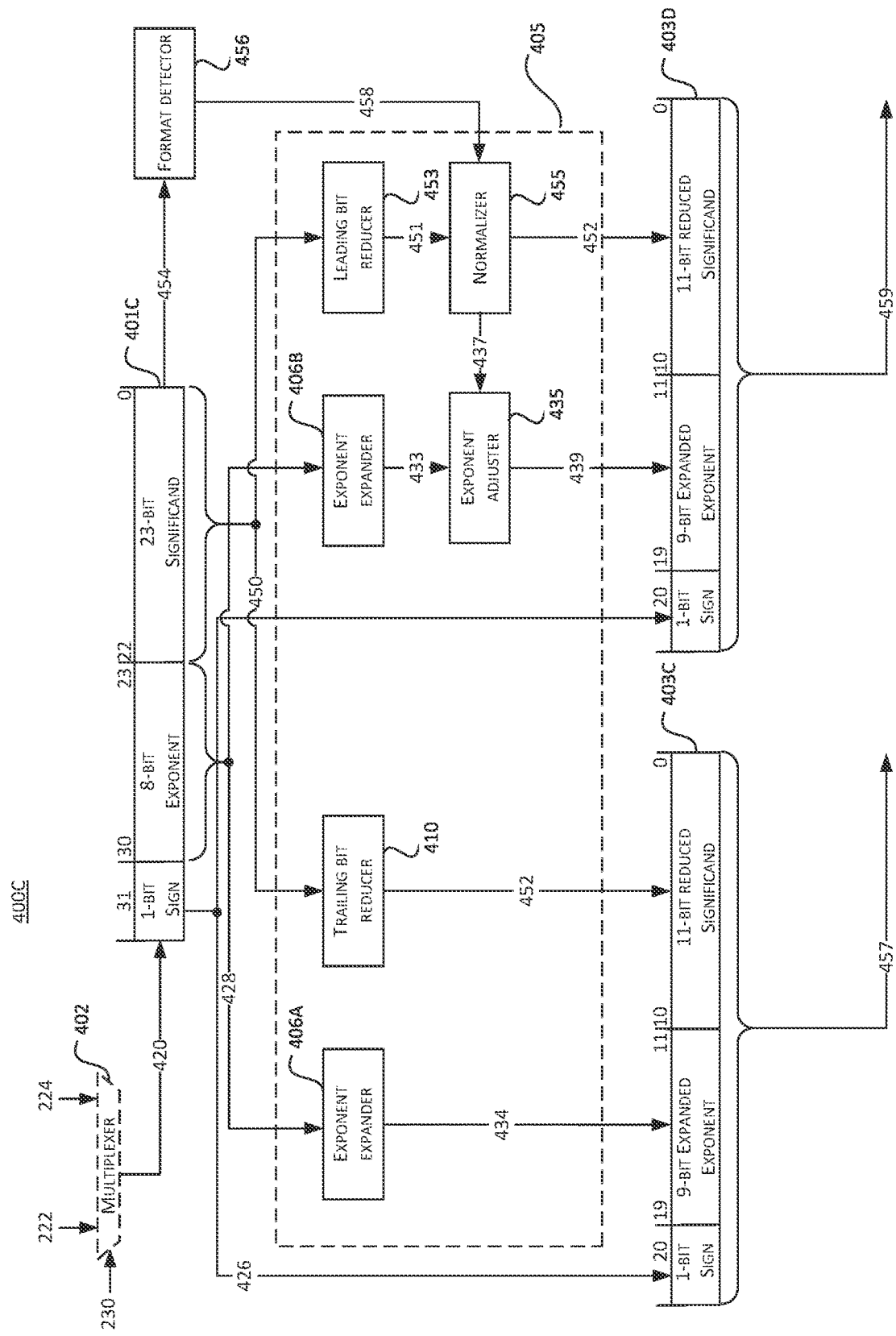
FIG. 4C illustrates a reducer showing the generation of multiple reduced inputs from a selected input, according to some examples of the disclosed technologies.

FIG. 4C shows an example reduction system 400C (e.g., a 32-bit floating-point ("FP32") reduction system) according to an example implementation. The reduction system 400C may include a reducer 405 that may reduce input of an arbitrary bit-length to multiple reduced inputs with a maximum bit-length supported by elements of a systolic array during a single-pass computation. For example, the reducer 405 may reduce input to a 21-bit input where 21-bits is the maximum bit-length supported by a multiplier of the systolic array. The reduction system 400C includes components similar to the reduction system 400A and 400B except that in FIG. 4C an original number 401C is converted into multiple reduced inputs by the reducer 405.

In the example of FIG. 4C, the original number 401C may be a FP32 number with a sign bit portion, an exponent bit portion, and a significand bit portion. It will be understood that the original number 401C can be any arbitrary bit-length number with any exponent bit-length and/or significand bit-length. The FP32 format of the original number 401C includes a 1-bit sign, an 8-bit exponent, and a 23-bit rounded significand. In some embodiments, the original number 401C can include any number of bits or be associated with any other bit format.

The original number 401C as an input 454 may be provided to the format detector 456 for normal and/or denormal detection. For example, the format detector 456 may be a denormal detector and/or a normal detector. The format detector 456 may detect whether the input 454 is normal or denormal based at least in part on at least one of the value of the 1-bit sign, the value of the 8-bit exponent, or the value of the 23-bit significand. For example, the format detector 456 may detect a denormal number when the 8-bit exponent contains zeros in each bit and the significand is nonzero. The format detector 456 may provide an enable signal 458 to the normalizer 455 based at least in part on the detection of a normal number. For example, if the format detector 456 detects that the input 454 is normal, the format detector 456 may provide a first value to the normalizer 455. If the format detector 456 detects that the input 454 is denormal, the format detector 456 may provide a second value to the normalizer 455. In some implementations, the first number may be a 1 and the second number may be a 0. The detection of a normal number may correspond to a logical high and the detection of a denormal number may correspond to a logical zero. In some embodiments, the format detector 456 may detect a normal number by zeroing out the significand 450 (e.g., replacing the significand 450 with zeros) and subtracting the original number 401C with the reduced significand 451 from the original number 401C with the zeroed significand to generate a normal identifier. Further, the normal identifier may contain the implied leading bit if the original number 401C is normal and may equal zero if the original number 401C is denormal.

The reducer 405 may provide the 1-bit sign as a 1-bit sign of the reduced number 403C and the reduced number 403D.

The reducer 405 may further contain the trailing bit reducer 410 and the leading bit reducer 453 to reduce the significand 450. The trailing bit reducer 410 and the leading bit reducer 453 may receive the significand 432 as input and reduce the quantity of bits representing the significand 450 (e.g., from 23-bits to 11-bits). The trailing bit reducer 410 can generate a reduced significand 452 that includes only the non-reduced (non-zeroed) bits of the significand 450 by removing trailing (or low) bits of the significand 450. The leading bit reducer 453 can generate a reduced significand 451 that includes only the non-reduced (non-zeroed) bits of the significand 450 by removing high bits of the significand 450. Further, the trailing bit reducer 410 may provide the reduced significand 452 as the 11-bit reduced significand of the reduced number 403C and the leading bit reducer 453 may provide the reduced significand 451 as the input to the normalizer 455.

As discussed above, the reducer 405 may further contain the exponent expander 406A and 406B to expand the exponent 428. The exponent expander 406A can generate an expanded exponent 434 and may provide the expanded exponent 434 as an exponent of the reduced number 403C and the expanded expander 406B may provide the expanded exponent 433 as the input to the exponent adjuster 435.

The reducer 405 may contain the normalizer 455 (e.g., a shifter). The normalizer 455 may be enabled based at least in part on the enable signal 458 received from the format detector 456. The normalizer 455 may receive the reduced significand 451 from the leading bit reducer 453. The normalizer 455 may shift the reduced significand 451 based at least in part upon the number of leading zeros of the reduced significand 451 (as detected by the normalizer 455). The normalizer 455 may further shift the reduced significand 451 such that the first non-zero number is shifted out of the reduced significand 451 and represented with an implied bit. The normalizer 455 may shift the reduced significand 451 by adding bits containing logical lows or zeros to the right or end of the reduced significand 451. The normalizer 455 may produce a shifted significand 452, wherein the shifted significand 452 may be the same number of bits as the reduced significand 451. For example, if the reduced significand 451 is 00001100000, then the normalizer 455 can count four zeros and further adjust the shift count to five, and the normalizer 455 may shift the reduced significand 451 a total of five times and produce a shifted significand 452 of 10000000000. The normalizer 455 may then provide the shifted significand 452 as the significand portion of the reduced number 403D. In the event that the format detector 456 does not identify the original number 401C is a normal number (e.g., the original number 401C is a denormal number), the normalizer 455 can provide the reduced significand 451 as the significand portion of the reduced number 403D. In some embodiments, if the format detector 456 determines the original number 401C is normal, the reducer 405 may calculate a zeroed number by zeroing the significand of the original number 401C. Further, the reducer 405 may generate the significand of the reduced number 403D by subtracting the reduced significand from the zeroed number. In other embodiments, the reduced number 403D may be determined by subtracting the reduced number 403C from the original number 401C.

The exponent expander 406B may provide the expanded version of the exponent 433 to the exponent adjuster 435 (e.g., a subtractor) based at least in part on the enable signal 458 when a normal format for the first input is detected by the format detector 456 and a signal 437 from the normalizer 455 identifying the renormalized significand 452. The exponent adjuster 435 may receive the expanded exponent 433 from the exponent expander 406B and a number of leading zeros from the normalizer 455. The number of leading zeros may identify the number of leading zeros removed by the normalizer 455 in order to renormalize the reduced significand 451. The exponent adjuster 435 may subtract a value from the expanded exponent 433 based at least in part on the leading zeros output by the normalizer 455. Therefore, the exponent adjuster 435 may compensate the exponent value for the shift of the significand. For example, if the leading zeros output is equal to 5 and the expanded exponent is equal to 000011111 or 31, the exponent adjuster 435 may subtract 5 from 000011111 or 31, such that the adjusted exponent 439 is equal to 000011010 or 26. The exponent adjuster 435 may provide the adjusted exponent 439 as the 9-bit expanded exponent field of the reduced number 403D. Otherwise, the expanded version of the exponent 433 can be stored as the 9-bit expanded exponent field of the reduced number 403D. In some embodiments, the exponent expander 406B may expand the exponent 433 prior to the normalizer 455 normalizing the reduced significand 451. In other embodiments, the exponent expander 406B may expand the exponent 433 after or in parallel with the normalizer 455 normalizing the reduced significand 451.

The reduction system 400C may provide the reduced number 403C and the reduced number 403D as reduced inputs 457 and 459 for the original number 401C. The reduced inputs 457 and 459 may be reduced input data elements 222, reduced weights 224, or any other reduced numbers.

As noted above, a systolic array may generate a plurality of outputs. Further, the systolic array may provide the plurality of outputs to an output buffer (as discussed with reference to FIG. 6) that includes one or more reducers to round and reduce the numbers produced by a systolic array. As described in FIGS. 11A-11D, a reducer may include a rounder to round the data. Further, the rounder may include one or more random number generators to generate random numbers. The rounder can perform rounding operations using the generated random numbers.

In some embodiments, to generate the random number, a rounder can receive a number from the systolic array and identify a data stream associated with the number from a plurality of data streams. Further, the data stream may be associated with a respective state value representing a current position for the data stream. The reducer can identify a random number generator that is associated with a particular random number sequence. The random number generator may generate a next random number in the random number sequence using a state value representing a position within the random number sequence. Based on the current position for the data stream, the rounder can initialize a state value of the random number generator and generate a random number using the initialized state value of the random number generator.

In some embodiments, to generate the random number, a rounder can identify a data type conversion associated with the number. The data type conversion may indicate a first bit-length (e.g., a bit-length of the number) and a second bit-length (e.g., a selected bit-length of the reduced number). The rounder can identify a random number generator that has a bit-length that matches a bit-length identified by the data type conversion. Further, the rounder can generate a random number using the identified random number generator.

Figure 11A:
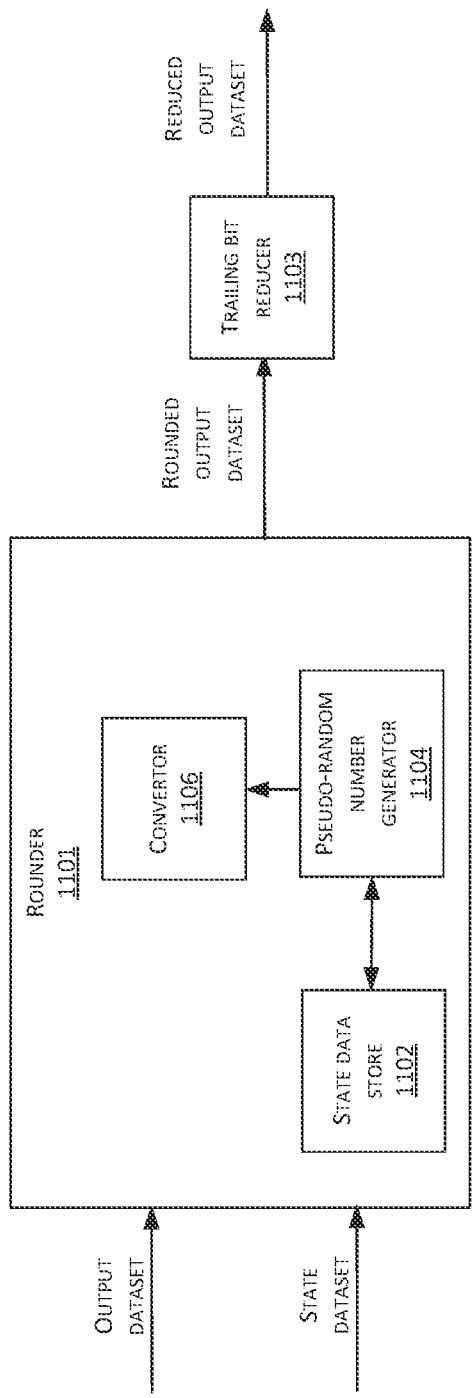
FIG. 11A illustrates a rounder showing the rounding of an output of a systolic array, according to some examples of the disclosed technologies.

As discussed above, the output of a systolic array may be reduced, by a reducer, into reduced outputs using stochastic rounding to maintain a higher level of precision of the outputs as compared to round-to-nearest rounding. The reducer may include a rounder to perform the stochastic rounding and the rounder may include a random number generator to generate random numbers for the stochastic rounding. Turning to FIG. 11A, to better illustrate operation of the rounder including a single random number generator for the stochastic rounding, the FIG. 11A shows an example reducer 1100A (e.g., a reducer for rounding an output based on a 12-bit random number) according to an example implementation. The reducer 1100A includes a rounder 1101 and a trailing bit reducer 1103. The rounder 1101 can include a state data store 1102, a pseudo-random number generator 1104, and a convertor 1106. As previously discussed, the rounder 1101 can round a received output. The rounder 1101 may perform stochastic rounding based on a rounding identifier that identifies that the rounder 1101 is to perform stochastic rounding. Further, the trailing bit reducer 1103 can reduce the rounded output to generate a reduced output.

As discussed above, the reducer 1100A may receive an output dataset (e.g., one or more outputs) for rounding. The output data set may include one or more numbers for rounding by the reducer 1100A. For example, the output dataset can include a binary floating point number for rounding. The rounder 1101 can round an output of a systolic array using stochastic rounding. For example, the rounder 1101 can round a significand of an output based on the rounding method. Further, the rounder 1001 can round the output by rounding any number of bits of the significand of the output.

To generate the rounded outputs, the rounder 1101 can generate a random number for rounding the outputs. Further, the rounder 1101 can generate the random number based on a state dataset. The state dataset may include one or more state values or seeds that are provided to a random number generator. The rounder 1101 can seed the pseudo-random number generator 1104 using the state dataset. The rounder 1101 may seed the pseudo-random number generator 1104 by providing the state dataset as an initial state value of the pseudo-random number generator 1104. In some embodiments, the rounder 1101 may seed (e.g., reseed) the pseudo-random number generator 1104 by replacing a current state value of the pseudo-random number generator 1104 with the state dataset. Therefore, it will be understood that the state dataset may include an initial state value and/or a reseeding state value. In some embodiments, multiple rounders of the reducer 1100A may receive a shared state dataset.

The pseudo-random number generator 1104 may generate the random number using the state dataset. The pseudo-random number generator 1104 may generate random numbers based on the initial state value that has been loaded into the pseudo-random number generator 1104 by the rounder 1101. For example, the pseudo-random number generator 1104 may be a maximal length linear feedback shift register that generates random numbers based on the initial state value. Therefore, the pseudo-random number generator 1104 may generate random numbers with a particular bit-length.

The pseudo-random number generator 1104 can route the random number to the convertor 1106. The convertor 1106 can receive both the random number and the output dataset (e.g., a particular number of the output dataset). Further, the convertor 1106 can round the output dataset by adding the random number to the output dataset. For example, the output dataset may be "101100011" and the random number may be "110." The convertor 1106 may add the random number to the output dataset to generate the rounded output dataset "101101001." Based on adding the random number to the output dataset, in some embodiments, the reducer 1100A (e.g., the rounder) can round the combination of the random number and the output dataset by reducing a number of trailing bits of the combination. Further, the reducer 1100A can round the combination with a probability based on the distance of the combination to a bit value. For example, the reducer 1100A can round the combination with a probability that is equal to the distance of the combination to a next higher bit value and the distance of the combination to a next lower bit value. Therefore, the convertor 1106 can generate the reduced output dataset.

In other embodiments, the rounded output dataset may include the combination of the random number and the output dataset and the rounder 1101 can provide the rounded output dataset to a trailing bit reducer 1103 to drop a number of bits from the rounded output dataset corresponding to the bit-length of the random number to generate a reduced output dataset. For example, the trailing bit reducer may reduce the rounded output dataset by dropping 3-bits of the rounded output dataset. In some embodiments, the rounder 1101 may provide an identifier indicating the size of the random number to the trailing bit reducer 1103. Therefore, the trailing bit reducer 1103 can generate the reduced output dataset.

The reducer 1100A may provide the reduced output dataset as output (e.g., to a system). For example, the reducer 1100A may provide the reduced output dataset to a user computing device.

Figure 11B:
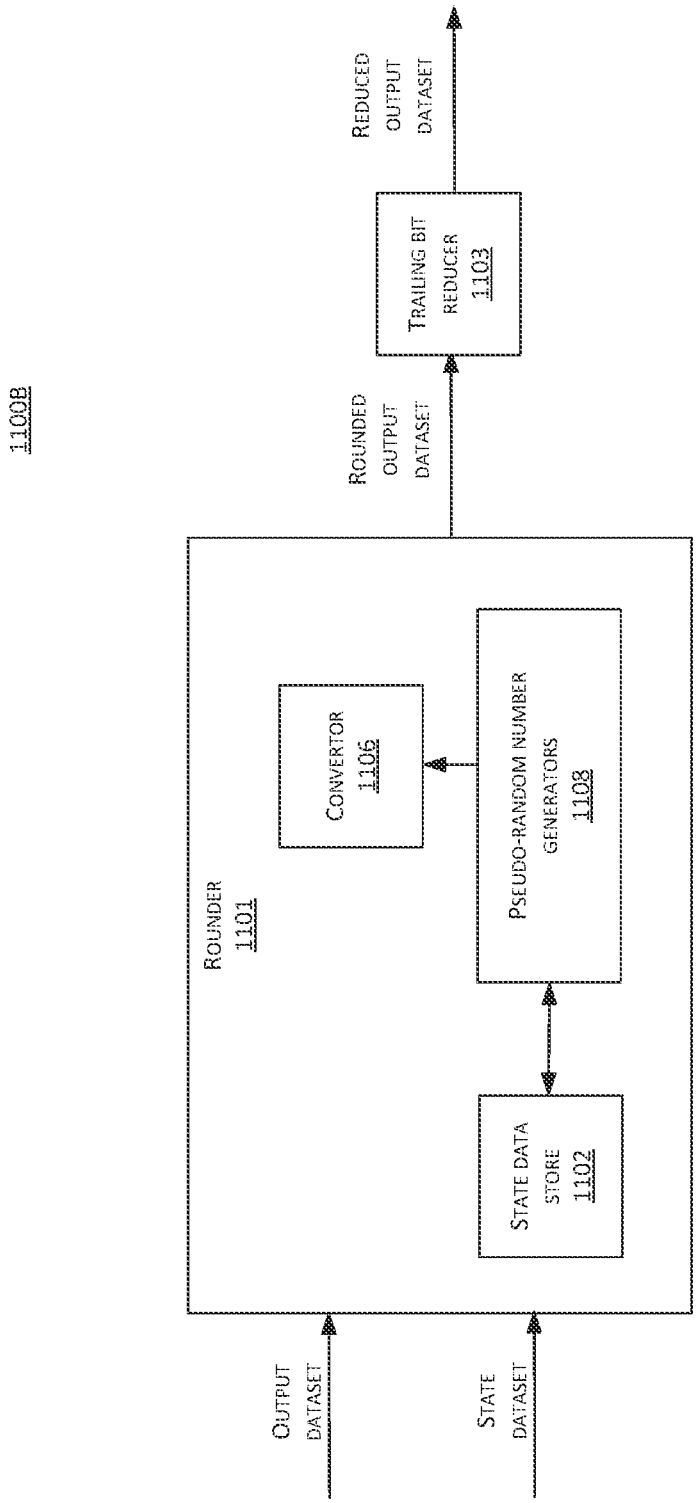
FIG. 11B illustrates a rounder showing the rounding of an output of a systolic array using multiple random number generators, according to some examples of the disclosed technologies.

As discussed above, the output of a systolic array may be reduced, by a reducer, into reduced outputs using stochastic rounding to maintain a higher level of precision of the outputs as compared to round-to-nearest rounding. The reducer may include a rounder to perform the stochastic rounding. As discussed below with reference to FIG. 11B, the rounder may include a plurality of random number generators and may select a random number generator to generate a random number for the stochastic rounding of the output of the systolic array. The use of a plurality of random number generators can enable the rounder to generate random numbers in parallel, perform rounding in parallel, etc. which can offer significant increases in performance of the reducer. FIG. 11B shows an example reducer 1100B that incudes multiple random number generators according to an example implementation. The reducer 1100B can include the elements of reducer 1100A and also include a plurality of pseudo-random number generators 1108.

As discussed above, the reducer 1100B may receive an output dataset (e.g., one or more outputs) from a systolic array for rounding. Further, based on obtaining the output dataset, the rounder 1101 can identify one or more characteristics of the output dataset. Further, the rounder 1101 can identify a random number generator of the plurality of pseudo-random number generators 1108 to generate a random number for the output dataset based on the one or more characteristics of the output dataset and/or characteristics of the random number generator. In some embodiments, the rounder 1101 can select a particular random number generated by the plurality of pseudo-random number generators 1108. For example, the plurality of pseudo-random number generators may generate a plurality of random numbers. Therefore, the rounder 1101 can identify a particular random number generator of the plurality of pseudo-random number generators 1108 based on the characteristics of the output dataset and/or characteristics of the random number generator.

The plurality of random number generators may generate random numbers for parallel rounding operations. For example, a first random number generator and a second random number generator of the plurality of pseudo-random number generators 1108 may generate random numbers in parallel. Further, the plurality of pseudo-random number generators 1108 can provide the random numbers to the convertor 1106 in parallel. The convertor 1106 can round the output dataset by adding a random number of the random numbers to the output dataset. In some embodiments, the rounder 1101 can include multiple convertors that may round the output dataset (portions of the output dataset) in parallel. For example, a first convertor may round a first portion of the output dataset and a second convertor may round a second portion of the output dataset.

The rounder 1101 can provide the rounded output dataset to a trailing bit reducer 1103. In some embodiments, the rounder 1101 can provide the rounded output dataset to the trailing bit reducer 1103 in parallel. Further, the rounder 1101 can provide the rounded output dataset to a plurality of trailing bit reducers such that the plurality of trailing bit reducers 1103 can perform the bit reduction in parallel and generate reduced output datasets in parallel. Therefore, the trailing bit reducer 1103 can generate the reduced output dataset.

Figure 11C:
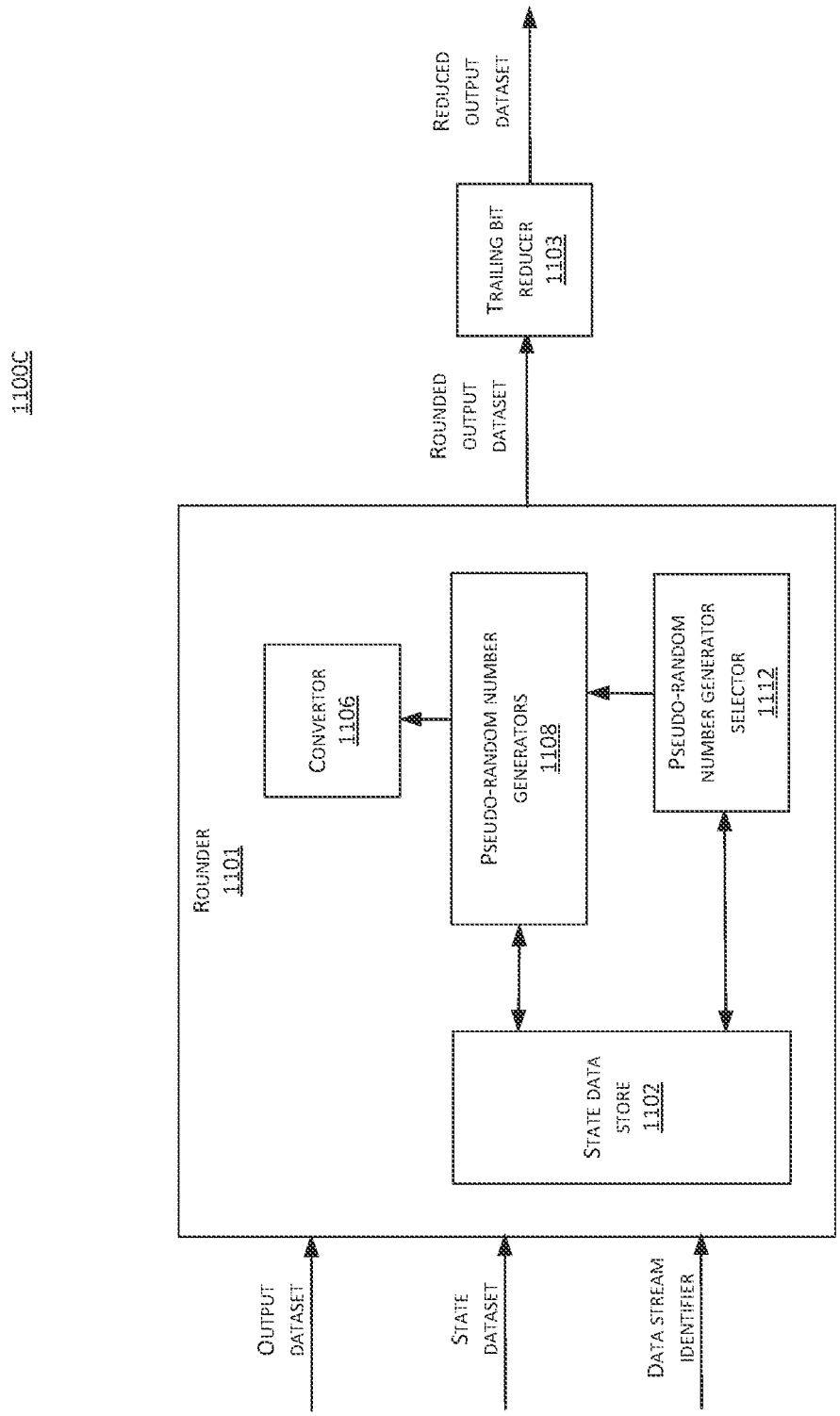
FIG. 11C illustrates a rounder showing the rounding of an output of a systolic array using a random number generator selected based on a data stream, according to some examples of the disclosed technologies.

As discussed above, the rounder may include multiple random number generators. However, a systolic array may operate with respect to multiple data streams (e.g., the systolic array may facilitate parallel operations with respect to two or more data streams). Accordingly, it may be beneficial to support rounding of such data streams in parallel. As noted above, each data stream may include a sequential set of data. However, there may be overlap between each the operations for each data stream. For example, a first data stream may be assigned to be rounded from 32-bits to 16-bits and a second data stream may be assigned to be rounded from 32-bits to 16-bits. Therefore, it may be advantageous to provide each data stream to the same rounder and round the data streams using random numbers generated by the same random number generator. By using random numbers generated by the same random number generator, the deterministic nature of the random number generator may not be retained. To enable deterministic rounding across each data stream, the reducer can maintain a state value for a particular data stream. Therefore, a rounder may include a plurality of random number generators and may initialize a random number generator to generate a random number based on a data stream of the output dataset. FIG. 11C shows an example reducer 1100C according to an example implementation. The reducer 1100C can include the elements of reducer 1100B and a random number generator selector 1112.

As discussed above, the reducer 1100C may receive an output dataset (e.g., one or more outputs) for rounding. The output dataset may include data from one or more data streams (e.g., one or more sequential sets of data). Further, the reducer 1100C may receive a data stream identifier to identify each of the one or more data streams for use in the rounding operation. The data stream identifier may specify the data stream. For example, the data stream identifier may identify a grouping of data (e.g., a grouping of sequential data). Further, the data stream identifier may identify a grouping of data associated with a particular block or chunk of data, a particular data source, a particular data destination, a particular time range, a particular machine learning application or operation, a particular client, etc. In some embodiments, the data stream identifier may be provided by a user computing device. For example, a user computing device may define the data stream by defining a particular block of data as corresponding to a particular data stream. In some embodiments, a user computing device may define the data stream by indicating that data received after the data stream identifier is received by the reducer 1100C and before the reducer 1100C receives a subsequent data stream identifier is associated with a particular data stream. As discussed further below, the data stream identifier can enable the reducer 1100C to initialize a random number generator with an appropriate per-stream state to round data of the data stream. Therefore, the reducer 1100C can maintain per-stream determinism with respect to rounding of the data stream"

The reducer 1100C may receive a state dataset (e.g., one or more state values or seeds) for use in the rounding operation. The one or more state values may include an initial state value for each of the data streams. In some embodiments, the one or more state values may include a common state value that is common to one or more data streams. For example, the one or more states values may include a shared state value for a first data stream and a second data stream.

The reducer 1100C may receive the output dataset, the state dataset, and/or the data stream identifier as a single band of instream data. For example, the rounder 1101 may receive the data stream identifier in band with the output dataset. In some embodiments, the reducer 1100C may receive the output dataset, the state dataset, and/or the data stream identifier as separate bands or streams of data. In other embodiments, the reducer 1100C can obtain the output dataset, the data stream identifier, and/or the state dataset from a data store (e.g., a local data store). Therefore, the reducer 1100C may receive the output dataset, the state dataset, and the data stream identifier. In some embodiments, the rounder 1101 can store the state dataset in a state data store 1102 of the rounder 1101 for the rounding operations. Further, the rounder 1101 can store the data stream identifier in a data stream data store.

The random number generator selector 1112 may identify a specific random number generator of the plurality of pseudo-random number generators 1108. Further, the random number generator selector 1112 can initialize the specific random number generator with a state value that is mapped to the data stream identifier. To initialize the random number generator, the random number generator selector 1112 may identify a state value from a state dataset of the state data store 1102 associated with the data stream identifier. Further, the random number generator selector 1112 may assign and/or map a particular state value of the state data store 1102 for use with the data stream identifier. For example, the random number generator selector 1112 may dynamically assign a particular state value in the state data store 1102 to a particular data stream identifier.

Further, the rounder 1101 can seed the identified random number generator with the identified state value. Therefore, the random number generator can generate a random number (e.g., a random number and/or an updated state value) using the state dataset. In some cases, the rounder 1101 can receive an updated state value (e.g., via the state data store 1102) and may reseed the identified random number generator with the updated state value. For example, the rounder 1101 can receive the updated state value for a particular data stream or for a group of data streams.

The convertor 1106 can round the output dataset by adding the random number to the output dataset that each correspond to the same data stream identifier. In some embodiments, the rounder 1101 can include multiple convertors that each may be assigned to round data associated with a particular data stream.

The rounder 1101 can provide the rounded output dataset to a trailing bit reducer 1103. In some embodiments, the rounder 1101 can provide the rounded output dataset to multiple trailing bit reducers that each may be assigned to perform bit reduction on output data associated with a particular data stream. Therefore, the trailing bit reducer 1103 can generate the reduced output dataset.

Figure 11D:
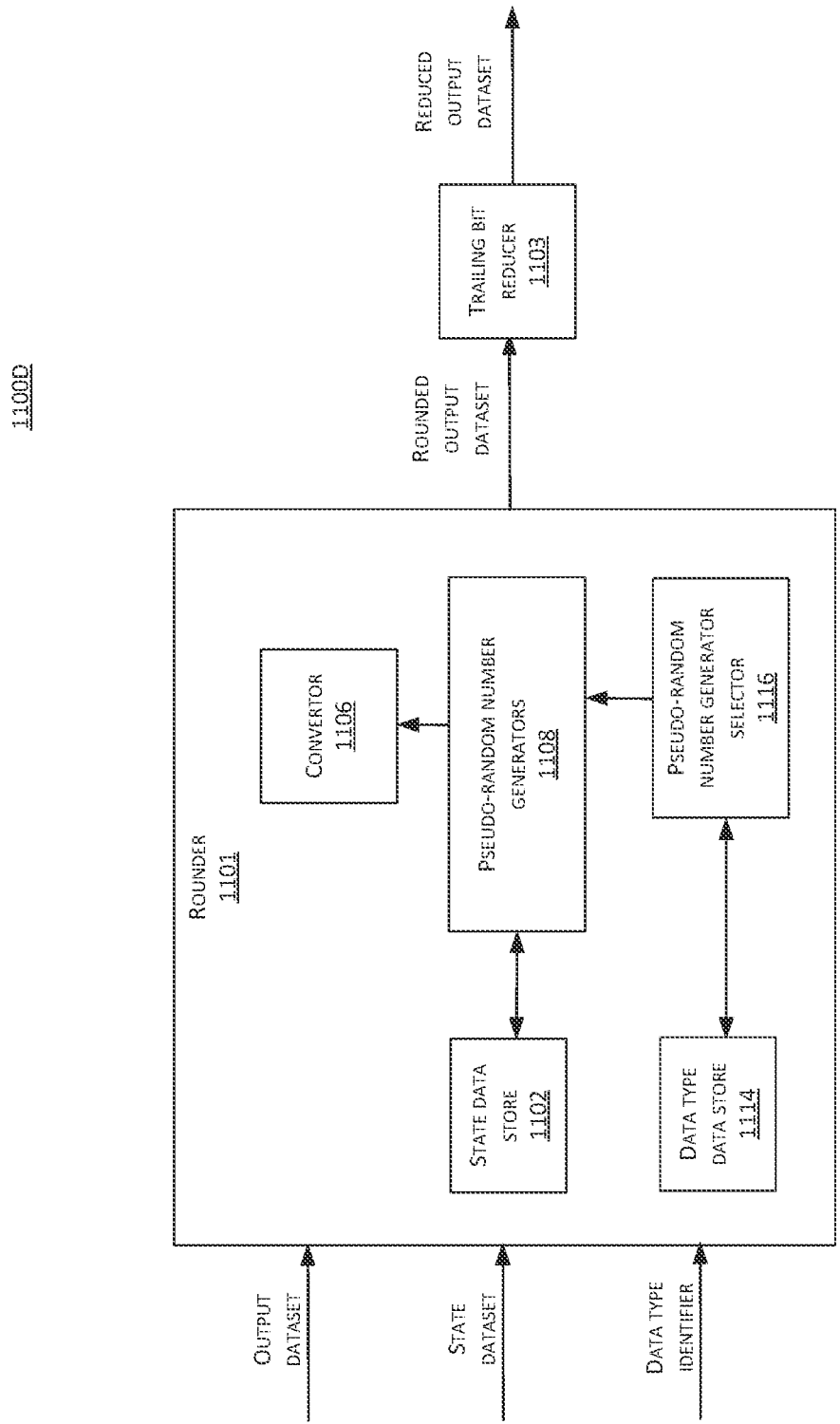
FIG. 11D illustrates a rounder showing the rounding of an output of a systolic array using a random number generator selected based on a data type, according to some examples of the disclosed technologies.

As discussed above, a systolic array may produce numbers with different bit-lengths for rounding to different bit-lengths. Therefore, it may be beneficial for a reducer to match the bit length of a random number used in rounding the number to the difference in bit-length (e.g., from the obtained number to the rounded number). As each random number generator may produce random numbers of a given bit length, a rounder with a single random number generator or multiple random number generators that generate random numbers with same bit-length may not be able to effectively round numbers with varying bit-lengths (e.g., varying input bit-lengths and/or varying output bit-lengths). To address this, the rounder may include multiple random number generators that may each generate random numbers of different bit-lengths and may select a random number generator to generate a random number based on the data type (e.g., the data type conversion) of the output dataset. FIG. 11D shows an example reducer 1100D according to an example implementation. The reducer 1100D can include the elements of reducer 1100B and also include a data type data store 1114 and a random number generator selector 1116.

As discussed above, the reducer 1100D may receive an output dataset (e.g., one or more outputs) for rounding. Further, the reducer 1100D may receive a data type identifier for use in the rounding operation. The data type identifier may specify a source/destination data type pair, a data type, a data type conversion, etc. For example, the data type identifier may specify that the output dataset is FP32 data and the rounded output dataset is to be FP16. Further, the data type identifier may identify a difference in bit-length between the output dataset (e.g., the significand of the output dataset) and the rounded output dataset (e.g., the significand of the rounded output dataset). For example, the data type specify that the difference in bit-length between the output dataset and the rounded output dataset is 6 bits. In some embodiments, the data type identifier may be provided by a user computing device. For example, a user computing device may define the data type by defining a rounding operation for the reducer 1100D. In some embodiments, a user computing device may define the data type by indicating that data received after the data type identifier is received by the reducer 1100D and before the reducer 1100D receives a subsequent data type identifier is associated with a particular data type. Therefore, the reducer 1100D can receive the output dataset and a data type identifier.

The reducer 1100D may receive the output dataset, the state dataset, and/or the data type identifier as a single band of instream data. For example, the rounder 1101 may receive the data type identifier in band with the output dataset. In some embodiments, the reducer 1100D may receive the output dataset, the state dataset, and/or the data type identifier as separate bands or streams of data. In other embodiments, the reducer 1100D can obtain the output dataset, the data type identifier, and/or the state dataset from a data store (e.g., a local data store). The rounder 1101 can store the state dataset in a state data store 1102 of the rounder 1101. Further, the rounder 1101 can store the data type identifier in a data type data store 1114.

The random number generator selector 1116 may identify a specific random number generator of the one or more pseudo-random number generators 1108 that is mapped to (e.g., generates random numbers with a bit-length that matches) the data type identifier. For example, the random number generator selector 1116 may identify a random number generator that generates random numbers with a bit-length that is equal to the difference between the bit-length of the output dataset and the bit-length of the rounded output dataset. By identifying a random number generator that generates random numbers with a bit-length that is equal to the difference between the bit-length of the output dataset and the bit-length of the rounded output dataset, the reducer 1100D can reduce the output dataset to a particular bit-length.

In some cases, the rounder 1101 may identify a state value from a state dataset associated with the data type identifier. Further, the rounder 1101 may assign and/or map a particular state value from the state data store for use with a data type identifier. For example, the rounder 1101 may dynamically assign a particular state value in the state data store 1102 to a particular data type identifier in the data type data store 1114.

Based on identifying the random number generator and the state value associated with the data type identifier, the rounder 1101 can seed the identified random number generator with the identified state value. Therefore, the random number generator can generate a random number (e.g., a random number and/or an updated state value) using the state dataset.

The convertor 1106 can round the output dataset by adding the random number to the output dataset. In some embodiments, the rounder 1101 can include multiple convertors that each may be assigned to round data associated with a particular data type.

The rounder 1101 can provide the rounded output dataset to a trailing bit reducer 1103. In some embodiments, the rounder 1101 can provide the rounded output dataset to multiple trailing bit reducers that each may be assigned to perform bit reduction on output data associated with a particular data type. Therefore, the trailing bit reducer 1103 can generate the reduced output dataset.

As discussed above, the rounder may include multiple random number generators. In some embodiments, a reducer may include multiple rounders, each with multiple random number generators, that may round and reduce output datasets in parallel. Therefore, as the systolic array may operate in parallel, it may be important for the reducer to round multiple outputs in parallel. Accordingly, a reducer may include multiple random number generators. One difficulty with the use of multiple random number generators is that while each random number generator may provide a deterministic output independently, changing the level of parallelism may alter their output overall. To address this, embodiments of the present disclosure can enable distinct random number generators to share a state. A final random number generator may save its state to enable subsequent random number generation by a reducer. Therefore, a reducer can enable deterministic random number generation.

Figure 12A:
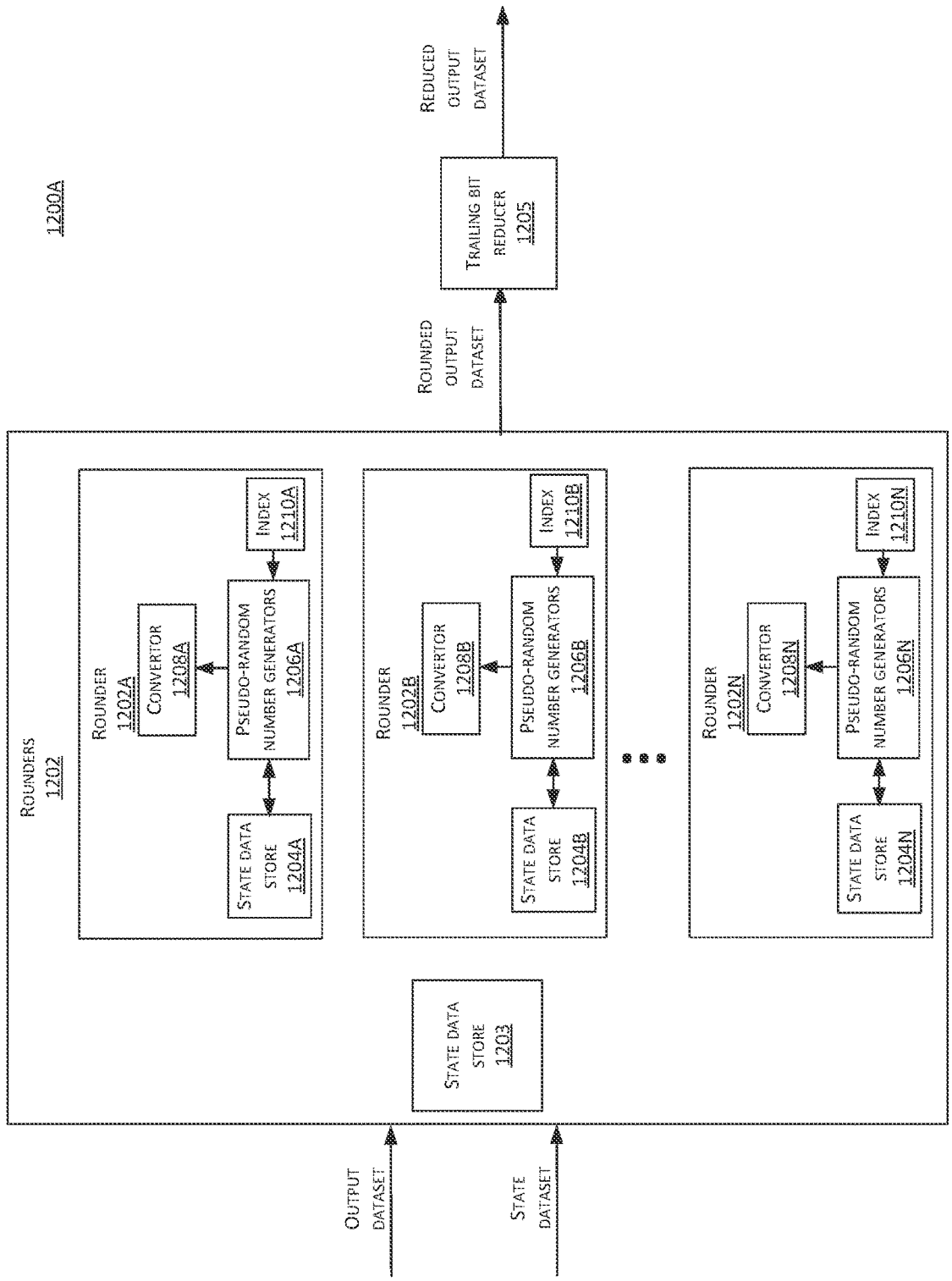
FIG. 12A illustrates a group of rounders showing the rounding of an output of a systolic array, according to some examples of the disclosed technologies.

To illustrate how a reducer with multiple rounders can round the output dataset, FIG. 12A shows an example reducer 1200A (according to an example implementation. The reducer 1200A includes a set of rounders 1202 for generating a rounded output dataset from an output dataset and a trailing bit reducer 1205 for reducing the rounded output dataset to generate a reduced output dataset. The set of rounders 1202 can include n rounders where n can be any number. In the example of FIG. 12A, the set of rounders 1202 includes rounder 1202A, 1202B, . . . , 1202N. Each rounder of the set of rounders 1202 can include a respective state data store, a respective one or more random number generators, a respective convertor, and a respective index. For example rounder 1202A can include a state data store 1204A, one or more pseudo-random number generators 1206A, a convertor 1208A, and an index 1210A, rounder 1202B can include a state data store 1204B, one or more pseudo-random number generators 1206B, a convertor 1208B, and an index 1210B, and rounder 1202N can include a state data store 1204N, one or more pseudo-random number generators 1206N, a convertor 1208N, and an index 1210N. As previously discussed, each of the set of rounders 1202 can round a received output.

In some embodiments, the set of rounders 1202 can include a common state data store 1203. For example, the set of rounders 1202 may not each include an individual state data store (e.g., the rounder 1202A may not include state data store 1204A). The reducer 1200A may receive a state dataset (e.g., one or more state values or seeds) for use in the rounding operation. One or more of the set of rounders 1202 can obtain the state dataset and store the state dataset in a common state data store 1203 of the rounder 1101. In some embodiments, a particular rounder may be designated (e.g., assigned) to obtain the state dataset and store the state dataset in the state data store 1203. In other embodiments, any of the set of rounders 1202 may obtain the state dataset and store the state dataset in the state data store 1203. Further, the rounder obtaining the state dataset and storing the state dataset may notify each of the other rounders that the state dataset has been stored. In some embodiments, each rounder may periodically or aperiodically monitor the state data store 1203 to determine if an updated state dataset has been stored. The set of rounders 1202 can store the state dataset with an identifier identifying one or more rounders that are to use the state dataset.

In other embodiments, the set of rounders 1202 can include individual state data stores (e.g., state data stores 1204A, 1204B, . . . , 1204N). The set of rounders 1202 may each obtain the state dataset and store the state dataset in a corresponding state data store. In some embodiments, the set of rounders 1202 may each obtain the state dataset from the state data store 1203 and store the state dataset in a corresponding state data store local to each particular rounder. In other embodiments, the set of rounders 1202 may each obtain the state dataset as streaming data and store the state dataset in a corresponding state data store local to each particular rounder.

To determine how to generate the rounded output datasets in parallel, the reducer 1200A may receive an index for each rounder of the set of rounders 1202. The index may identify a position of each random number generator for each rounder. Further, the index may identify a relative position of each random number generator of a plurality of random number generators. In some embodiments, the index may identify a relative position of each rounder of the set of rounders 1202. For example, the index may identify that the rounder 1202A is positioned first relative to the set of rounders 1202, the rounder 1202B is positioned second relative to the set of rounders 1202, and the rounder 1202N is positioned nth relative to the set of rounders 1202.

Each rounder of the set of rounders 1202 may store a portion of the index corresponding to the rounder. For example, the rounder 1202A may store a first portion of the index 1210A identifying a position of the rounder 1202A relative to the set of rounders 1202, the rounder 1202B may store a second portion of the index 1210B identifying a position of the rounder 1202B relative to the set of rounders 1202, and the rounder 1202B may store an nth portion of the index 1210N identifying a position of the rounder 1202N relative to the set of rounders.

Based on the relative position of the rounder, each rounder may determine a number of rounding operations to implement. Each rounding operation may include cycling a step value through the random number generator(s) of the rounder to generate an updated state value. In the example of FIG. 12A, rounder 1202A may perform a single rounding operation and may cycle a first state value through a random number generator to obtain an output, rounder 1202B may perform two rounding operations and may cycle a first state value through a random number generator to obtain an second state value and cycle the second state value through the random number generator (the same or a different random number generator) to obtain an output, and rounder 1202N may perform n rounding operations and may cycle n subsequent state values through a random number generator (the same random number generator or different random number generators) to obtain an output.

In some embodiments, the set of rounders 1202 may perform multiple rounding operations by passing an output dataset through multiple random number generators. In other embodiments, the set of rounders 1202 may perform multiple rounding operations by making multiple passes of the output dataset through one random number generator. Therefore, each of the set of rounders 1202 can generate a rounded number based on the index.

The reducer 1200A may further obtain a wave size identifier. The wave size identifier may identify a number of parallel rounding operations to be performed by the set of rounders 1202. For example, the wave size identifier may specify that a given chunk of data is separated into three sets of data that the set of rounders 1202 may round separately. Therefore, the wave size identifier may specify a wave size of three and three rounders of the set of rounders 1202 may round the three sets of data of the chunk of data in parallel and/or that three random number generators of a particular rounder may generate random numbers in parallel to round the number.

Based on the wave size identifier, each of the set of rounders 1202 may identify a subsequent state value for a next set of parallel operations. The set of rounders 1202 may each determine a same subsequent state value for the next set of parallel operations. By determining the same subsequent state value for each of the set of rounders, the reducer 1200A may maintain an even error distribution across the set of rounders 1202 and across a single data stream. Therefore, the set of rounders 1202 can perform a deterministic rounding operation in parallel.

In order to determine the same subsequent state value, each of the set of rounders 1202 may cycle a step value through one or more random number generators for a number of rounding operations equal to the wave size. For example if the wave size is five, each of the set of rounders 1202 may make five passes of a step value through a single random number generator or multiple random number generators. Based on the output of the random number generators, each of the set of rounders 1202 can identify an updated state value and store the updated state value in a respective state data store. Each of the set of rounders 1202 can store the same updated state value for use in subsequent rounding operations. Therefore, each of the set of rounders 1202 can generate a random number based on the index of the rounder and an updated state value based on the wave size of the parallel rounding operations.

Further, based on the wave size, each rounder of the set of rounders 1202 may assign a particular random number generator of each rounder to store a generated random number as an updated state value for the random number generator in the state data store. Based on the index of the rounder, each rounder of the set of rounders 1202 may assign a particular random number generator to generate a random number for rounding the output dataset.

As discussed above, each random number generator can route the random number to a convertor of the rounder. For example, a random number generator of the set of pseudo-random number generators 1206A can route a random number to convertor 1208A based on the index 1210A. The convertor can round the output dataset by adding the random number to a respective portion of the output dataset. For example, convertor 1208A can add a random number generated by pseudo-random number generators 1206A to a portion of the output dataset based on the index 1210A.

Each of the set of rounders 1202 can provide the rounded output dataset to a trailing bit reducer 1205 in parallel. In some embodiments, the set of rounders 1202 can provide the rounded output dataset to a set of multiple trailing bit reducers that each may be assigned to perform bit reduction on rounded output data in parallel. Therefore, the trailing bit reducer 1205 can generate the reduced output dataset.

Figure 12B:
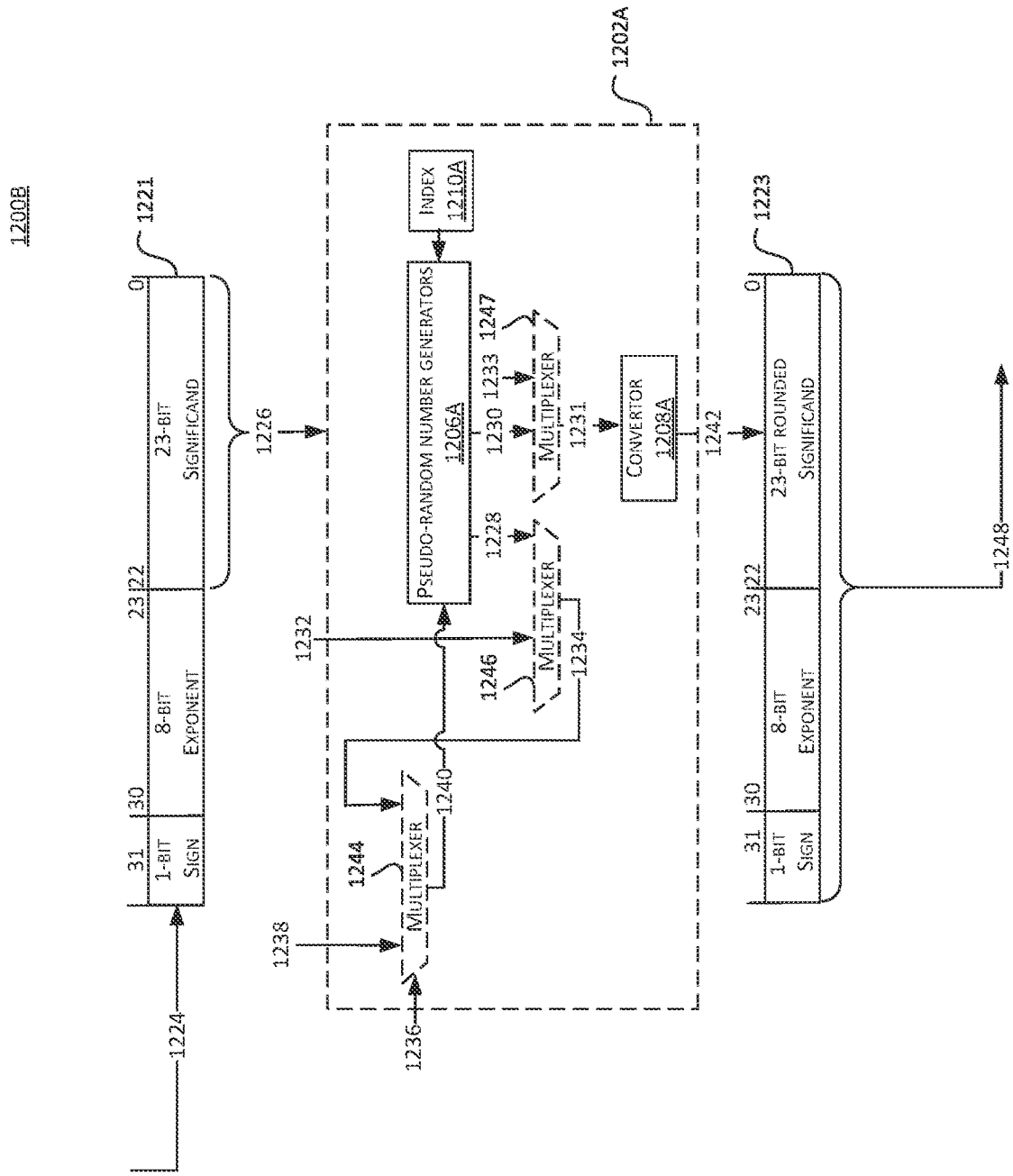
FIG. 12B illustrates a group of rounders showing the rounding of an output of a systolic array and a reseeding of the rounders, according to some examples of the disclosed technologies.

As discussed above, FIG. 12A shows a reducer that includes multiple rounders with multiple random number generators. FIG. 12B illustrates a data path of data that flows into the reducer of FIG. 12A and is rounded. Specifically, FIG. 12B illustrates how data provided to the reducer of FIG. 12B is rounded and output. FIG. 12B shows a reducer that includes distinct random number generators that share a state. Each random number generator can initialize with the shared state and cycle through n states. The final random number generator may save its state thus enabling subsequent random number generation for the rounder. Therefore, by sharing a state across multiple random number generators, the pattern of random number generation is deterministic even as parallelism is altered. As discussed above, FIG. 12B shows an example reducer 1200B (e.g., a 32-bit floating-point ("FP32") reducer) according to an example implementation. The reducer 1200A includes a rounder 1202A (e.g., rounder 1202A described in FIG. 12A). The rounder 1202A may round an arbitrary number of bits of an output. For example, the rounder 1202A may round the five trailing bits of a 22-bit output. The rounder 1202A may round the output for reduction of the output (e.g., so that the rounded trailing bits of the output can be dropped by a reduction system. Though not pictured in FIG. 12B, the reducer 1200B may include a trailing bit reducer to reduce the rounded output. As previously discussed, the rounder 1202A processes an original number 1224 to result in a rounded number 1223.

The reducer 1200B may receive the original number 1224 for rounding. The original number 1224 may be the output of a systolic array. In some embodiments, the reducer 1200B may receive multiple numbers for rounding. For example, the reducer 1200B may receive one or more inputs to a systolic array for rounding. Further, the one or more inputs may include one or more of an input data element and/or a weight.

In the example of FIG. 12B, the original number 1224 is an output of a systolic array and is an FP32 number with a sign bit portion, an exponent bit portion, and a significand bit portion. It will be understood that the original number 1224 can be any arbitrary bit-length number with any exponent bit-length and/or significand bit-length. The FP32 format of the original number 1224 includes a 1-bit sign, an 8-bit exponent, and a 23-bit significand. In some embodiments, the original number 1224 may include more, less, or different bits. Further, the original number 1224 may include more, less, or different bits for the sign bit portion, the exponent bit portion, and/or the significand bit portion.

The rounder 1202A may receive the 23-bit significand 1226 from the original number 1224. The rounder 1202A may include a set of pseudo-random number generators 1206A. The set of pseudo-random number generators 1206A may include a plurality of rounders that may each round the 23-bit significand 1226. To round the 23-bit significand 1226, the rounder 1202A may identify a particular random number generator of the set of pseudo-random number generators 1206A for rounding the output. For example, the rounder 1202A may identify a random number generator corresponding to a data type or data stream of the 23-bit significand 1226 or the original number 1224.

The rounder 1202A can obtain a state value 1238 to seed the set of pseudo-random number generators 1206A. The reducer 1200B can obtain an initial state value 1238 (e.g., a seed). The initial state value 1238 may be provided by a computing system and the reducer 1200B may utilize the initial state value 1238 to seed each of the set of pseudo-random number generators 1206A.

Based on the initial state value 1238, each of the set of pseudo-random number generators 1206A may generate a random number. Each of the set of pseudo-random number generators 1206A may execute a particular random number generation step. For example, a first random number generator may execute a first random number generation step, a second random number generator may execute a second random number generation step, a third random number generator may execute a third random number generation step, etc. In some embodiments, a random number generator may perform multiple random number generation steps. For example, a random number generator may perform a first random number generation step and a second random number generation step (e.g., by generating a second state value using a first state value and generating a third state value using a second state value). Each of the set of pseudo-random number generators 1206A may generate an output 1228 and provide the output 1228 to a multiplexer 1246.

To identify an updated state value, the multiplexer 1246 may receive the output 1228 of the set of pseudo-random number generators 1206A. Further, the multiplexer 1246 may receive a wave size 1232. The wave size 1232 may indicate a number of parallel rounding operations by a plurality of rounders. Further, the wave size 1232 may be shared by the plurality of rounders such that each of the plurality of rounders identifies the same updated state value. Based on the wave size, the multiplexer 1246 may identify a portion of the output 1228 corresponding to a particular random number generator. For example, if the wave size indicates that the plurality of rounders are performing five parallel rounding operations, the multiplexer 1246 may select the output of a sixth random number generator and/or the output of six random number generation steps from the output 1228. The multiplexer 1246 can select the output 1234 and provide the output 1234 to a multiplexer 1244.

The multiplexer 1244 may receive the output 1234 of the multiplexer 1246. Further, the multiplexer 1244 can receive an update to the state value 1238. In some embodiments, the update to the state value 1238 may be provided by a computing system separate from the reducer 1200B. The computing system may provide the update to the state value 1238 to reset the seeding of each of the pseudo-random number generators 1206A. The multiplexer 1244 may also receive an indicator 1236 of whether the update to the state value 1238 or an output of the pseudo-random number generators 1206A should be provided as an updated state value to the set of pseudo-random number generators 1206A. The multiplexer 1244 may output a different updated state value based on the value of the indicator 1236. In some embodiments, if an update to the state value 1238 is received by the reducer 1200B, the rounder 1202A may automatically use the update to the state value 1238 as the updated state value 1240. Therefore, the multiplexer 1244 can output the updated state value 1240 and the rounder 1202 may seed each of the set of pseudo-random number generators 1206A using the updated state value 1240.

Further, the rounder 1202A may receive an index 1210A. The index 1210A may identify a relative position of the rounder 1202A. For example, the index 1210A may identify a relative position of the rounder 1202A as compared to a plurality of rounders performing parallel rounding operations. Each of the plurality of rounders may receive a portion of an output dataset and, based on a shared state value, may round the portion of the output dataset. Therefore, the output dataset can be rounded in parallel by the plurality of rounders. To maintain the deterministic nature of the parallel rounding operations, each rounder may identify a position of the rounder and a number of random number generation steps for the rounder. In some embodiments, the index may be updated as rounders are modified (e.g., added or removed from the plurality of rounders).

Based on the index 1210A, the rounder 1202A can identify a random number generator of the set of pseudo-random number generators 1206A for generating the output. For example, the rounder 1202A can identify a random number generator in a first position and/or identify that the rounder 1202A should pass through a random number generator once. The set of pseudo-random number generators 1206A may produce a set of pseudo-random numbers 1230. A multiplexer 1247 may obtain the set of pseudo-random numbers 1230 and an identifier of the identified pseudo-random number generator 1233. The multiplexer 1247 can output a pseudo-random number 1231 output by the identified pseudo-random number generator to the convertor 1208A. In some cases, the rounder 1202A may initialize a particular random number generator of the set of pseudo-random number generators 1206A to generate an output for rounding the 23-bit significand 1226. For example, the rounder 1202A may select a first random number generator of the set of pseudo-random number generators 1206A. The first random number generator can generate a random number based on the state value 1240 and provide the random number as output 1231 to the convertor 1208A. Therefore, while the rounder 1202A may implement each of the set of pseudo-random number generators 1206A to identify an output 1234 to the multiplexer 1244, the rounder 1202 may only implement a single random number generator of the set of pseudo-random number generators 1206A (e.g., based on the index 1210A) to generate the output 1231.

In some embodiments, the rounder 1202A (e.g., the convertor 1208A of the rounder 1202A) may further receive a rounding identifier. The rounding identifier may identify a type of rounding to be performed by the reducer 1200B. For example, the rounding identifier may identify that the reducer 1200B is to perform stochastic rounding.

The convertor 1208A may round the 23-bit significand 1226 using stochastic rounding. The convertor 1208A may perform the rounding based on any bit of the significand. Further, the convertor 1208A may determine a number of bits to be reduced (e.g., a number of bits to be zeroed) and may initiate the rounding at the bit immediately prior to the bits to be reduced. To round the 23-bit significand 1226, the convertor 1208A may add the output 1231 to the rightmost bits of the 23-bit significand 1226. For example, if the 23-bit significand 1226 includes bits "10111011101111101110111" and the output 1231 includes bits "0000001," the convertor may generate a rounded 23-bit significand 1242 that includes bits "10111011101111101111000." Further, the rounder 1202A may provide the rounded 23-bit significand 1242.

The rounded number 1248 may include the rounded 23-bit significand 1242. In the example of FIG. 12B, the rounded number 1248 may be an FP32 number with a sign bit portion, an exponent bit portion, and a significand bit portion. The rounded number 1248 may contain a 1-bit sign, an 8-bit exponent, and a rounded 23-bit significand (e.g., the rounded 23-bit significand 1242). The reducer 1200B may provide the rounded number 1248 as an output (e.g., an output to a trailing bit reducer).

FIG. 5 shows an example multiply accumulate datapath 500. The example datapath 500 may be implemented as the multiplier 208 and the adder 210 discussed with respect to FIG. 2A and FIG. 2B. As shown in FIG. 5, the multiplier 208 may receive a reduced input data element 222 and a reduced weight 224 and provide a multiplication product to the adder 210. The adder 210 may receive the multiplication product and the input partial sum 234 and provide an addition result 238. By converting inputs into reduced representation before presenting inputs to the multiplier 208, the multiplier 208 can omit support for numbers with larger bit-lengths (e.g., 32-bits), instead the multiplier 208 can support numbers with the reduced bit-lengths (e.g., 22-bits). Therefore, the systolic array can retain the performance offered by receiving inputs of shorter bit-lengths by receiving inputs of arbitrary bit-lengths and adjusting the input to a particular bit-length (e.g., the maximum bit-length supported by the processing elements of the systolic array).

The reduced input data element 222 may be a 22-bit number. In some embodiments, the reduced input data element 222 may have any bit-length and/or be any number of bits. Further, the reduced input data element 222 may be a floating-point number. In some embodiments, the reduced input data element 222 may be a brain floating-point number. Further, the reduced input data element 222 may be a number of any data type. The reduced input data element 222 may consist of a sign bit field, an exponent field, and a significand field. The multiplier 208 can support reduced input data elements of different types. For example, the reduced input data element 222 may contain a 1-bit sign, a 10-bit exponent, and an 11-bit significand. Further, the reduced input data element 222 may contain a 1-bit sign, an 8-bit exponent, and an 11-bit significand. The multiplier 208 may support both of these types of reduced input data elements. In some embodiments, the reduced input data element 222 may contain an x-bit sign, a y-bit exponent, and a z-bit significand where x, y, and z may be any number. The reduced input data element 222 may be provided to the multiplier 208 via a first sign data path 511, a first exponent data path 521, and a first significand data path 531.

The reduced weight 224 may be a 22-bit number. In some embodiments, the reduced weight 224 may have any bit-length and/or be any number of bits. Further, the reduced weight 224 may be a floating-point number. In some embodiments, the reduced weight 224 may be a brain floating-point number. Further, the reduced weight 224 may be any data type. The reduced weight 224 may consist of a sign bit path, an exponent bit path, and a significand bit path. For example, the reduced weight 224 may contain a 1-bit sign, a 10-bit exponent, and an 11-bit significand. Further, the reduced weight 224 may contain a 1-bit sign, an 8-bit exponent, and a 10-bit significand. In some embodiments, the reduced input data element 222 may contain an x-bit sign, a y-bit exponent, and a z-bit significand where x, y, and z may be any number. The reduced weight 224 may be provided to the multiplier 208 via a second sign data path 512, a second exponent data path 522, and a second significand data path 532.

The multiplier 208 may contain a sign data path, an exponent data path, and a significand data path. The multiplier 208 may receive the first sign data path 511, the first exponent data path 521, and the first significand data path 531 from the reduced input data element 222. The multiplier 208 may receive the second sign data path 512, the second exponent data path 522, and the second significand data path 532 from the reduced weight 224. In some embodiments, the multiplier 208 may also receive a data type control signal. The multiplier 208 may perform multiplication operations on the received inputs.

The sign data path of the multiplier 208 may receive the first sign data path 511 and the second sign data path 512. The sign data path may output a partial sign data path 513 based at least in part on the first sign data path 511 and the second sign data path 512. In some embodiments, the sign data path can be implemented as an exclusive or (XOR) function. The sign data path may provide the partial sign data path 513 to the adder 210.

The exponent data path of the multiplier 208 may receive the first exponent data path 521 and the second exponent data path 522. The exponent data path of the multiplier 208 may contain an adder 526. In some embodiments, the exponent data path of the multiplier 208 may include a mapper to adjust the output of the multiplier 208 into a format expected by one or more components of the systolic array (e.g., an adder separate from the adder 526). For example, an adder of the systolic array may expect (e.g., operate on) an input with an 11-bit exponent. Further, the mapper may receive the first exponent data path 521 and the second exponent data path 522 and perform a mapping operation to add one or more bits to the exponent of each of the reduced input data element 222 and the reduced weight 224

The adder 526 may receive the mapped or unmapped versions of the first exponent data path 521 and the second exponent data path 522. The adder 526 may perform addition on the two values received from the first exponent data path 521 and the second exponent data path 522. The adder 526 can also receive shift/carry information (not shown) from the significand data path. The adder 526 may provide a partial exponent data path 523 based at least in part on the addition performed on the two values. The partial exponent data path 523 can be 10 bits or other range sufficient to accommodate the exponent sum without overflow.

The significand data path of the multiplier 208 may receive the first significand data path 531 and the second significand data path 532. The significand data path of the multiplier 208 may contain a binary multiplier 534 and a format adjuster 536. The binary multiplier 534 may multiply the value of the first significand data path 531 by the value of the second significand data path 532. The binary multiplier 534 may generate a multiplier product based on the multiplication operation. In some embodiments, the product may be an integer product, a floating-point product, or any other product. Further, the binary multiplier 534 may generate a product of 8-bits, 16-bits, 32-bits, or any other number of bits. The product may have a bit-length of a maximum bit-length supported by the elements of the systolic array during a single-pass computation. Therefore, the systolic array can receive inputs of an arbitrary inputs and a reducer can reduce to a bit-length corresponding to the maximum bit-length supported by elements of the systolic array (e.g., a multiplier of a processing element). The binary multiplier 534 may further perform floating-point multiplication, integer multiplication, or multiplication involving any other data type. The binary multiplier 534 may be implemented using a 16-bit multiplier data path, an 18-bit multiplier data path, or a multiplier data path with any number of bits. The binary multiplier 534 may provide a multiplier product to the format adjuster 536. In some embodiments, the binary multiplier 534 may be implemented using a multiplier circuit.

The format adjuster 536 may adjust the format of the multiplier product produced by the binary multiplier 534.

The significand data path of the multiplier 208 may include the format adjuster 536 to adjust the output of the multiplier 208 into a format expected by one or more components of the systolic array (e.g., an adder separate from the adder 526). For example, an adder of the systolic array may expect (e.g., operate on) an input with a 23-bit significand. The format adjuster 536 may add or reduce the number of bits used to represent the multiplier product, for example, by increasing the bit size to 23 bits. The format adjuster 536 may provide a partial significand data path 533 to the adder 210.

The adder 210 may contain a sign data path, an exponent data path, and a significand data path. The adder 210 may be implemented with given bit-size (e.g., with an adder data path of a given size). In some embodiments, each processing element may include an adder with a larger bit-size and a multiplier with a smaller bit-size as adders of increased bit-sizes may be more cost efficient than multipliers of the same increased bit-sizes. Therefore, this disclose enables a systolic array to support, at reduced precision, larger bit-sizes using lower bit-size multipliers. The adder 210 may receive the partial sign data path 513, the partial exponent data path 523, and the partial significand data path 533 from the multiplier 208. The adder 210 may also receive an input partial sum 234. The adder 210 may perform an addition operation on the multiplier product comprised of the partial sign data path 513, the partial exponent data path 523, and the partial significand data path 533 and the input partial sum 234. In some embodiments, the adder 210 may perform addition operations on both floating-point and brain floating-point numbers. Further, the adder 210 may be a 34-bit floating-point adder, a 32-bit floating-point adder, or any other bit-length adder.

The adder 210 may generate an addition result 238 based on the addition operation. The addition result 238 may consist of a sign data path 515, an exponent data path 525, and a significand data path 535. In some embodiments, the addition result 238 may be an integer sum, a floating-point sum, or any other sum. Further, the adder 210 may generate a sum of 8-bits, 16-bits, 32-bits, 34-bits, or any other number of bits. In some embodiments, the adder 210 may be implemented using a binary adder circuit.

Figure 6:
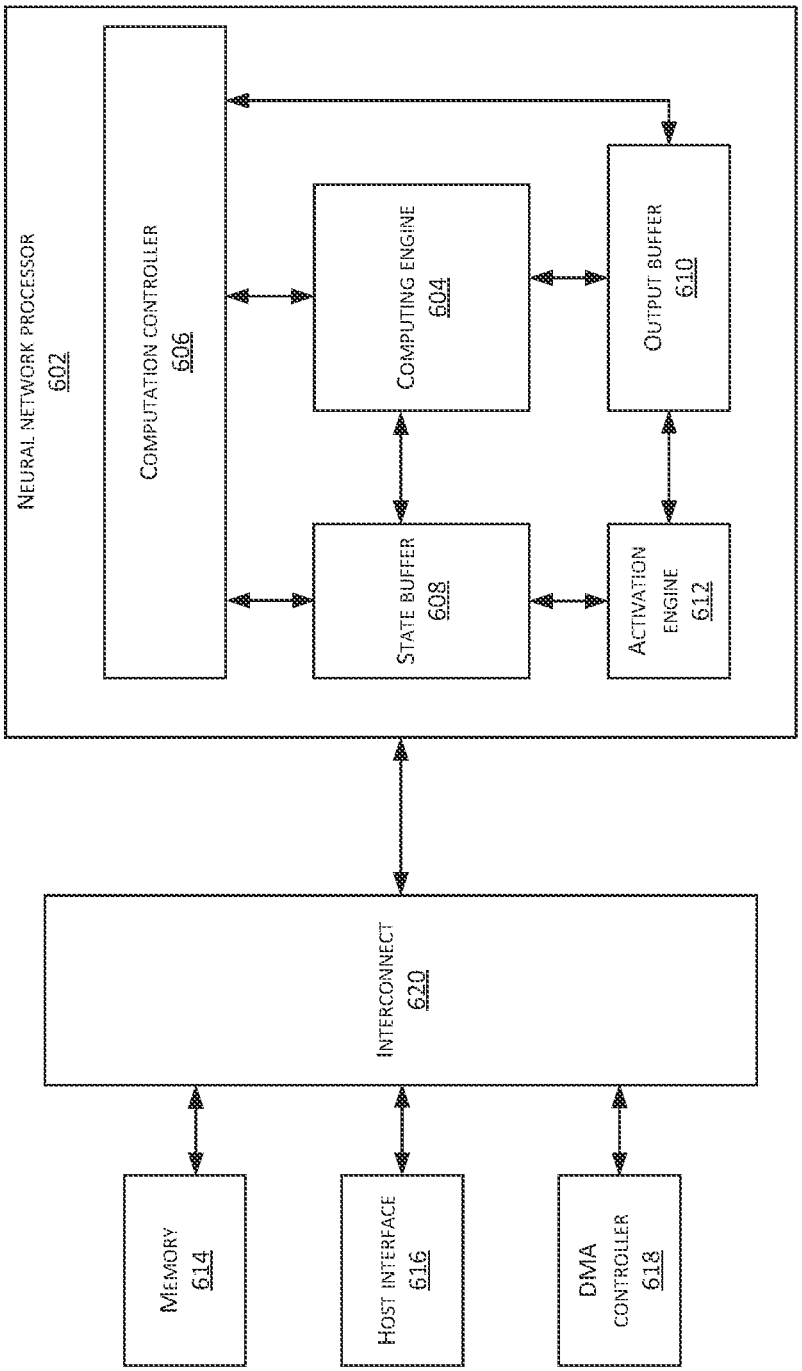
FIG. 6 shows an apparatus for neural network computations according to some examples of the disclosed technologies.

FIG. 6 shows an apparatus 600 for neural network computations according to some embodiments of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, video data processing, etc. In some embodiments, a host device may operate a software application and communicate with the apparatus 600 to make a prediction based on computations with a prediction model utilizing a neural network processor. For example, the host device can make the prediction by identifying information included in an input dataset for an image, text, audio, video, etc. using the prediction model.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610 (e.g., an output buffer 610 including the reducers 311a-311x as seen in FIG. 3), and an activation engine 612. The neural network processor 602 can provide the computing resources to support the computations with the prediction model. The neural network processor 602 may be implemented as a system on chip (SoC), a field programmable gate array (FPGA), or any suitable circuit.

The memory 614 may store instructions, input datasets (e.g., pixel data of an image) and the weights (e.g., weights corresponding to certain visual and/or non-visual features) received from the host device. The memory 614 may also store outputs of the neural network processor 602 (e.g., one or more image recognition decisions on the input images in the form of output datasets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may enable communication between the host device and the neural network processor 602. For example, the host interface 616 may transmit memory descriptors including the memory addresses of the stored data (e.g., input datasets, weights, results of computations, etc.) between the host device and the neural network processor 602. The host interface 616 may include, e.g., a peripheral component interconnect express (PCIe) interface, or any suitable interface for communicating with the host device. The host device may include a host processor and a host memory.

The DMA controller 618 may perform DMA operations to transfer data between the neural network processor 602 and the host device. For example, as discussed above, the host device can store the instructions, input datasets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The state buffer 608 may provide caching of data used for computations at the computing engine 604. The data cached at the state buffer 608 may include, e.g., the input datasets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The computation controller 606 may provide controls to various components of the neural network processor 602 to perform neural network computations. In some implementations, the computation controller 606 may read the instructions stored in the memory 614 and schedule the executions of the instructions by the computing engine 604. In the first embodiment, the computation controller 606 may perform scheduling of loading the weights into the computing engine 604 prior to reading the input data elements from the state buffer 608. For example, as discussed with reference to FIG. 2A, FIG. 2B, FIG. 4A, and FIG. 4B, the computation controller 606 may provide the opcode 230 and the weight load 232 to the computing engine 604 based on the instructions received from the host device. The computation controller 606 may provide appropriate values of the opcode 230 to the computing engine 604 which may be decoded by each PE in the computing engine 604 to perform a corresponding operation. For example, the computing engine 604 may use the weight load 232 and the opcode 230 to pre-load the weights in all the PEs in the computing engine 604. Once the weights have been pre-loaded, the computation controller 606 may perform scheduling of loading the input data elements into the computing engine 604, sequentially, in uniform time periods, from the state buffer 608 to start the arithmetic computations.

In the second embodiment, the computation controller 606 may perform scheduling of loading the weights and the input data elements into the computing engine 604, sequentially, in uniform time periods, from the state buffer 608. The computation controller 606 may schedule loading of the weights and the input data elements in a respective first PE of each row in the systolic array 302 using a respective row data bus. For example, a respective input data element and a weight value may be loaded per cycle in the first PE of the respective row.

In another embodiment, the computation controller 606 may schedule loading of the weights in the systolic array 302 in parallel for each row using a respective column data bus for each PE in a given row. For example, weights for each row may be loaded in parallel per cycle. In some embodiments, the computation controller 606 may determine a data type for the input dataset based on the instructions received from the host device. The instructions may be in the form of an opcode. The data type may indicate a size and a type of the input data element, e.g., 4-bit, 8-bit, 16-bit, signed, unsigned, or floating-point.

The computing engine 604 may perform computations for the neural network. For example, the computing engine 604 may reduce the input provided to a systolic array to generate the reduced input. Further, the computing engine 604 may determine the maximum supported bit-length for the systolic array and generate the reduced input with the maximum supported bit-length. In some embodiments, the computing engine 604 may include a set of PEs performing one or more arithmetic operations involved in the neural network computations. Each PE may perform multiply-accumulate operations using input datasets and associated weights. For example, the computing engine 604 may include the systolic array 302, and the circuit 304 comprising the zero input data detectors 306a-306x, and the zero weight detectors 308a-308x. In some embodiments, the zero input data detectors 306a-306x, and the zero weight detectors 308a-308x may be external to the computing engine 604. The computing engine 604 may execute instructions as scheduled by the computation controller 606 to load the weights and the input datasets sequentially from the state buffer 608 into the computing engine 604.

In the first embodiment, the weights may be pre-loaded prior to reading the input datasets from the state buffer 608. The respective zero weight indicators corresponding to each weight may be cached locally in each PE and the cached values may be used to perform arithmetic computations with the respective input data element as the input data element is fed into the computing engine 604 along with the corresponding zero data element indicator. In the second embodiment, the weights and the input datasets may be read simultaneously from the state buffer 608, as discussed with reference to FIG. 5. The corresponding zero data element indicator and the zero weight indicator may be provided by the respective zero detector circuits and propagated sequentially from one PE to another for the respective row. The weights and the input datasets can be obtained from the state buffer 608 using one or more interfaces. In certain embodiments, the computing engine 604 may perform the arithmetic computations to reduce the dynamic power consumption of the systolic array 302 using the respective zero data element indicator and the zero weight indicator signals as discussed with reference to FIGS. 2A-5, and provide the computations results to be stored in the output buffer 610.

The output buffer 610 may include a set of registers to store the output datasets generated by the computing engine 604. In some embodiments, the output buffer 610 may also enable additional processing such as, e.g., a pooling operation to reduce the size of the stored outputs. Further, the computing engine 604 can be operated to perform computations for a particular neural network layer, and the output buffer 610 can process the outputs of that neural network layer and store the processed output datasets (with or without processing by the activation engine 612) at the state buffer 608. The processed output datasets may be used by the computing engine 604 as the intermediate outputs. In some embodiments, the output buffer 610 may include adders to accumulate the partial sums generated for different sets of filters and input datasets to generate a convolution output array. The final output value of the convolution output array stored in the state buffer 608 can be retrieved by the computation controller 606 for storing at the state buffer 608.

The activation engine 612 may apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

Figure 7:
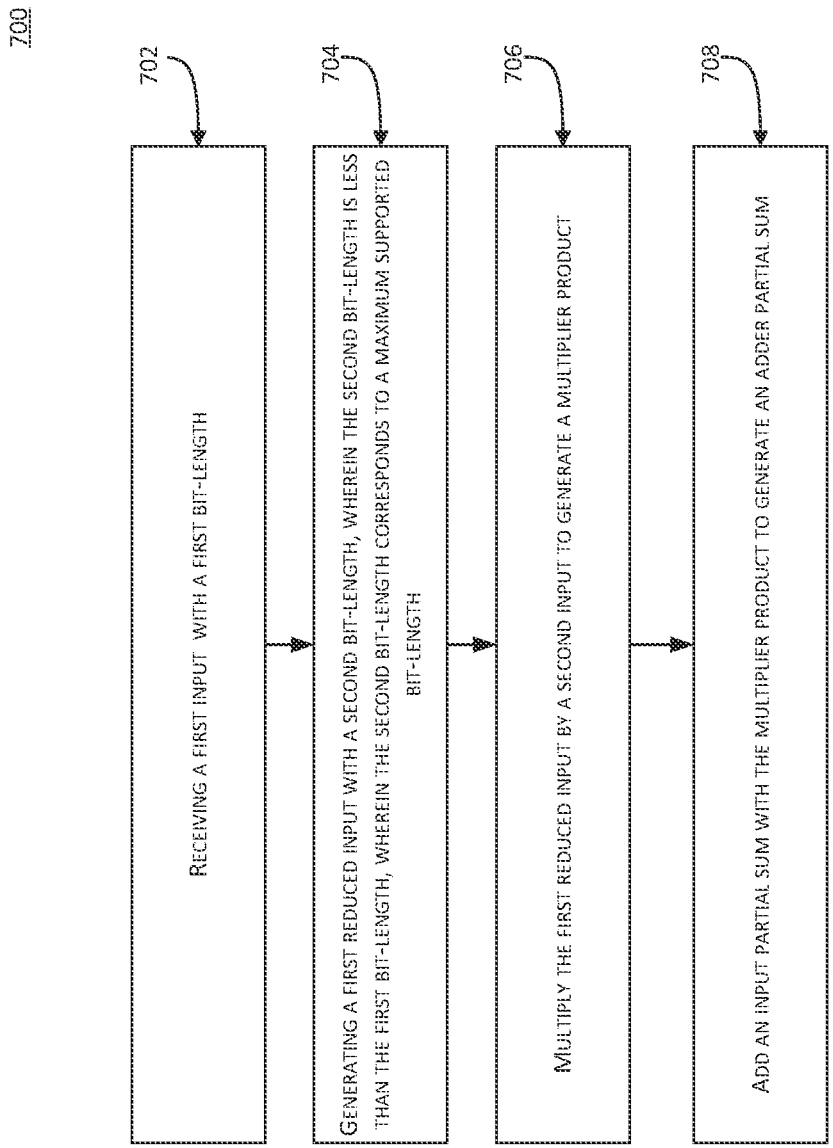
FIG. 7 shows a method executed by a reducer and a processing element for neural network computations, according to some examples of the disclosed technologies.

FIG. 7 shows a method 700 executed by a computing engine 604 utilizing a systolic array (e.g., a group of processing elements), according to some examples of the disclosed technologies. The array may be similar, for example, to the array 100A, and include multiple PEs similar to, e.g., the PE 112a. The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more reducers (e.g., convertors) to receive an input with an arbitrary bit-length and convert the arbitrary bit-length input into an input with a reduced bit-length corresponding to the maximum supported bit-length for elements of the systolic array. For example, the one or more reducers can convert a plurality of input data elements (e.g., 32-bit input data elements) into a plurality of reduced input data elements (e.g., 22-bit input data elements) and/or plurality of weights (e.g., 32-bit weights) into a plurality of reduced weights (e.g., 22-bit weights).

In block 702, a first reducer receives a first input (e.g., a first number) with a first bit-length (e.g., 32 bits). The first input bit-length may be an arbitrary bit-length. The first input may be represented in floating-point format. Further, the first reducer can identify a quantity of trailing bits of the first input and reduce the quantity of trailing bits of the first input. The first input may represent an input data element. The first reducer may convert 32-bit floating-point numbers to 22-bit floating-point numbers. In some embodiments, the first reducer may convert m-bit floating-point numbers to n-bit floating-point numbers, where n and m can be any numbers where n is less than m.

In block 704, the first reducer generates a first reduced input with a second bit-length (e.g., 22 bits). The second bit-length may be a maximum bit-length supported by elements of the systolic array. For example, the first reduced input may be a 22-bit floating-point number. Further, the second bit-length may be less than the first bit-length (e.g., the second bit-length may be any bit-length less than the first bit-length). The first reducer may generate the first reduced input based on reducing the quantity of trailing bits of the first input. To generate the first reduced input (or any other reduced inputs), the first reducer may include a trailing bit reducer to reduce a quantity of trailing bits representing a significand portion of the first input and produce a reduced significand portion of the first input (e.g., the 32-bit first input). For example, the trailing bit reducer may zero the quantity of trailing bits. Further, the first reducer may include a rounder to round the reduced significand portion of the first input based at least in part on a remainder of the bits (e.g., a remainder of non-trailing bits of the first input) representing the significand portion of the first input not included within the reduced significand portion. For example, rounding the first input may include rounding a portion of the bits of the first input. The rounder may further round the first input to a particular number (e.g., a particular floating-point number). In some embodiments, the rounder may round the significand portion and the trailing bit reducer may generate the reduced significand portion from the rounded significand portion (e.g., the first input may be a first rounded input to the trailing bit reducer). In other embodiments, the first reducer may not include a rounder and the significand portion may be pre-rounded (e.g., rounded by another system) or not rounded). The rounder may round the input based on one or more of stochastic rounding, rounding to nearest even, rounding to zero, rounding down, rounding up, or any other rounding method. Stochastic rounding may include rounding the input up to a first number or down to a second number based on probabilities that are tuned based on the relative distance between the input and the first number and the relative distance between the input and the second number respectively. In some embodiments, the input may be rounded based on user input (e.g., a selection of a rounding method). The first reducer may further include an exponent expander to increase a quantity of bits representing an exponent portion of the first input. In some embodiments, the first reduced input may be stored in a 24-bit format.

In some embodiments, the first reducer may generate a second input. In other embodiments, the computing engine 604 may include a second reducer to receive a weight in floating-point format with the first bit-length. The second reducer may identify a quantity of trailing bits of the weight and reduce the quantity of trailing bits of the weight. Further, the second reducer may generate the weight in floating-point format with the second bit-length based on reducing the quantity of trailing bits of the weight. For example, the second input may be a second 22-bit floating-point number.

In block 706, an individual processing element in at least one row of the systolic array multiplies the first reduced input by the second input (e.g., a second number) to generate a multiplier product. In some embodiments, the second input may be a second reduced input. For example, the second input may be a reduced weight. The first reducer may receive the first input and a weight and generate the first reduced input and the second input. Further, the first reducer can select the first reduced input or the second input to be provided to the individual processing element. The individual processing element may include a multiplier to multiply the first reduced input by the second input. For example, each processing element may include a 22-bit multiplier. Further, each processing element may include a multiplier to multiply at least two inputs with the second bit-length (e.g., n-bit numbers). Further, the multiplier may multiply two 22-bit floating-point numbers. The multiplier may include a 1-bit sign data path, an 11-bit significand data path, and a 10-bit exponent data path.

In block 708, the individual processing element adds an input partial sum with the multiplier product to generate an adder partial sum (e.g., an addition result). The individual processing element may further include an adder to add the input partial sum with the multiplier product. For example, each processing element may include a 34-bit adder. Further, each processing element may include an adder to add at least two numbers with a third bit-length (e.g., p-bit numbers where p is greater than n, the multiplier receiving n-bit numbers). Further, the adder may add two floating-point numbers. The adder may include a 1-bit sign data path, a 23-bit significand data path, and a 10-bit exponent data path.

Figure 8:
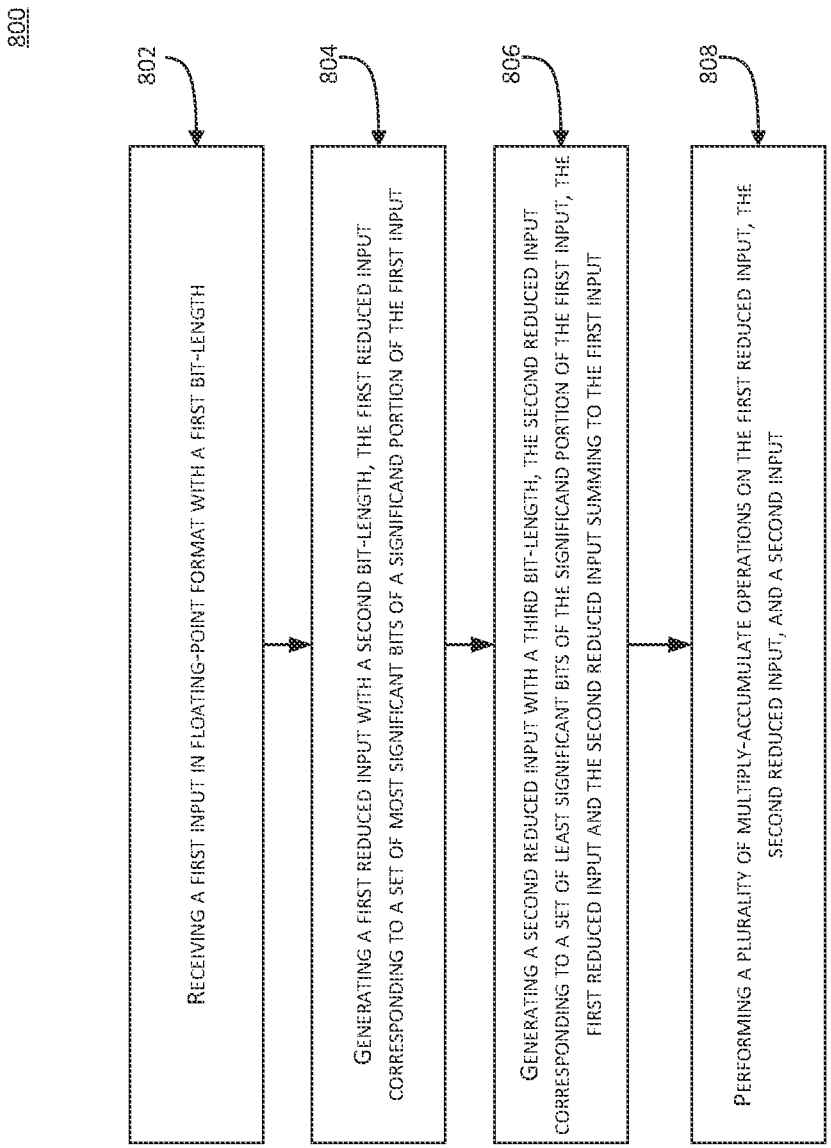
FIG. 8 shows a method executed by a reducer and a processing element for neural network computations, according to some examples of the disclosed technologies.

FIG. 8 shows a method 800 executed by a computing engine 604 utilizing a systolic array, according to some examples of the disclosed technologies. The array may be similar, for example, to the array 100A, and include multiple PEs similar to, e.g., the PE 112a. The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more reducers (e.g., convertors) to receive an input with an arbitrary bit-length and convert the arbitrary bit-length input into multiple reduced inputs with a reduced bit-length corresponding to the maximum supported bit-length for elements of the systolic array. For example, the one or more reducers can convert each of a plurality of input data elements (e.g., 32-bit input data elements) into a multiple reduced input data elements (e.g., 21-bit input data elements) and/or each of a plurality of weights (e.g., 32-bit weights) into multiple reduced weights (e.g., 21-bit weights).

In block 802, the systolic array (e.g., a reducer of the systolic array) receives a first input (e.g., an input data element, a weight, etc.) in floating-point format with a first bit-length. For example, the first input may be a 32-bit floating-pint number. The systolic array may also receive a second input (e.g., an input data element, a weight, etc.) for multiply-accumulate operations. The reducer may convert m-bit floating-point numbers to one or more n-bit floating-point numbers, where n can be any number less than m. For example, the reducer can convert 32-bit floating-point numbers to two 21-bit floating-point numbers.

In block 804, the systolic array generates a first reduced input (e.g., a high reduced input) with a second bit-length. The first reduced input may correspond to a set of most significant bits of a significand portion of the first input (e.g., the leading bits of the significand portion of the first input).

In block 806, the systolic array generates a second reduced input (e.g., a low reduced input) with a third bit-length. The second reduced input may correspond to a set of least significant bits of the significand portion of the first input (e.g., the trailing bits of the significand portion of the first input). The first reduced input and the second reduced input may sum to the first input. Further, the second bit-length and the third bit-length may be less than the first bit-length from the first input. For example, the first reduced input and the second reduced input may each be 21-bit floating-point numbers. Further, the reducer may convert an input data element and a weight into respective first and second reduced numbers.

Each of the first reduced input and the second reduced input may be represented in floating-point format. In some embodiments, the reducer may generate the first reduced input and subtract the first reduced input from the first input to generate the second reduced input. For example if the first input includes a first significand "11111111011010101010101," the first reduced input includes a first significand "11111111011," by subtracting the first reduced input from the first input, the second reduced input may be determined as "010101010101." The first reduced input and the second reduced input may be a maximum supported bit-length for the systolic array and/or a particular processing element. In some embodiments, the reducer may include a first sub-reducer to generate the first reduced input. The first sub-reducer may include a trailing bit reducer to reduce a quantity of trailing bits of a significand portion of the first input to produce a high reduced significand portion. The first sub-reducer may further include a first exponent expander to increase a quantity of bits representing an exponent portion of the first input to produce a first increased exponent portion. Based on the first increased exponent portion and the high reduced significand portion, the first sub-reducer may generate the first reduced input (e.g., the high reduced input). Further, the reducer may include a second sub-reducer to generate the second reduced input. The second sub-reducer may include a leading bit reducer to reduce a quantity of leading bits of a significand portion of the first input to produce a low reduced significand portion. The second sub-reducer may further include a second exponent expander to increase a quantity of bits representing an exponent portion of the first input to produce a second increased exponent portion. Based on the second increased exponent portion and the low reduced significand portion, the second sub-reducer may generate the second reduced input (e.g., the low reduced input). In some embodiments, the second sub-reducer may also include a format detector to detect if the first input is denormal or normal, a normalizer to remove an implied bit of the first input and renormalize the low reduced significand portion to produce a normalized significand portion, based on determining the first input is normal, and an exponent adjuster to adjust the second increased exponent portion to produce an adjusted exponent portion based on renormalizing the significand portion. Further, the second reduced input may include the adjusted exponent portion and the normalized significand portion.

In block 808, the systolic array performs a plurality of multiply-accumulate operations on the first reduced input, the second reduced input, and a second input. The first input may be an input data element or a weight and the second input may be the other of the input data element or the weight. In some embodiments, the second input may not be reduced. In other embodiments, the systolic array may reduce the second input to generate a third reduced input and a fourth reduced input for the plurality of multiply-accumulate operations. To perform the plurality of multiply-accumulate operations, the systolic array may calculate a plurality of partial sums. Further, for each combination of high/low reduced inputs, the systolic array can calculate a partial sum. For example, the systolic array can include processing elements to conduct multiply-accumulate operations on the reduced inputs. The processing elements may each include a multiplier to multiply two 21-bit floating-point numbers and an adder to add two floating-point numbers. Further, the multiplier may include a 1-bit sign data path, an 11-bit significand data path, and a 9-bit exponent data path and the adder may include a 1-bit sign data path, a 23-bit significand data path, and a 10-bit exponent data path. Further, the reducer may produce the reduced inputs and select the reduced inputs to be provided for processing by the processing element. The plurality of operations may be a plurality of ordered multiply-accumulate operations (e.g., a plurality of multiply operations and a plurality of accumulate operations for the first input). The processing element may include a multiplier to multiply at least two n-bit number and an adder to add two p-bit numbers, where p may be any number greater than n. For example, the multiplier be a 21-bit multiplier to multiply two 21-bit numbers and the adder may be a 34-bit adder. Further, to perform the operations, the processing element can multiply the second reduced input and a second reduced weight to generate a first product, multiply the first reduced input and the second reduced weight to generate a second product, multiply the second reduced input and the first reduced weight to generate a third product, multiply the second reduced input and the first reduced weight to generate a fourth product, add the first product to an input partial sum to generate a first sum, add the first sum to the second product to generate a second sum, add the second sum and the third product to generate a third sum, and add the third sum and the fourth product to generate a total product or output.

The systolic array may generate a full precision total output from the plurality of partial sums for the first input and the second input (e.g., the input data element and the weight) based on the reduced inputs. In some embodiments, to generate the total output, the systolic array may provide each sub-product to an adder (e.g., an accumulator). The adder can perform chunk-based accumulation on the output of the systolic array (e.g., each of the sub-products).

Figure 13:
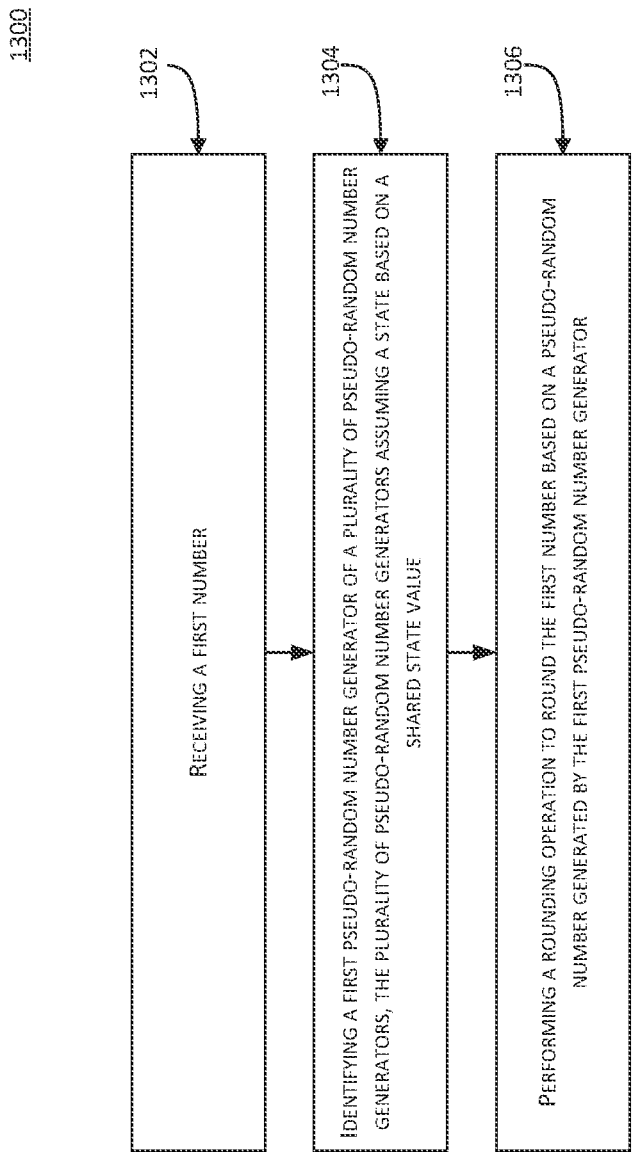
FIG. 13 shows a method executed by a reducer and a processing element for neural network computations, according to some examples of the disclosed technologies.

Turning to FIG. 13, FIG. 13 shows a method 1300 executed by a computing engine 604 utilizing a systolic array (e.g., a group of processing elements) for parallel rounding operations by one or more rounders, according to some examples of the disclosed technologies. The array may be similar, for example, to the array 100A, and include multiple PEs similar to, e.g., the PE 112*a*. The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more rounders to receive an output of the systolic array and round the output based on a random number.

In order to generate a rounded output, in block 1302, a rounder receives a first number. The first number may have a first bit-length (e.g., 16 bits, 21 bits, etc.). The rounder may be a part of a reducer that converts outputs of a systolic array into reduced outputs. For example, the first number may be a FP32 number and the reduced number may be a FP16 number. Therefore, the rounder can receive the first number.

Based on the received first number, in block 1304, the rounder identifies a first random number generator of a plurality of random number generators (e.g., a plurality of maximal length LFSRs), the plurality of random number generators assuming a state based on a shared state value. For example, the plurality of random number may obtain the shared state value from a state value store (e.g., an individual state value store or a state value store shared by the plurality of random number generators). Each of the plurality of random number generators may be associated with a random number sequence and may generate a next random number (e.g., a pseudo-random number) in the random number sequence based on a respective state value (e.g., the state value representing a position within the random number sequence). Further, each of the plurality of random number generators may cycle through a number of positions within an associated random number sequence based at least partly on a relative position of the particular random number generator relative to the plurality of random number generators. An index may identify a relative position of a particular random number generator. Based on cycling through the positions, each random number generator can arrive (e.g., generate) at a resultant random number. The rounder may identify (e.g., select) the random number generator from the plurality of random number generators based on a relative position of the first number in a set of numbers being rounded in parallel and/or a relative position of the first random number generator in the plurality of random number generators.

In some embodiments, the rounder can select the plurality of random number generators from a set of random number generators. Further, the rounder can select the plurality of random number generators based on a quantity of the plurality of random number generators matching a selected number of parallel rounding operations for the rounder. Therefore, the rounder can identify the first random number generator of the plurality of random number generators.

In some embodiments, the plurality of random number generators can include a final random number generator. For example, the final random number generator may be a final or last position relative to the plurality of random number generators. The rounder may update the current state value (e.g., stored by the state value store) with a state of the final random number generator. In some embodiments, the rounder can include a multiplexer to select the final random number generator. Further, the rounder can obtain an updated state value (e.g., provided via a user computing device). The rounder can include a multiplexer to select the updated state value or the state of the final random number generator to update the current state value.

In order to generate the random number, in block 1306, the rounder performs a rounding operation to round the first number based on a random number generated by the first random number generator. The random number generator may generate the random number based on the shared state value and cycling through a number of positions within an associated random number sequence, as discussed above. The rounder may perform the rounding operation by adding the random number to the first output. Further, the rounder may perform stochastic rounding, rounding to nearest even, rounding to zero, rounding down, or any other type of rounding operation. In some embodiments, the rounder may perform a set of rounding operations to round individual numbers of a set of numbers to result in a set of reduced numbers. Each of the set of rounding operations may rely on particular random numbers of a set of random numbers generated by the plurality of random number generators. Therefore, the rounder can perform the rounding operation to round the first number.

In some embodiments, the rounder may provide the first rounded output to a trailing bit reducer of a convertor to reduce the number of bits of the rounded number and generate a first reduced number. The convertor may convert m-bit floating point number to one or more n-bit floating point numbers where m and n can be any number and n can be any number be less than m. For example, the convertor may convert 32-bit floating-point number to a plurality of 22-bit floating point numbers using the rounder and the trailing bit reducer. The first reduced number may have a second bit-length (e.g., the second bit-length less than the first bit-length. Further, the first reduced number may correspond to a set of most significant bits of a significand portion of the first number. In some embodiments, the convertor may provide the first reduced output to a plurality of pipeline registers. The number of the plurality of pipeline registers may be based on relative position of each random number generator. The processing element may perform the multiply-accumulate operations using a multiplier and an adder. In some embodiments, the first number may be an output of a processing element. In other embodiments, the first reduced number may be an input to a processing element.

Figure 14:
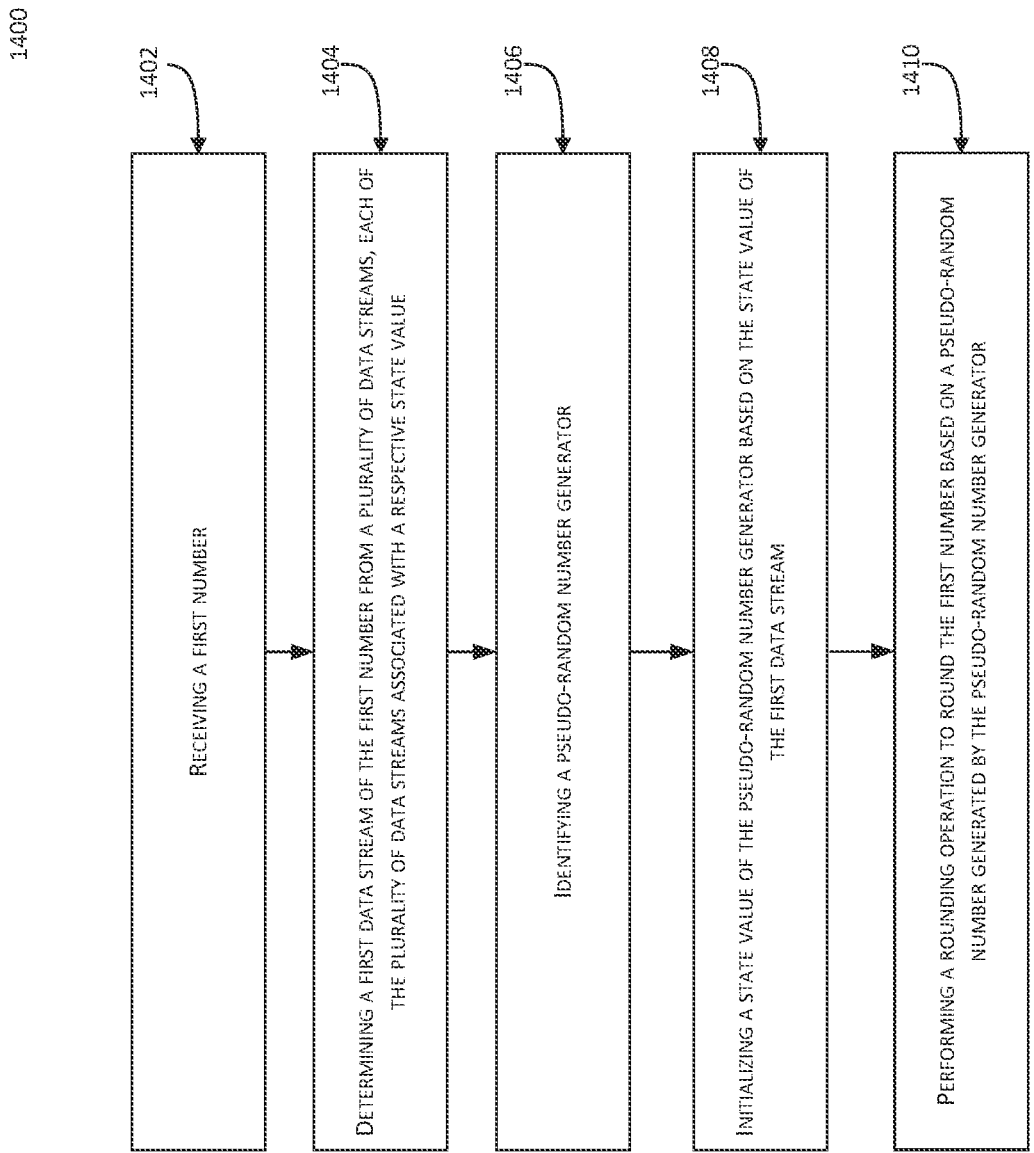
FIG. 14 shows a method executed by a reducer and a processing element for neural network computations, according to some examples of the disclosed technologies.

FIG. 14 shows a method 1400 executed by a computing engine 604 utilizing a systolic array (e.g., a group of processing elements) for rounding operations across multiple data streams, according to some examples of the disclosed technologies. The array may be similar, for example, to the array 100A, and include multiple PEs similar to, e.g., the PE 112a.

The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more rounders to receive an output of the systolic array and round the output based on a random number.

In order to generate a rounded number, in block 1402, a rounder receives a first number. The first number may have a first bit-length (e.g., 16 bits, 21 bits, etc.). The rounder may be a part of a reducer that converts outputs into rounded outputs. For example, the first number may be an FP32 number and the first rounded number may be an FP16 number. Therefore, the rounder can receive the first number.

To identify how to generate the rounded output, in block 1404, the rounder determines a first data stream of the first number from a plurality of data streams, each of the plurality of data streams associated with a respective state value. The rounder may identify the first data stream using a plurality of data stream identifiers stored in a data store. Further, the rounder may identify the first data stream based on a source of the first number, a data type of the first number, a chunk of data, or any other metadata of the first number. In some embodiments, the rounder may define the plurality of data streams. For example, the rounder may define how to segment data into a plurality of data streams. In other embodiments, the rounder may obtain the first number and metadata via one or more data paths. The metadata may identify the plurality of data streams.

The rounder may round data for multiple data streams or a single data stream. Each of the plurality of data streams may have an independent error distribution. In some embodiments, the rounder may store, for each of the plurality of data streams, a state value representing a current position for the data stream. For example, the rounder can store the state values in a state register. Therefore, the rounder can determine the first data stream of the first number.

Based on the determining the data stream, in block 1406, the rounder identifies a random number generator. The rounder may identify the random number generator from a plurality of random number generators (e.g., a plurality of maximal length LFSRs). The random number generator may be associated with a random number sequence (e.g., a sequence of random numbers). Further, the random number generator may generate a next random number (e.g., a pseudo-random number) in the random number sequence based on a respective state value (e.g., the state value representing a position within the random number sequence). Therefore, the rounder can identify the random number generator.

In order to generate random numbers using the random number generator, in block 1408, the rounder initializes a state value of the random number generator based on the state value of the first data stream. For example, the rounder may initialize the state value based on the current position for the first data stream. To initialize the state value, the rounder may replace a state value representing a current position for a second data stream of the plurality of data streams with a state value representing the current position for the first data stream. Therefore, the rounder can initialize the state value of the random number generator based.

In order to round an output, in block 1410, the rounder performs a rounding operation to round the first number based on a random number generated by the random number generator. The random number generator may generate the random number based on initializing the state value of the random number generator. The rounder may perform the rounding operation by adding the random number to the first output. To perform the rounding operation, the rounder may perform stochastic rounding, rounding to nearest even, rounding to zero, rounding down, or any other type of rounding operation. Based on performing the rounding operation, the rounder can generate a second number (e.g., a reduced number).

In some embodiments, the rounder may provide the first rounded output to a trailing bit reducer to reduce the number of bits of the rounded output and generate a first reduced output. Therefore, a reducer may convert m-bit floating point number to one or more n-bit floating point numbers where m can be any number and n may be any number less than m. For example, the convertor may convert 32-bit floating-point number to a plurality of 22-bit floating point numbers using the rounder and the trailing bit reducer. The first reduced number may have a second bit-length (e.g., the second bit-length less than the first bit-length). Further, the first reduced number may correspond to a set of most significant bits of a significand portion of the first number. The processing element may perform the multiply-accumulate operations using a multiplier and an adder. In some embodiments, the first number may be an output of a processing element. In other embodiments, the first reduced number may be an input to a processing element. Therefore, the rounder can perform the rounding operation to round the first number.

In some embodiments, the rounder can store the state value of the random number generator as the current position for the first data stream within a state register for the first data stream. For example, the rounder can store the state value of the random number generator when ending use of the random number generator for the first data stream, when switching use of the random number generator from the first data stream to a different data stream, etc.

FIG. 15 shows a method 1500 executed by a computing engine 604 utilizing a systolic array (e.g., a group of processing elements) for rounding across multiple data types, according to some examples of the disclosed technologies. The array may be similar, for example, to the array 100A, and include multiple PEs similar to, e.g., the PE 112*a*. The systolic array may include a plurality of PEs configured in a plurality of rows and/or a plurality of columns. For example, the systolic array might include 65,536 PEs which are further divided into 256 rows and 256 columns. The computing engine 604 may be a systolic circuit that includes the systolic array and one or more rounders to receive an output of the systolic array and round the output based on a random number.

In order to generate a rounded output, in block 1502, a rounder receives a first number. The first number may have a first bit-length (e.g., 16 bits, 21 bits, etc.). The rounder may be a part of a reducer that converts outputs (e.g., an FP32 number) to reduced outputs (e.g., an FP16 number). Therefore, the rounder can receive the first number.

To identify how to generate the rounded output, in block 1504, the rounder determines a data type conversion (e.g., a source/destination data type pair) associated with the first number. The rounder may determine the data type conversion from a plurality of data type conversions. Each of the data type conversions may specify a source data type and a destination data type. Further, the source data type may specify a data type of the first number and the destination data type may specify a data type of the first rounded number. For example, the data type conversion may specify FP32 as the source data type and FP16 as the destination data type, 32-bit number as the source data type and an 18-bit number as the destination data type, etc. Further, the data type conversion may specify a first bit-length from a plurality of input bit-lengths and a second bit-length (e.g., a specified output bit-length) from a plurality of potential output bit-lengths. The data type conversion can identify a difference between a bit-length of the first number (e.g., the first bit-length) and a bit-length of the reduced number (e.g., a second bit-length). For example, the data type conversion may specify that the first number is to be rounded and 5-bits of the first number are to be dropped. Further, the first number may include a 23-bit significand and the data type may indicate that the leftmost 18-bits of the 23-bit significand and the rightmost 5-bits of the 23-bit significand are to be dropped. The determined data type conversion may indicate a particular first bit-length and a particular second bit-length. In some embodiments, the rounder may receive the first number and metadata identifying one or more characteristics of the first number (e.g., the particular first bit-length and the particular second bit-length) via one or more data paths. Therefore, the rounder can determine the data type conversion associated with the first number.

In block 1506, the rounder selects a random number generator based on the data type conversion. The rounder may select the random number generator from a plurality of random number generators (e.g., a plurality of maximal length LFSRs) based on the data type. Each of the plurality of random number generators may generate one or more pseudo-random numbers. The plurality of random number generators may include a random number generator for each of the plurality of data type conversions. Further, the plurality of random number generators may include a random number generator for each bit-length associated with each data type conversion. For example, each random number generator may be associated with a particular combination of a source data type and a destination data type (e.g., a first random number generator may be associated with conversion from a first bit-length to a second bit-length, a second random number generator may be associated with conversion from the first bit-length to a third bit-length, a third random number generator may be associated with conversion from a fourth bit-length to the third bit-length, etc.). Each random number generator may have a bit-length equal to a difference in bit-length between a particular first bit-length of a number and a particular second bit-length. The selected random number generator may have a bit length that is equal to and/or matches a difference between the first bit-length and the second bit-length associated with the determined data type conversion. For example, the data type conversion may identify a bit-length of 8-bits and the rounder may identify a random number generator with a bit-length of 8-bits. Additionally, the rounder may select a first random number generator with a particular bit-length based on the first number having a data type specifying FP32 as the source data type and FP16 as the destination data type and a second random number generator with a particular bit-length based on the first number having a data type specifying a 32-bit output as the source data type and an 18-bit output as the destination data type, etc. Therefore, the rounder can select the random number generator.

In order to round an output, in block 1508, the rounder performs the rounding operation to round the first number based on a random number (e.g., a pseudo random number) generated by the random number generator. The random number generated by the random number generator may be associated with the second-bit length of the determined data type conversion and/or the difference in bit-length between the first-bit length and the second bit-length associated with the determined data type conversion. The rounder may round the first number by adding the random number to the first number. The rounding operation may include stochastic rounding, rounding to nearest even, rounding to zero, rounding down, or any other type of rounding. Further, the rounder may round the first number to result in a second number of the second bit-length associated with the determined data conversion.

In some embodiments, the rounder may provide the first rounded number to a trailing bit reducer of a reducer to reduce the number of bits of the rounded number and generate a first reduced number. The reducer may convert m-bit floating point number to one or more n-bit floating point numbers where m can be any number and n may be any number less than m. For example, the reducer may convert 32-bit floating-point number to a plurality of 22-bit floating point numbers using the rounder and the trailing bit reducer. The first reduced number may have a second bit-length (e.g., the second bit-length less than the first bit-length). Further, the first reduced number may correspond to a set of most significant bits of a significand portion of the first number. The trailing bit reducer may provide the first reduced number to a processing element (e.g., a processing element of a systolic array) and the processing element may perform multiply-accumulate operations on the first reduced number and a corresponding weight (e.g., a reduced weight). The processing element may perform the multiply-accumulate operations using a multiplier and an adder. Therefore, the rounder can perform the rounding operation to round the first number.

In some embodiments, the rounder may receive a third number with a third bit-length and may determine that the rounder is not configured to convert numbers with the third bit-length. Further, the rounder can output an error identifier based on determining that the rounder is not configured to convert numbers with the third bit-length.

Turning to FIG. 9A-9H, to better illustrate operation of a systolic array utilizing multiple combinations of reduced inputs, FIG. 9A-9H illustrates an example four PE column 900 of a systolic array for neural network computations processing multiply-accumulate operations over systolic intervals 0 through 9 according to certain examples of the disclosed technologies. The PE column 900 may be part of a systolic array similar to the systolic array 100A in FIG. 1A, which may extend for any plurality of rows and plurality of columns. In some embodiments, the systolic array may include a full multiply-accumulate operation for each combination of reduced inputs (e.g., low input/weight and high input/weight) and the output of each operation may be summed.

The PE column 900 includes four PEs labeled as PE00, PE10, PE20, and PE30 according to their row and column (RC) number. In the example of FIGS. 9A-9H, the column 900 is implementing two-pass multiply-accumulate operations. For example, an input data element may be converted into two reduced input data elements for multiply-accumulate operations. The weight may be preloaded into the array and the weight may be used in multiply-accumulate operations for each reduced input to generate an output. In some embodiments, the weight may also be converted into two (or any number of) reduced weights). A first reduced weight (e.g., the low reduced weight) from the weight may be preloaded for multiply-accumulate operations with reduced input data elements and, subsequently, a second reduced weight (e.g., the high reduced weight) from the weight may be loaded for multiply-accumulate operations with the same reduced input data elements. The output for each combination of a reduced input and a reduced weight may be summed to generate a total output. It will be understood that the column 900 may implement n-pass multiply accumulate operations where n can be any number. For example, the weight can be converted into any number of reduced weights and each weight may iteratively loaded into the systolic array for multiply-accumulate operations with a set of reduced input data elements.

Each PE illustratively includes a multiplier with a single systolic interval latency (e.g., inputs provided at interval n are provided as outputs at interval n+1) and an adder with a two-interval latency (e.g., inputs provided at interval n are provided as outputs at interval n+2). Adders with other latencies may be implemented. As shown in FIGS. 9A-9H, each PE of the PE column 900 respectively includes a data register Data RegRC for receiving an input data element, a weight storing register Weight RegRC, a multiplier represented by an "X", and an adder or accumulator represented by a "+".

Values provided as input partial sums at systolic intervals 0-9 are shown along the top, with PE00 receiving values A1. (While value A1 is shown for illustrative purposes, in some instances all partial input sums fed to a top row of an array may be set to the same value, which may be zero). Values provided as input data elements at systolic intervals 0-9 are shown along the left column, with PE00 in row 0 receiving values C1 and C2 at the illustrated times, PE10 in row 1 receiving values D1 and D2 at the illustrated times, PE20 in row 2 receiving values E1 and E2 at the illustrated times, and PE30 in row 3 receiving values F1 and F2 at the illustrated times. C1, D1, E1, and F1 may each be a first reduced input data element (e.g., a low reduced input data element) and C2, D2, E2, and F2 may each be a second reduced input data element (e.g., a high reduced input data element). G1, H1, I1, and J1 may be the weight. In some embodiments, the weights may be each converted into a first reduced weight (e.g., a low reduced weight) and a second reduced weight (e.g., a high reduced weight). When no value is illustrated, a zero or NOP can be assumed. Where indicated, the system is initialized with zero values for clarity and to facilitate understanding. However, other examples can occur at different states and/or with other internal values.

FIG. 9A-9H show the progression of data as multiply-accumulate operations are performed. The multiply-accumulate operations across the shown intervals include (as discussed in more detail below): multiplying weight G1 by input data element C1 and accumulating input partial sum A1; multiplying weight G1 by input data element C2; multiplying weight H1 by input data element D1 and accumulating input partial sum X1 from PE00; multiplying weight H1 by input data element D2 and accumulating input partial sum X2 from PE00; multiplying weight I1 by input data element E1 and accumulating input partial sum Y1 from PE10; multiplying weight I1 by input data element E2 and accumulating input partial sum Y2 from PE10; multiplying weight J1 by input data element F1 and accumulating input partial sum Z1 from PE20; and multiplying weight J1 by input data element F2 and accumulating input partial sum Z2 from PE20. The technology disclosed herein can extend to additional sequences of input data elements and input partial sums.

Figure 9A:
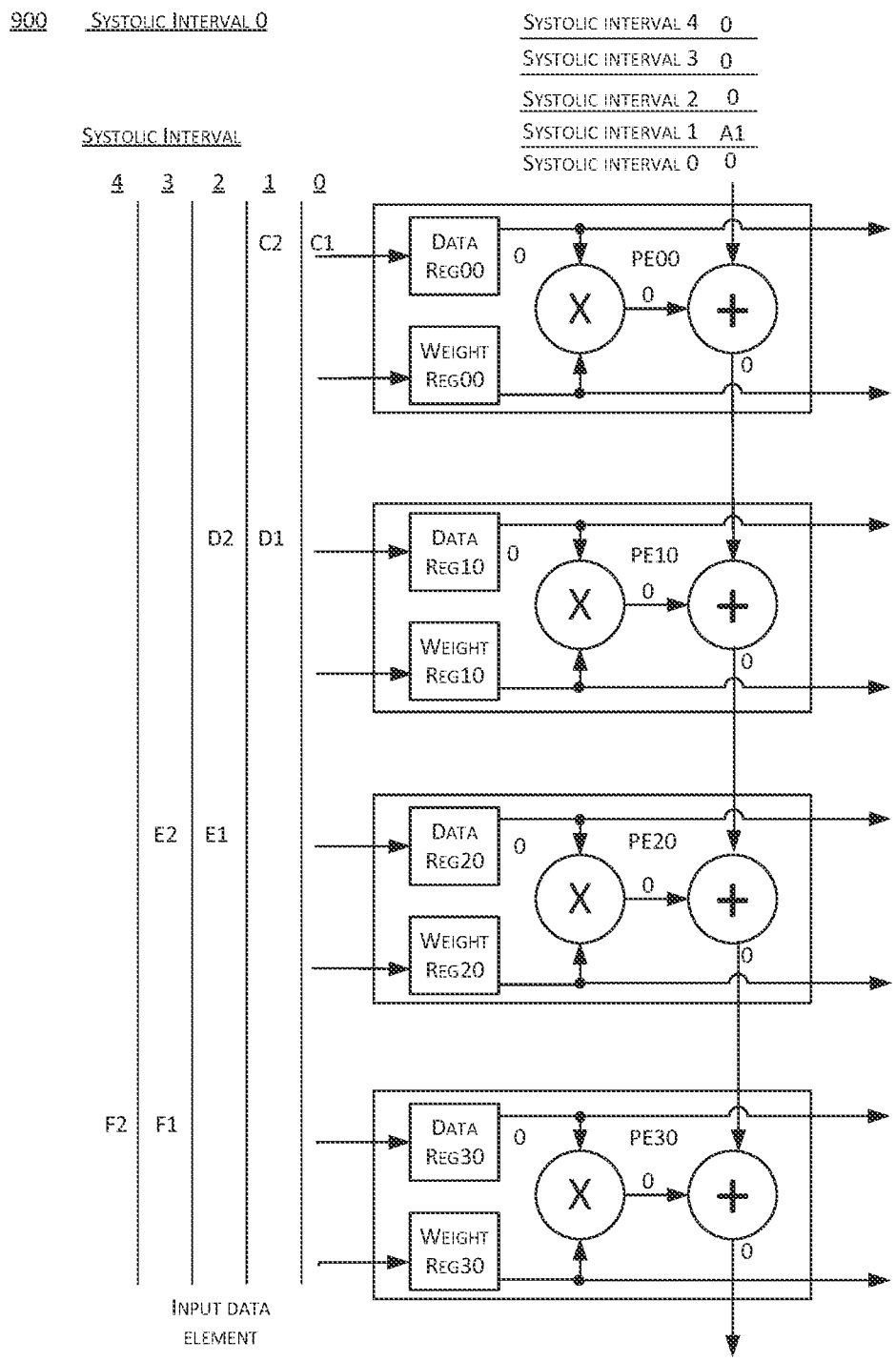
FIGS. 9A-9H show an example systolic array processing data over a sequence of systolic intervals.

FIG. 9A shows the state of the PE column 900 at systolic interval 0. The weights G1, H1, I1, and J1 are each pre-loaded into respective weight registers. For example, the weights G1, H1, I1, and J1 may be pre-loaded in a weight load operation. In PE00, an input data element C1 is received for writing to and storing in Data Reg00 for use during the next systolic interval. All other inputs and other states are initialized to zero.

Figure 9B:
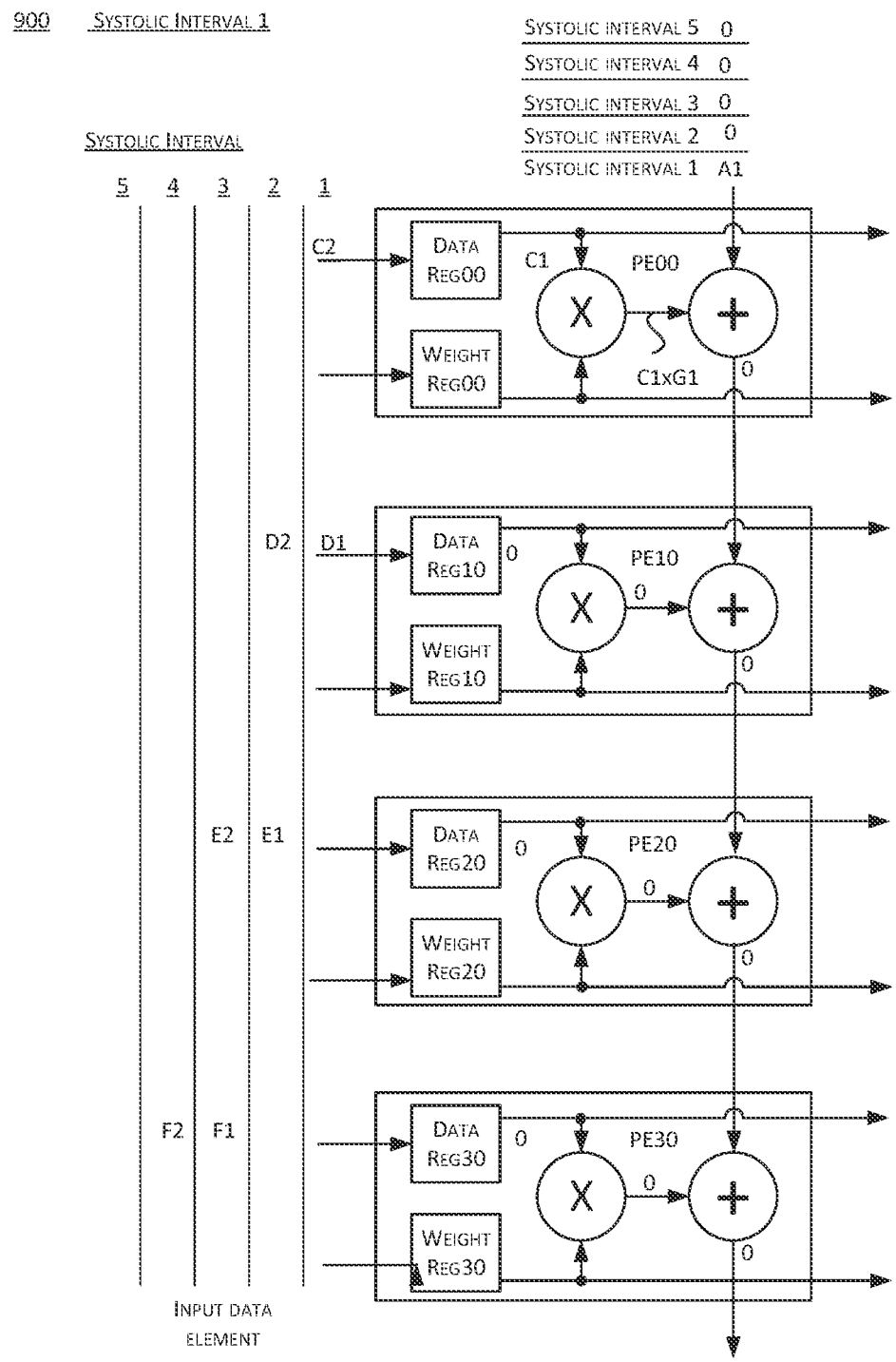

FIG. 9B shows the state of the PE column 900 at systolic interval 1. In PE00, an input data element C2 is received for writing to and storing in Data Reg00 for use during the next systolic interval. In some embodiments, the weight G1 may be preloaded into Weight Reg00 for multiply systolic intervals and may not be preloaded again. For example, the weight G1 may be preloaded for a plurality of multiply-accumulate operations with a plurality of reduced input data elements. The weight G1 may subsequently be replaced with a new weight, G2, for multiply-accumulate operations with the reduced inputs. For example, G1 and G2 may be reduced weights generated from a weight. Therefore, the weight G1 may only be preloaded into the array once. It will be understood that the combination of inputs or weights may be ordered such that any of the reduced inputs or weights may be stored in respective data registers for multiple systolic intervals and may not be reread into the PE. For example, the combinations of reduced inputs or weights may be ordered or distributed such that the weight G1 is not reread into the PE. The stored input data element C1 is read from Data Reg00 and provided as an input to both the multiplier of PE00 and a data register of a PE in a subsequent column. The multiplier in PE00 multiplies C1 by G1 to generate a multiplication result C1×G1, which is provided to an adder for PE00. The input partial sum A1 is also received at the adder for PE00. Each adder is pipelined with a latency of 2 intervals, and as such processes the respective input partial sum and the respective multiplication result during a time period corresponding to the latency (e.g., the subsequent 2 intervals).

In PE10, an input data element D1 is received for writing to and storing in Data Reg10 for use during the next systolic interval.

Figure 9C:
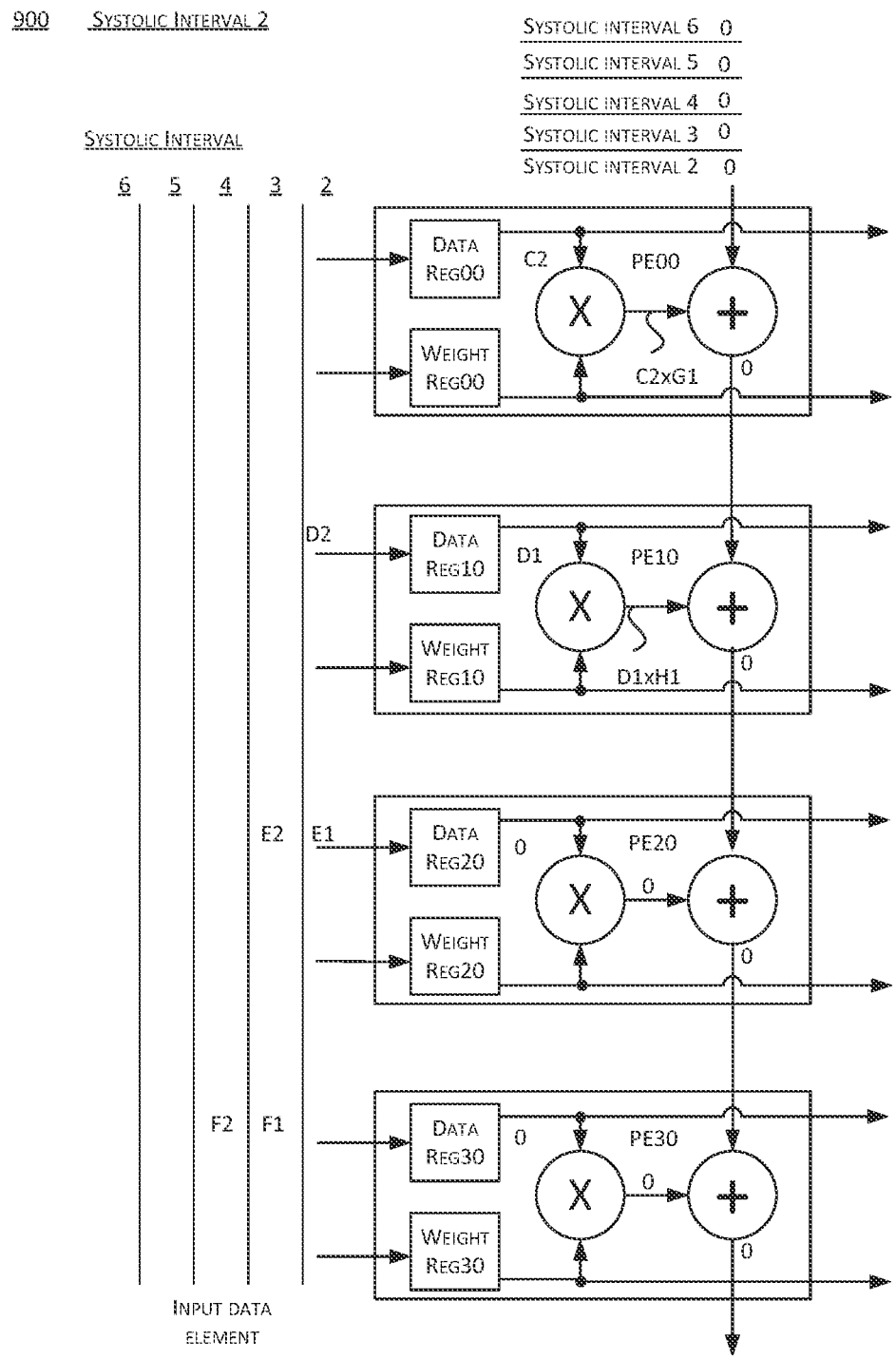

FIG. 9C shows the state of the PE column 900 at systolic interval 2. In PE00, the input data element C2 is read from Data Reg00 and provided as an input to both the multiplier of PE00 and a data register of a PE in a subsequent column. The multiplier in PE00 multiplies C2 by G1 to generate a multiplication result C2×G1, which is provided to the adder for PE00 for use in an adder operation. Note that during systolic interval 2, the adder of PE00 continues to conduct an add operation between the multiplication result C1×G1 and the input partial sum A1, as obtained during interval 1.

In PE10, an input data element D2 is received for writing to and storing in Data Reg10 for use during the next systolic interval. The stored input data element D1 is read from Data Reg10 and provided as an input to both the multiplier of PE10 and a data register of a PE in a subsequent column. The multiplier in PE10 multiplies D1 by H1 to generate a multiplication result D1×H1, which is provided to an adder for PE10.

In PE20, an input data element E1 is received for writing to and storing in Data Reg20 for use during the next systolic interval.

Figure 9D:
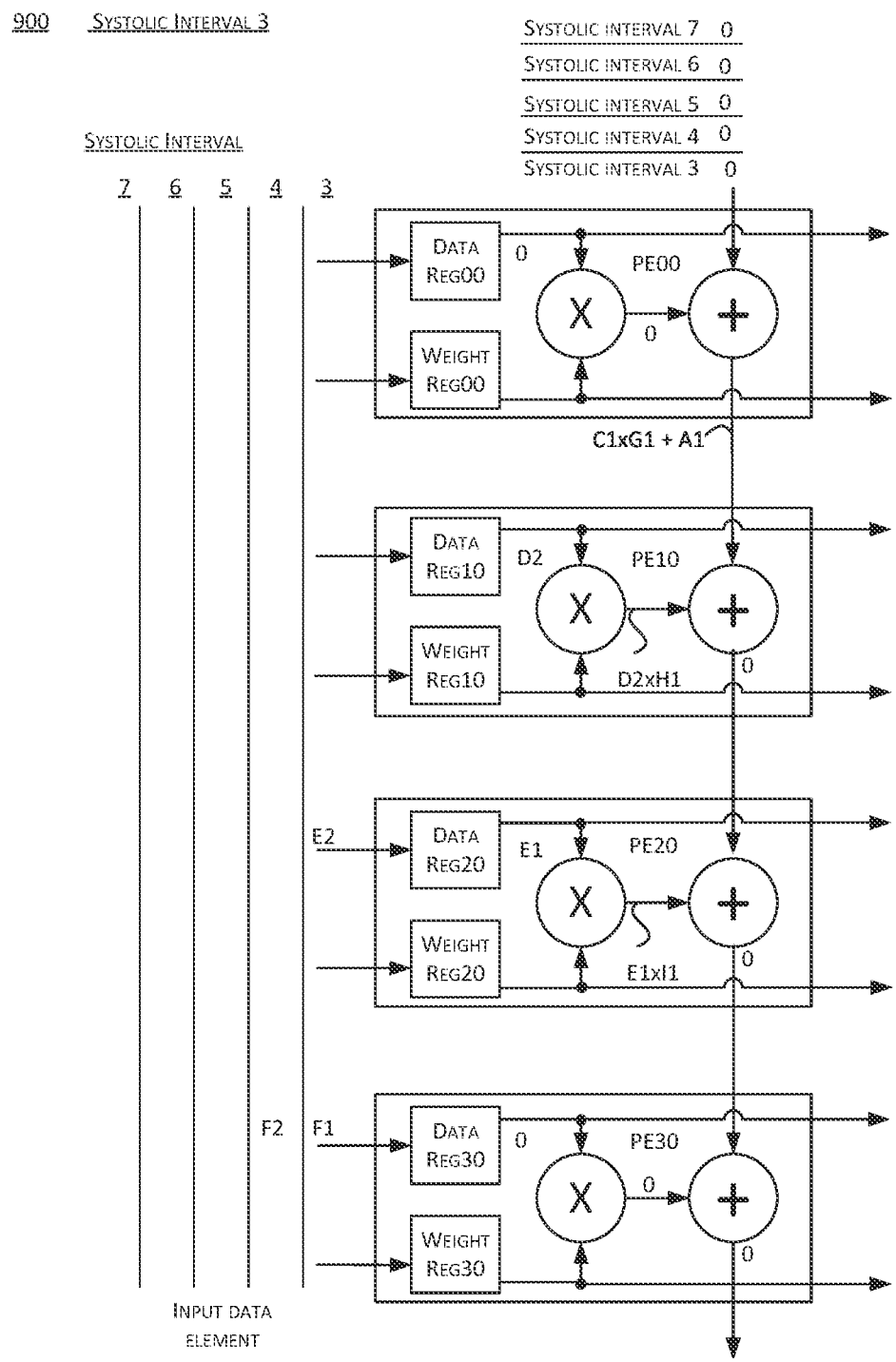

FIG. 9D shows the state of the PE column 900 at systolic interval 3. In PE00, the adder completes the addition of A1 and C1×G1 and generates an addition result, A1+C1×G1. The addition result, A1+C1×G1, is communicated to PE10 as an input partial sum. The additional result of a PE within a given column can generally be referred to herein as a "partial sum." Note that during systolic interval 3, the adder of PE00 continues to conduct an add operation between the multiplication result C2×G1, as obtained during interval 2.

In PE10, the stored input data element D2 is read from Data Reg10 and provided as an input to both the multiplier of PE10 and a data register of a PE in a subsequent column. The multiplier in PE10 multiplies D2 by H1 to generate a multiplication result D2×H1, which is provided to an adder for PE10. The input partial sum, C1×G1+A1, is received from PE00 and is also provided to the adder for PE10 for use in the adder operation. Note that during systolic interval 3, the adder of PE10 continues to conduct an add operation between the multiplication result D1×H1 and the input partial sum from PE00 (A1+C1×G1).

In PE20, an input data element E2 is received for writing to and storing in Data Reg20 for use during the next systolic interval. The stored input data element E1 is read from Data Reg20 and provided as an input to both the multiplier of PE20 and a data register of a PE in a subsequent column. The multiplier in PE20 multiplies E1 by I1 to generate a multiplication result E1×I1, which is provided to the adder for PE20 for use in an adder operation.

In PE30, an input data element F1 is received for writing to and storing in Data Reg30 for use during the next systolic interval.

Figure 9E:
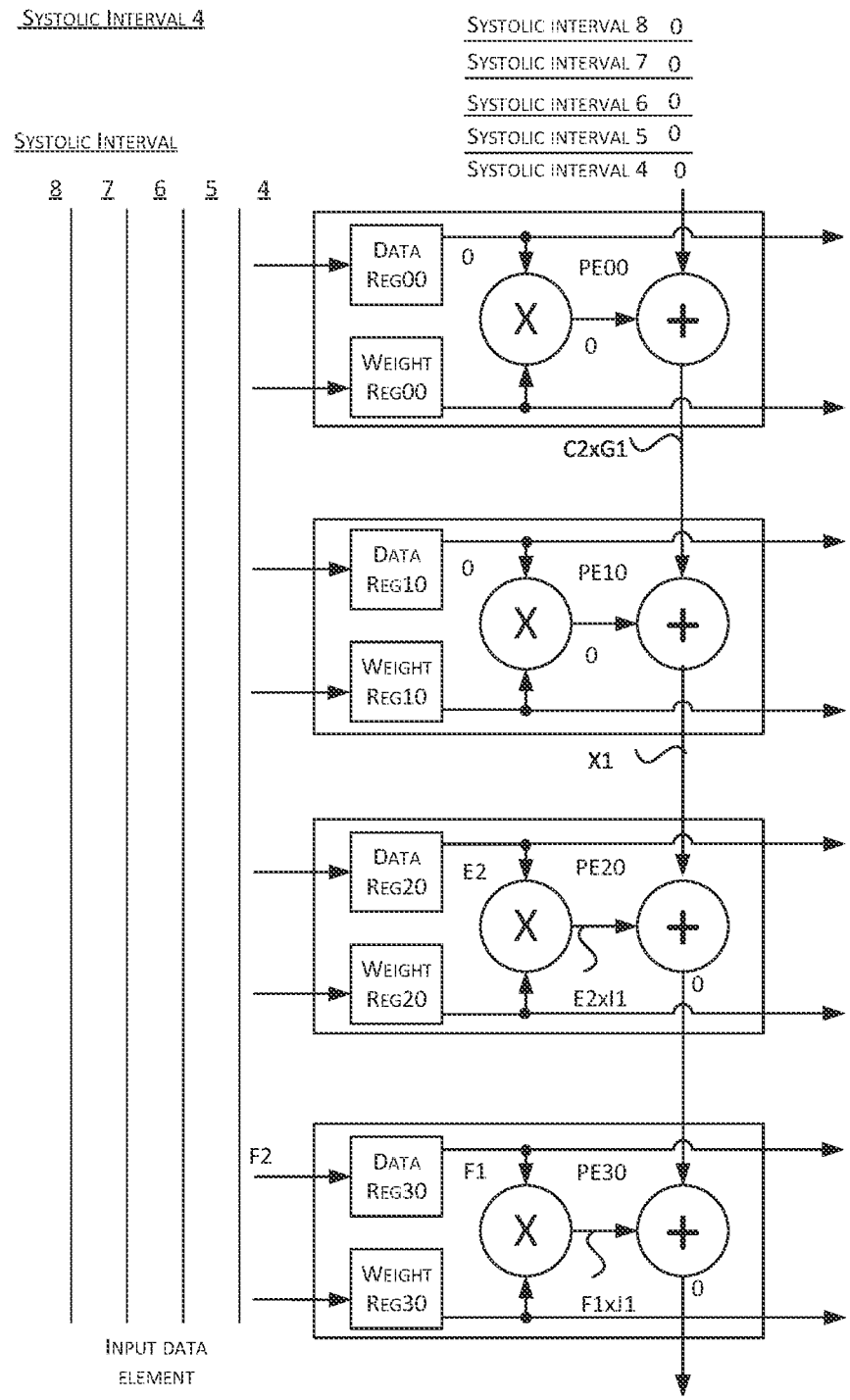

FIG. 9E shows the state of the PE column 900 at systolic interval 4. The adder completes the addition of 0 and C2×G1 and generates an addition result, C2×G1. In some embodiments, the input partial sum A1 may be added to each combination of the reduced inputs. For example, where each input is converted into two reduced inputs resulting in four combinations of reduced inputs for each weight and input data element (e.g., a four-pass multiply-accumulate operation for a pair of inputs), the input partial sum may be added to each combination of reduced inputs. In other embodiments, a portion of the input partial sum may be added to each combination of reduced inputs. For example, the input partial sum may be divided across each combination of reduced inputs. The addition result, C2×G1, is communicated to PE10 as an input partial sum.

In PE10, the input partial sum, C2×G1, is received from PE00 and is also provided to the adder for PE10 for use in the adder operation. Note that during systolic interval 4, the adder of PE10 continues to conduct an add operation between the multiplication result D2×H1 and the input partial sum from PE00 (C2×G1).

Further, in PE10, the adder completes the addition of D1×H1+C1×G1+A1 and generates an addition result, X1. The addition result, X1, is communicated to PE20 as an input partial sum.

In PE20, the stored input data element E2 is read from Data Reg20 and provided as an input to both the multiplier of PE20 and a data register of a PE in a subsequent column. The multiplier in PE20 multiplies E2 by I1 to generate a multiplication result E2×I1, which is provided to the adder for PE20 for use in an adder operation. The input partial sum, X1, is received from PE10 and is also provided to the adder for PE20 for use in the adder operation. Note that during systolic interval 4, the adder of PE20 continues to conduct an add operation between the multiplication result E1×I1 and the input partial sum from PE10 (X1).

In PE30, an input data element F2 is received for writing to and storing in Data Reg30 for use during the next systolic interval. The stored input data element F1 is read from Data Reg30 and provided as an input to both the multiplier of PE30 and a data register of a PE in a subsequent column. The multiplier in PE30 multiplies F1 by J1 to generate a multiplication result F1×J1, which is provided to the adder for PE30 for use in an adder operation.

Figure 9F:
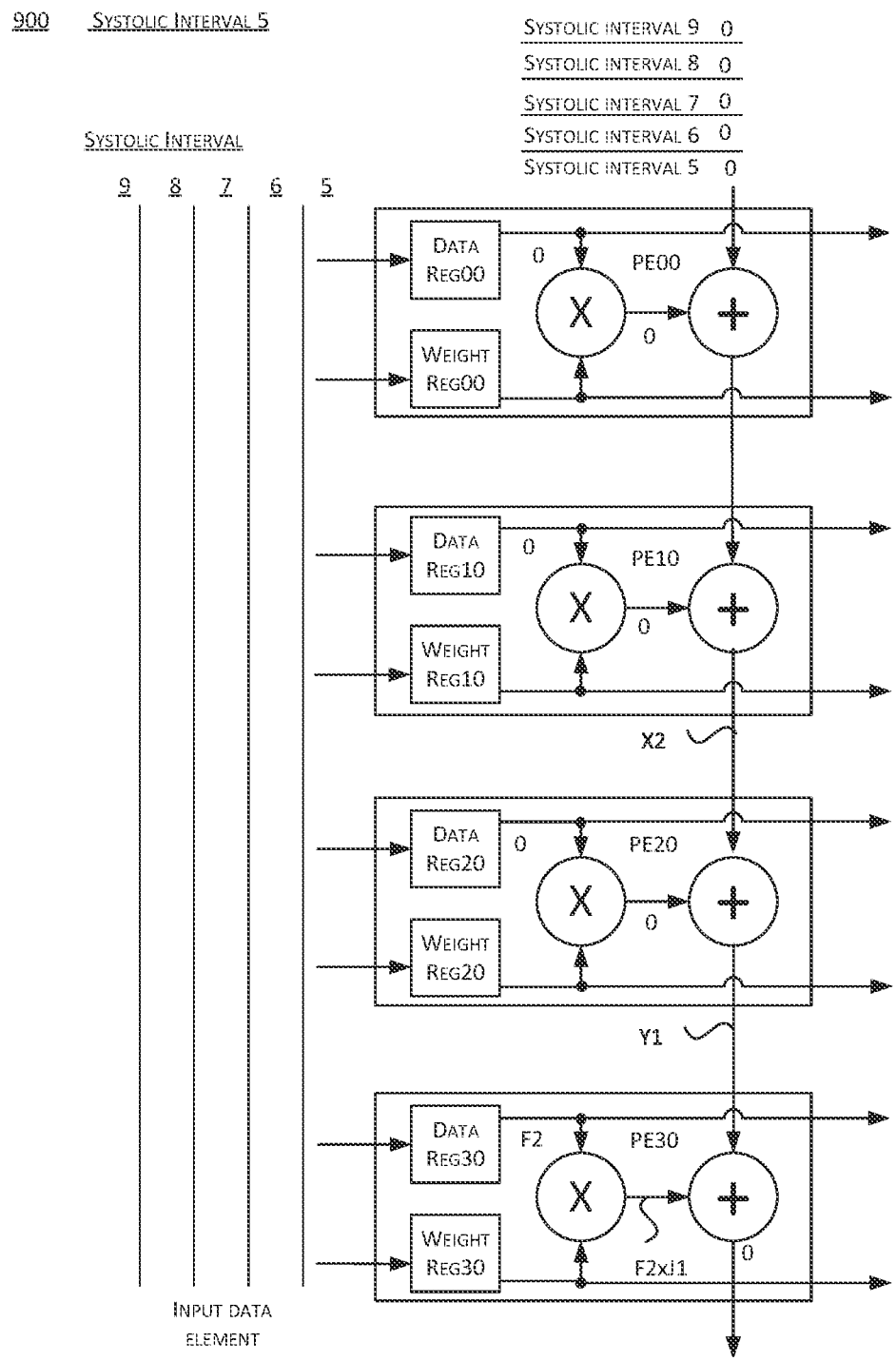

FIG. 9F shows the state of the PE column 900 at systolic interval 5. In PE10, the adder completes the addition of D2×H1+C2×G1 and generates an addition result, X2. The addition result, X2, is communicated to PE20 as an input partial sum.

In PE20, the input partial sum, X2, is received from PE10 and is also provided to the adder for PE20 for use in the adder operation. Note that during systolic interval 5, the adder of PE20 continues to conduct an add operation between the multiplication result E2×I1 and the input partial sum from PE10 (X2).

Further, in PE20, the adder completes the addition of E1×I1+X1 and generates an addition result, Y1. The addition result, Y1, is communicated to PE30 as an input partial sum.

In PE30, the stored input data element F2 is read from Data Reg30 and provided as an input to both the multiplier of PE30 and a data register of a PE in a subsequent column. The multiplier in PE30 multiplies F2 by J1 to generate a multiplication result F2×J1, which is provided to the adder for PE30 for use in an adder operation. Note that during systolic interval 5, the adder of PE30 continues to conduct an add operation between the multiplication result F1×J1, as obtained during interval 4 and the input partial sum from PE20 (Y1).

Figure 9G:
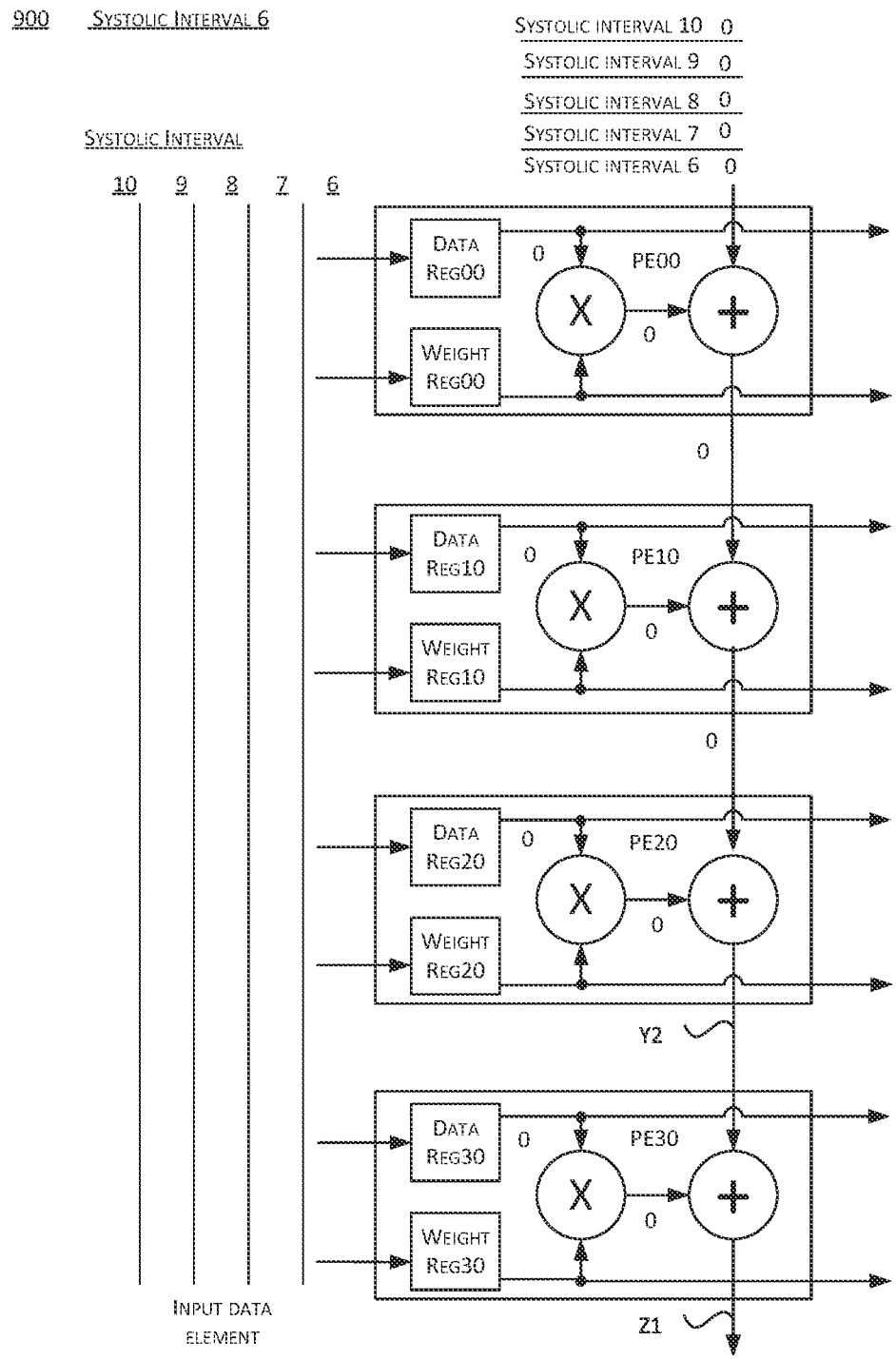

FIG. 9G shows the state of the PE column 900 at systolic interval 6. In PE20, the adder completes the addition of E2×I1+X2 and generates an addition result, Y2. The addition result, Y2, is communicated to PE30 as an input partial sum.

In PE30, the adder of PE30 continues to conduct an add operation between the multiplication result F2×J1, as obtained during interval 5 and the input partial sum from PE20 (Y2).

Further, in PE30, the adder completes the addition of F1×J1+Y1 and generates an addition result, Z1. The addition result, Z1, may be communicated to another PE and/or to an aggregator for aggregation with additional combinations of the reduced inputs for a particular set of inputs.

Figure 9H:
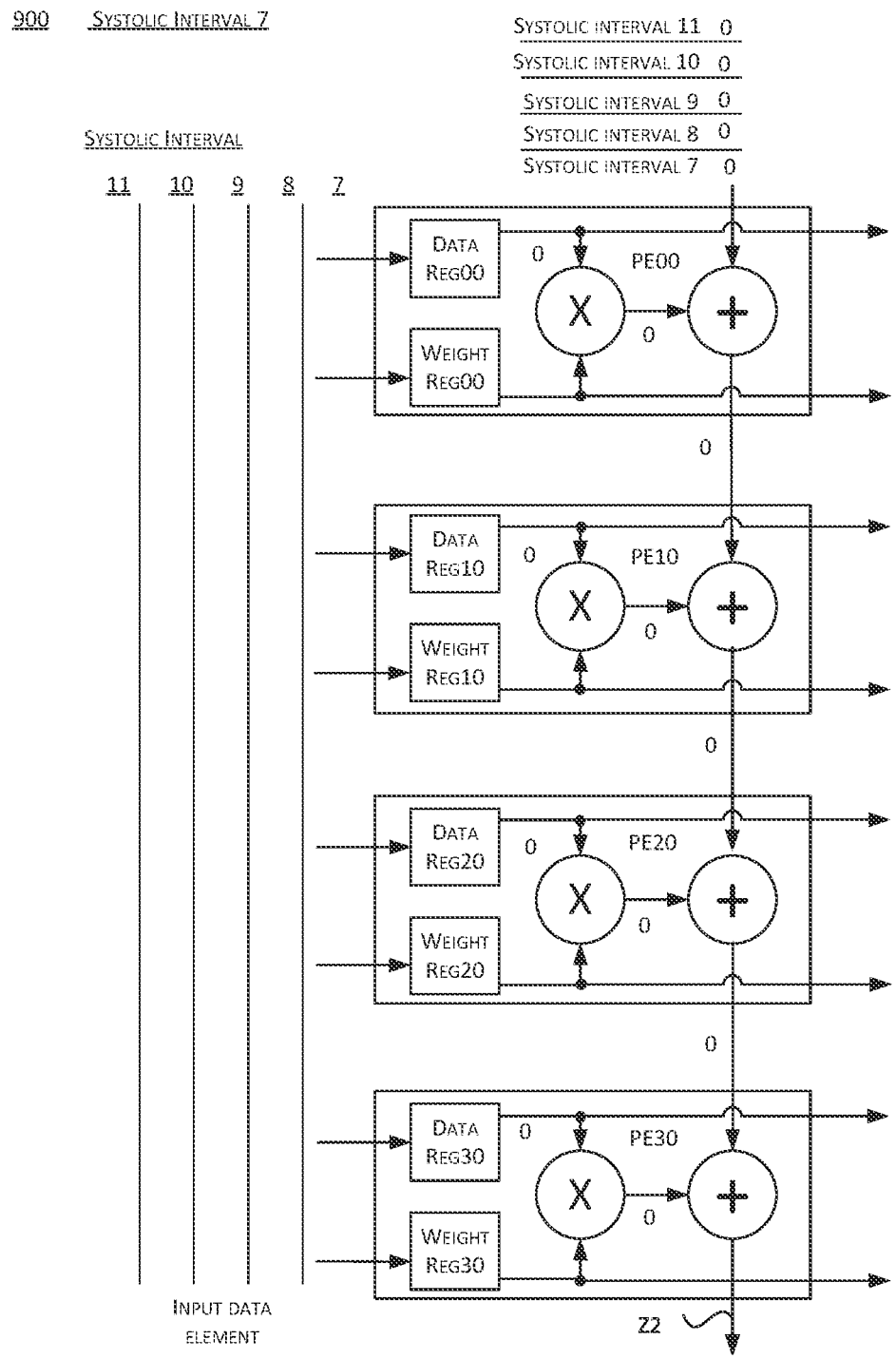

FIG. 9H shows the state of the PE column 900 at systolic interval 7. In PE30, the adder completes the addition of F2×J1+Y2 and generates an addition result, Z2. The addition result, Z2, may be communicated to another PE and/or to an aggregator for aggregation with additional combinations of the reduced inputs for a particular set of inputs.

The examples states of data flow illustrated in FIG. 9A-9H can be performed for one or more starting input data elements and for any number of starting input partial sums.

Figure 10:
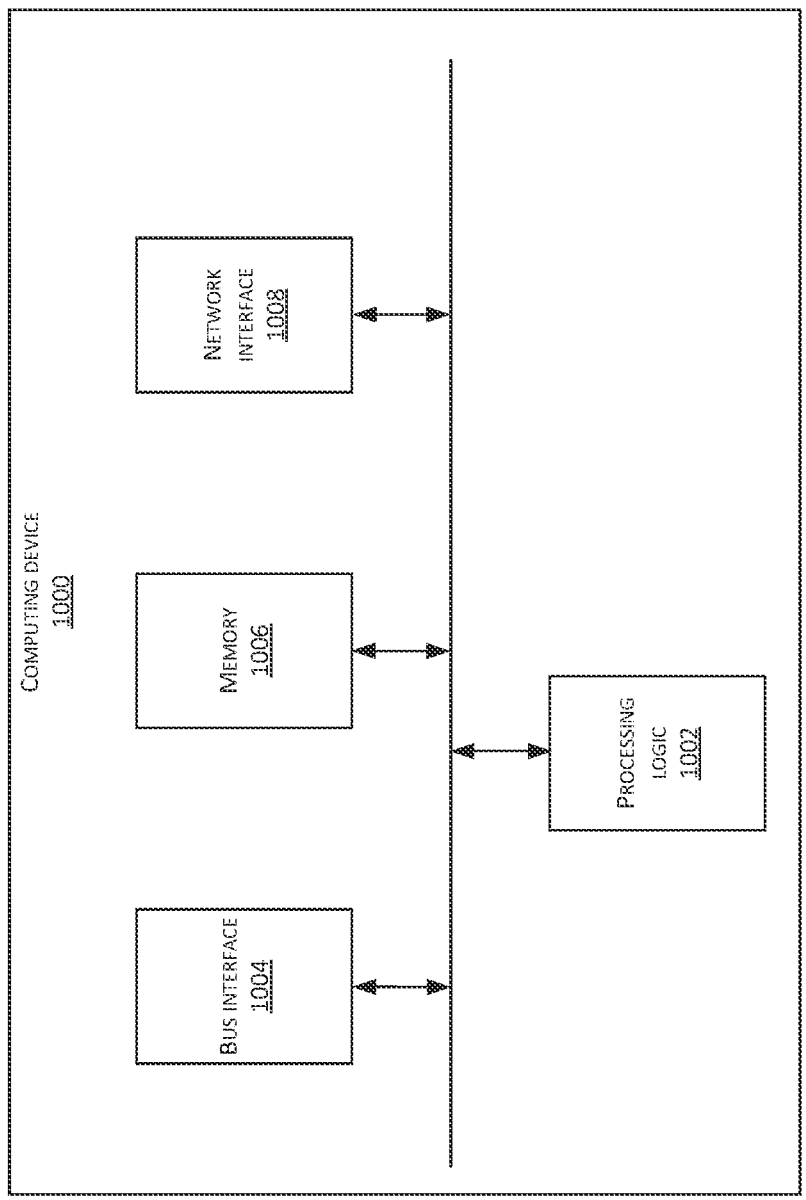
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. A computing device 1000 may perform computations to facilitate processing of a task. As an illustrative example, computing device 1000 can be part of a server in a multi-tenant compute service system. Various hardware and software resources of computing device 1000 (e.g., the hardware and software resources associated with data processing) can be allocated to a client upon request.

In one example, the computing device 1000 may include processing logic 1002, a bus interface module 1004, memory 1006, and a network interface module 1008. These modules may be hardware modules, software modules, or a combination of hardware and software. In certain instances, modules may be interchangeably used with components or engines, without deviating from the scope of the disclosure. The computing device 1000 may include additional modules, which are not illustrated here for the ease of illustration. In some embodiments, the computing device 1000 may include fewer modules. For example, one or more of the modules may be combined into one module. One or more of the modules may be in communication with each other over a communication channel 1010. The communication channel 1010 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), and network processing units (NPUs), processors configured to execute instructions or any other circuitry to perform logical arithmetic and floating-point operations. Examples of processors that may be included in the processing logic 1002 may include processors developed by ARM®, MIPS®, AMD®, Intel®, Qualcomm®, and the like. In some embodiments, the processors may include multiple processing cores and each processing core may execute instructions independently of the other processing cores. Further, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some embodiments, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1006. The processing logic 1002 may also include hardware circuities for performing artificial neural network computations including, for example, the neural network processor 602, etc.

The access to the processing logic 1002 can be granted to a client to provide the personal assistant service requested by the client. For example, the computing device 1000 may host a virtual machine, on which an image recognition software application can be executed. The image recognition software application, upon execution, may access the processing logic 1002 to predict, for example, an object included in an image. As another example, access to the processing logic 1002 can also be granted as part of bare-metal instance, in which an image recognition software application executing on a client device (e.g., a remote computer, a smart phone, etc.) can directly access the processing logic 1002 to perform the recognition of an image.

The memory 1006 may include either volatile or non-volatile, or both volatile and non-volatile types of memory. The memory 1006 may, for example, include random access memory (RAM), read only memory (ROM), Electrically Erasable Programmable Read-Only Memory (EEPROM), flash memory, and/or some other suitable storage media. In some cases, some or all of the memory 1006 may be internal to the computing device 1000, while in other cases some or all of the memory may be external to the computing device 1000. The memory 1006 may store an operating system comprising executable instructions that, when executed by the processing logic 1002, provides the execution environment for executing instructions providing functionality to perform convolution computations for the computing device 1000. The memory 1006 may also store, for example, software applications for performing artificial neural network computations. The memory may also store and maintain several data structures and tables for facilitating the functionality of the computing device 1000.

The bus interface module 1004 may enable communication with external entities, such as a host device and/or other components in a computing system, over an external communication medium. The bus interface module 1004 may include a physical interface for connecting to a cable, socket, port, or other connection to the external communication medium. The bus interface module 1004 may further include hardware and/or software to manage incoming and outgoing transactions. The bus interface module 1004 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1004 may include the physical layer for any of these bus protocols, including a connector, power management, and error handling, among other things. In some embodiments, the computing device 1000 may include multiple bus interface modules for communicating with multiple external entities. These multiple bus interface modules may implement the same local bus protocol, different local bus protocols, or a combination of the same and different bus protocols.

The network interface module 1008 may include hardware and/or software for communicating with a network. This network interface module 1008 may, for example, include physical connectors or physical ports for wired connection to a network, and/or antennas for wireless communication to a network. The network interface module 1008 may further include hardware and/or software implementing a network protocol stack. The network interface module 1008 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some embodiments, the computing device 1000 may include multiple network interface modules, each configured to communicate with a different network. For example, the computing device 1000 may include a network interface module for communicating with a wired Ethernet network, a wireless 1002.11 network, a cellular network, an Infiniband network, etc. In some embodiments, the computing device 1000 may receive a set of parameters, such as the aforementioned weight values for convolution computations, from a server through network interface module 1008.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Various example embodiments of the disclosure can be described by the following clauses:

Clause 1: A systolic array processor configured to perform matrix multiplication between two input matrices and provide, as a result, a set of 32-bit values, wherein the systolic array processor comprises:
  a rounder configured to perform a set of stochastic rounding operations to stochastically round individual 32-bit values of the set of 32-bit values to result in a set of 16-bit outputs, wherein individual stochastic rounding operations of the set of stochastic rounding operations rely on individual pseudo-random numbers of a set of pseudo-random numbers;
  a plurality of maximal length linear feedback shift registers (LFSRs) configured to deterministically generate the set of pseudo-random numbers, wherein each maximal length LFSR is associated with a pseudo-random number sequence and is configured to generate a next pseudo-random number in the pseudo-random number sequence based on a state value representing a position within the pseudo-random number sequence;
  wherein, to generate the set of pseudo-random numbers, each maximal length LFSR is configured, for each subset of the set of pseudo-random numbers, to:
    assume a state matching a current state value from a state value store shared among the plurality of maximal length LFSRs; and
    cycle through a number of positions within the pseudo-random number sequence based on a relative position of the maximal length LFSR among the plurality of maximal length LFSRs to arrive at a resultant pseudo-random number to be included within the set of pseudo-random numbers;
  wherein a final maximal length LFSR of the plurality of maximal length LFSRs is configured, for each subset of the set of pseudo-random numbers, to update the current state value of the state value store with a state of the final maximal length LFSR.

Clause 2: The systolic array processor of Clause 1, wherein the systolic array processor further includes a multiplexer configured to select the final maximal length LFSR from the plurality of maximal length LFSRs.

Clause 3: The systolic array processor of Clause 1, wherein the rounder is further configured to generate rounded 32-bit values based on performing the set of stochastic rounding operations, wherein the systolic array processor further includes a trailing bit reducer configured to:
  reduce a quantity of bits representing significands of the 32-bit values, and generate the 16-bit values based on reducing the quantity of bits representing the reduced significands of the 32-bit values.

Clause 4: The systolic array processor of Clause 1, wherein the rounder is further configured to select the plurality of maximal length LFSRs from a set of maximal length LFSRs based on a quantity of the plurality of maximal length LFSRs matching a selected number of parallel stochastic rounding operations.

Clause 5: An integrated circuit comprising:
  a rounder configured to:
    receive a first number;
    select a first random number generator from a plurality of random number generators, wherein the plurality of random number generators are associated with a random number sequence and are configured to generate a next random number in the random number sequence based on a respective state value representing a position within the random number sequence, wherein each of the plurality of random number generators is configured to:
      assume a state based on current state value from a state value store shared among the plurality of random number generators, and
      cycle through a number of positions within the random number sequence based on a relative position of the random number generator among the plurality of random number generators to arrive at a resultant random number; and
    perform a rounding operation to round the first number based on a resultant random number generated by the first random number generator.

Clause 6: The integrated circuit of Clause 5, wherein the rounder is further configured to generate one or more rounded numbers based on performing the rounding operation, wherein the systolic circuit further comprises a trailing bit reducer configured to:
  reduce a quantity of bits representing the one or more rounded numbers, and
  generate one or more reduced numbers based on reducing the quantity of bits representing the one or more rounded numbers.

Clause 7: The integrated circuit of Clause 5, wherein the rounder is further configured to select the plurality of random number generators from a set of random number generators based on a quantity of the plurality of random number generators matching a selected number of parallel rounding operations.

Clause 8: The integrated circuit of Clause 5, wherein a final random number generator of the plurality of random number generators is configured to update the current state value of the state value store with a state of the final random number generator.

Clause 9: The integrated circuit of Clause 8, wherein the systolic circuit further comprises a multiplexer configured to select a final random number generator from the plurality of random number generators.

Clause 10: The integrated circuit of Clause 8, wherein the rounder obtains an updated state value, wherein the systolic circuit further comprises a multiplexer configured to select the state of the final random number generator or the updated state value.

Clause 11: The integrated circuit of Clause 8, wherein the rounder obtains an updated state value, wherein the rounder is configured to update the current state value of the state value store with the updated state value.

Clause 12: The integrated circuit of Clause 5, wherein the rounding operation comprises a stochastic rounding operation.

Clause 13: The integrated circuit of Clause 5, wherein each of the plurality of random number generators is configured to generate one or more pseudo-random numbers, wherein the resultant random number generated by the random number generator comprises a pseudo-random number.

Clause 14: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number.

Clause 15: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to receive as input numbers matching a bit format of the output floating-point number.

Clause 16: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to output floating point numbers matching a bit format of the input floating-point number.

Clause 17: The integrated circuit of Clause 5, wherein the rounding operation is a first rounding operation, wherein the rounder is further configured to:
receive a second number;
select a second random number generator from a plurality of random number generators; and
perform a second rounding operation to round the second number based on a resultant random number generated by the second random number generator.

Clause 18: The integrated circuit of Clause 5, wherein to select the first random number generator, the rounder is further configured to select the first random number generator based on:
a relative position of the first number in a set of numbers being rounded in parallel; and
a relative position of the first random number generator in the plurality of random number generators.

Clause 19: A method, comprising:
receiving a first number;
identifying a first random number generator of a plurality of random number generators, wherein each of the plurality of random number generators is associated with a random number sequence and is configured to generate a next random number in the random number sequence based on a respective state value representing a position within the random number sequence, wherein each of the plurality of random number generators is configured to assume a state based on current state value shared among the plurality of random number generators and cycle through a number of positions within the random number sequence based on a relative position of the random number generator among the plurality of random number generators to arrive at a resultant random number; and
performing a rounding operation to round the first number based on a resultant random number generated by the first random number generator.

Clause 20: The method of Clause 19, further comprising selecting the plurality of random number generators from a set of random number generators based on a quantity of the plurality of random number generators matching a selected number of parallel rounding operations.

Various example embodiments of the disclosure can be described by the following clauses:

Clause 1: A processor configured to perform operations to result in a set of 32-bit values, wherein the set of 32-bit values are organized into at least two data streams, wherein the processor comprises:
a rounder configured to perform a set of stochastic rounding operations to stochastically round individual 32-bit values of the set of 32-bit values to result in a set of 16-bit outputs, wherein individual stochastic rounding operations of the set of stochastic rounding operations rely on individual pseudo-random numbers of a set of pseudo-random numbers;
a plurality of maximal length linear feedback shift registers (LFSRs) configured to deterministically generate the set of pseudo-random numbers, wherein each maximal length LFSR is associated with a pseudo-random number sequence and is configured to generate a next pseudo-random number in the pseudo-random number sequence based on a state value representing a position within the pseudo-random number sequence;
for each data stream of at least two data streams, an LFSR state register configured to store a state value representing a current LFSR position for the data stream;
wherein the processor is configured, when using an individual LFSR to begin generation of pseudo-random numbers with respect to a data stream of the at least two data streams, to initialize the state value of the individual LFSR based on the current LFSR position for the data stream stored within the LFSR state register for the data stream; and wherein the processor is configured to, when ending use of the individual LFSR for generation of pseudo-random numbers with respect to the data stream, to store the state value of the individual LFSR as the current LFSR position for the data stream within the LFSR state register for the data stream.

Clause 2: The processor of Clause 1, wherein the processor is further configured to identify the at least two data streams based on one or more of:
a source of the set of 32-bit values;
a data type of the set of 32-bit values;
a chunk of data of the set of 32-bit values; or
metadata associated with the set of 32-bit values.

Clause 3: The processor of Clause 1, wherein the processor is further configured to:
obtain the set of 32-bit values and metadata associated with the set of 32-bit values; and
identify the at least two data streams based on the metadata associated with the set of 32-bit values.

Clause 4: The processor of Clause 1, wherein to initialize the state value of the individual LFSR, the processor is further configured to replace a state value representing a current LFSR position for an additional data stream of the at least two data streams with a state value representing the current LFSR position for the data stream.

Clause 5: An integrated circuit comprising:
a rounder configured to:
receive a first number;
determine a first data stream of the first number from a plurality of data streams, wherein a number generator is associated with a number sequence and is configured to generate a next number in the number sequence based on a respective state value representing a position within the number sequence, wherein, for each data stream of the plurality of data streams, a state register is configured to store a state value representing a current position for the data stream;
initialize a state value of the number generator based on a current position for the first data stream stored within a state register for the first data stream; and
perform a rounding operation to round the first number and result in a second number based on a number generated by the number generator, wherein the number is generated based on initializing the state value of the number generator.

Clause 6: The integrated circuit of Clause 5, wherein the rounder is further configured to obtain the first number and metadata associated with the first number via a data path, wherein the metadata identifies the first data stream.

Clause 7: The integrated circuit of Clause 5, wherein the systolic circuit is configured to define the plurality of data streams.

Clause 8: The integrated circuit of Clause 5, wherein the rounder is further configured to identify the first data stream on one or more of:
a source of the first number;
a data type of the first number;
a chunk of data of the first number; or
metadata associated with the first number.

Clause 9: The integrated circuit of Clause 5, wherein to initialize the state value of the number generator, the rounder is further configured to replace a state value representing a current position for a second data stream of the plurality of data streams with a state value representing the current position for the first data stream.

Clause 10: The integrated circuit of Clause 5, wherein the rounder is further configured to generate one or more rounded numbers based on performing the rounding operation, wherein the systolic circuit further comprises a trailing bit reducer configured to:
reduce a quantity of bits representing the one or more rounded numbers, and
generate one or more reduced numbers based on reducing the quantity of bits representing the one or more rounded numbers.

Clause 11: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to receive as input numbers matching a bit format of the output floating-point number.

Clause 12: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to output floating point numbers matching a bit format of the input floating-point number.

Clause 13: The integrated circuit of Clause 5, wherein the number generator comprises a maximal length LFSR.

Clause 14: The integrated circuit of Clause 5, wherein the rounding operation is a stochastic rounding operation.

Clause 15: The integrated circuit of Clause 5, wherein the rounder is configured to, when ending use of the number generator with respect to the first data stream, store the state value of the number generator as the current position for the first data stream within the state register for the first data stream.

Clause 16: The integrated circuit of Clause 5, the systolic circuit further comprising the state register for each data stream of the plurality of data streams.

Clause 17: The integrated circuit of Clause 5, wherein the rounder is configured to, when switching the number generator from a second data stream to a first data stream, store an initial state value of the number generator as a current position for the second data stream within a state register for the second data stream.

Clause 18: A method, comprising:
receiving a first number;
determining a first data stream of the first number from a plurality of data streams, wherein a number generator is associated with a number sequence and is configured to generate a next number in the number sequence based on a respective state value representing a position within the number sequence, wherein each data stream of the plurality of data streams is associated with a respective state value representing a current position for the data stream;

initializing a state value of the number generator based on a current position for the first data stream; and performing a rounding operation to round the first number based on a number generated by the number generator, wherein the number is generated based on initializing the state value of the number generator.

Clause 19: The method of Clause 18, further comprising:
storing, in a state register, for each data stream of the plurality of data streams, a state value representing a current position for the data stream.

Clause 20: The method of Clause 19, storing the state value of the number generator as the current position for the first data stream within the state register for the first data stream when ending use of the number generator for the first data stream.

Various example embodiments of the disclosure can be described by the following clauses:

Clause 1: A processor, comprising:
a rounder configured to perform a set of stochastic rounding operations to stochastically round individual 32-bit values of a set of 32-bit values to result in a set of outputs with significands of a specified significand output bit-length from among a plurality of potential significand output bit-lengths, wherein individual stochastic rounding operations of the set of stochastic rounding operations rely on individual pseudo-random numbers of a set of pseudo-random numbers particular to the specified significand output bit-length; and a plurality of maximal length linear feedback shift registers (LFSRs) comprising, for each given output bit-length of the plurality of potential output bit-lengths, a maximal length LFSR of a bit length equal to a difference in bit-length between bit-lengths of significands of the set of 32-bit values and the given output significand bit-length;

wherein the processor is configured to select a maximal length LFSR to utilize for the set of stochastic rounding operations based on the bit-length of the selected maximal length LFSR matching the difference in bit-length between the bit-lengths of the significands of the set of 32-bit values and the specified output bit-length.

Clause 2: The processor of Clause 1, wherein the maximal length LFSR is a first maximal length LFSR, the set of stochastic rounding operations is a first set of stochastic rounding operations, the set of outputs is a first set of outputs, and the specified output bit-length is a first output bit-length, wherein the rounder is further configured to perform a second set of stochastic rounding operations to stochastically round individual 32-bit values of the set of 32-bit values to result in a second set of outputs of a second output bit-length from among the plurality of potential output bit-lengths, wherein the processor is configured to select a second maximal length LFSR to utilize for the second set of stochastic rounding operations based on the bit-length of the second maximal length LFSR matching the difference in bit-length between the bit-lengths of the significands of the set of 32-bit values and the second output bit-length.

Clause 3: The processor of Clause 1, wherein the maximal length LFSR is a first maximal length LFSR, the set of stochastic rounding operations is a first set of stochastic rounding operations, the set of outputs is a first set of outputs, the rounder is a first rounder, and the specified output bit-length is a first output bit-length, wherein the processor further includes:
a second rounder configured to perform a second set of stochastic rounding operations to stochastically round individual 32-bit values of the set of 32-bit values to result in a second set of outputs of a second output bit-length from among the plurality of potential output bit-lengths, wherein the processor is configured to select a second maximal length LFSR to utilize for the second set of stochastic rounding operations based on the bit-length of the second maximal length LFSR matching the difference in bit-length between the bit-lengths of the significands of the set of 32-bit values and the second output bit-length.

Clause 4: The processor of Clause 1, wherein the specified output bit-length comprises a bit-length of a significand of a 16-bit value, wherein the bit-length of the significand of the 16-bit values is 10 bits, the bit-lengths of the significands of the set of 32-bit values is 23 bits, and the bit-length of the selected maximal length LFSR is 13-bits.

Clause 5: An integrated circuit comprising:
a rounder configured to:
receive a first number with a significand of a first bit-length;
determine a selected second significand bit-length for the first number from a plurality of second significand bit-lengths;
select a random number generator of a plurality of random number generators based on a bit-length of the random number generator matching a difference in bit-length between the first bit-length of the significand of the first number and the selected second significand bit-length, wherein the plurality of random number generators comprises, for each of the plurality of second significand bit-lengths, a respective random number generator of a bit-length equal to a difference in bit-length between the first bit-length of the significand of the first number and the given second significand bit-length; and
perform a rounding operation to round the first number and generate a second number with the selected second significand bit-length based on a random number generated by the random number generator.

Clause 6: The integrated circuit of Clause 5, wherein the rounding operation comprises a stochastic rounding operation.

Clause 7: The integrated circuit of Clause 5, wherein each of the plurality of random number generators is configured to generate one or more pseudo-random numbers, wherein the random number generated by the random number generator comprises a pseudo-random number.

Clause 8: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number.

Clause 9: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to receive as input numbers matching a bit format of the output floating-point number.

Clause 10: The integrated circuit of Clause 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to output floating point numbers matching a bit format of the input floating-point number.

Clause 11: The integrated circuit of Clause 5, wherein the rounder is further configured to receive the first number and metadata associated with the first number via a data path, wherein the metadata identifies the first bit-length of the significand of the first number and the selected second significand bit-length.

Clause 12: The integrated circuit of Clause 5, wherein the rounder is further configured to:
receive the first number and metadata associated with the first number via a data path, wherein the metadata identifies one or more characteristics of the first number; and
identify a data stream of the first number based on the one or more characteristics of the first number, wherein the rounder is further configured to select the random number generator further based on the data stream.

Clause 13: The integrated circuit of Clause 5, wherein: the rounder is further configured to:
receive a third number with a significand of a third bit-length;
determine that the rounder is not configured to convert numbers with a significand of the third bit-length; and
output an error identifier based on determining that the rounder is not configured to convert numbers with a significand of the third bit-length.

Clause 14: The integrated circuit of Clause 5, wherein the random number generator is a first random number generator and the random number is a first random number, wherein the rounder is further configured to:
receive a third number with a significand of a third bit-length;
determine an additional selected second bit-length for the third number from the plurality of second significand bit-lengths;
select a second random number generator of the plurality of random number generators based on a bit-length of the second random number generator matching a difference in bit-length between the third bit-length of the significand of the third number and the additional selected significand second bit-length; and
perform a rounding operation to round the third number based on a second random number generated by the second random number generator.

Clause 15: The integrated circuit of Clause 5, wherein the random number generator is a first random number generator and the random number is a first random number, wherein the rounder is further configured to:
receive a third number with a significand of a third bit-length;
determine the selected second significand bit-length for the third number from the plurality of second significand bit-lengths;
select a second random number generator of the plurality of random number generators based on a bit-length of the second random number generator matching a difference in bit-length between the third bit-length of the significand of the third number and the selected significand second bit-length; and
perform a rounding operation to round the third number based on a second random number generated by the second random number generator.

Clause 16: The integrated circuit of Clause 5, wherein the random number generator is a first random number generator and the random number is a first random number, wherein the rounder is further configured to:
receive a third number with a significand of the first bit-length;
determine an additional selected second significand bit-length for the third number from the plurality of second significand bit-lengths;
select a second random number generator of the plurality of random number generators based on a bit-length of the second random number generator matching a difference in bit-length between the first bit-length of the significand of the third number and the additional selected second significand bit-length; and
perform a rounding operation to round the third number based on a second random number generated by the second random number generator.

Clause 17: The integrated circuit of Clause 5, wherein the random number is a first random number, wherein the rounder is further configured to:
receive a third number with a significand of the first bit-length;
determine the selected second significand bit-length for the third number from the plurality of second significand bit-lengths;
select the random number generator of the plurality of random number generators based on the bit-length of the random number generator matching a difference in bit-length between the first bit-length of the significand of the third number and the selected second significand bit-length; and
perform a rounding operation to round the third number based on a second random number generated by the random number generator.

Clause 18: A method, comprising:
receiving a first number with a significand of a first bit-length;
determining a data type conversion associated with the first number from a plurality of data type conversions, wherein each of the plurality of data type conversions indicates a respective first significand bit-length and a respective second significand bit-length of a number, wherein the data type conversion indicates the first bit-length of the significand of the first number and a selected second significand bit-length of the first number;

selecting a random number generator of a plurality of random number generators based on the data type conversion, wherein the plurality of random number generators comprises, for each of the plurality of data type conversions, a respective random number generator of a bit-length associated with the data type conversion, wherein a bit-length of the random number generator is equal to a difference in bit-length between the first bit-length of the significand of the first number and the selected second significand bit-length; and performing a rounding operation to round the first number based on a random number generated by the random number generator to result in a second number of the selected second significand bit-length.

Clause 19: The method of Clause 18, wherein the random number generated by the random number generator is associated with at least one of:

the selected second significand bit-length; or the difference in bit-length between the first bit-length of the significand of the first number and the selected significand second bit-length.

Clause 20: The method of Clause 18, wherein the plurality of random number generators comprises a plurality of maximal length LFSRs.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A processor, comprising:
a rounder configured to perform a set of stochastic rounding operations to stochastically round individual 32-bit values of a set of 32-bit values to result in a set of outputs with significands of a specified significand output bit-length from among a plurality of potential significand output bit-lengths, wherein individual stochastic rounding operations of the set of stochastic rounding operations rely on individual pseudo-random numbers of a set of pseudo-random numbers particular to the specified significand output bit-length, wherein the rounder further comprises:
a plurality of maximal length linear feedback shift registers (LFSRs) comprising, for each given significand output bit-length of the plurality of potential significand output bit-lengths, a maximal length LFSR of a bit length equal to a difference in bit-length between bit-lengths of significands of the set of 32-bit values and the given significand output bit-length; and
a random number generator selector configured to select a maximal length LFSR to utilize for the set of stochastic rounding operations based on the bit-length of the selected maximal length LFSR matching the difference in bit-length between the bit-lengths of the significands of the set of 32-bit values and the specified significand output bit-length.

2. The processor of claim 1, wherein the maximal length LFSR is a first maximal length LFSR, the set of stochastic rounding operations is a first set of stochastic rounding operations, the set of outputs is a first set of outputs, and the specified significand output bit-length is a first output bit-length, wherein the rounder is further configured to perform a second set of stochastic rounding operations to stochastically round individual 32-bit values of the set of 32-bit values to result in a second set of outputs of a second output bit-length from among the plurality of potential significand output bit-lengths, wherein the random number generator selector is configured to select a second maximal length LFSR to utilize for the second set of stochastic rounding operations based on the bit-length of the second maximal length LFSR matching the difference in bit-length between the bit-lengths of the significands of the set of 32-bit values and the second output bit-length.

3. The processor of claim 1, wherein the maximal length LFSR is a first maximal length LFSR, the set of stochastic rounding operations is a first set of stochastic rounding operations, the set of outputs is a first set of outputs, the rounder is a first rounder, and the specified significand output bit-length is a first output bit-length, wherein the processor further comprises:
a second rounder configured to perform a second set of stochastic rounding operations to stochastically round individual 32-bit values of the set of 32-bit values to result in a second set of outputs of a second output bit-length from among the plurality of potential significand output bit-lengths, wherein the second rounder is configured to select a second maximal length LFSR to utilize for the second set of stochastic rounding operations based on the bit-length of the second maximal length LFSR matching the difference in bit-length between the bit-lengths of the significands of the set of 32-bit values and the second output bit-length.

4. The processor of claim 1, wherein the specified significand output bit-length comprises a bit-length of a significand of a 16-bit value, wherein the bit-length of the significand of the 16-bit value is 10 bits, the bit-lengths of the significands of the set of 32-bit values are 23 bits, and the bit-length of the selected maximal length LFSR is 13-bits.

5. An integrated circuit comprising:
a rounder configured to:
receive a first number with a significand of a first bit-length;
determine a selected second significand bit-length for the first number from a plurality of second significand bit-lengths;
select a random number generator of a plurality of random number generators based on a bit-length of the random number generator matching a difference in bit-length between the first bit-length of the significand of the first number and the selected second significand bit-length, wherein the plurality of random number generators comprises, for each given second significand bit-length of the plurality of second significand bit-lengths, a respective random number generator of a bit-length equal to a difference in bit-length between the first bit-length of the significand of the first number and the given second significand bit-length; and
perform a rounding operation to round the first number and generate a second number with the selected second significand bit-length based on a random number generated by the random number generator.

6. The integrated circuit of claim 5, wherein the rounding operation comprises a stochastic rounding operation.

7. The integrated circuit of claim 5, wherein each of the plurality of random number generators is configured to generate one or more pseudo-random numbers, wherein the random number generated by the random number generator comprises a pseudo-random number.

8. The integrated circuit of claim 5, wherein:
the rounder is further configured to convert an input floating-point number to an output floating-point number by reducing a number of significand bits in the input floating-point number to result in the output floating-point number, the output floating-point number having fewer significand bits than the input floating-point number.

9. The integrated circuit of claim 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to receive as input numbers matching a bit format of the output floating-point number.

10. The integrated circuit of claim 5, wherein:
the rounder is further configured to convert an input floating-point number to an output floating-point number by reducing a number of significand bits in the input floating-point number to result in the output floating-point number, the output floating-point number having fewer significand bits than the input floating-point number,
wherein a processing element of a set of processing elements is configured to output floating point numbers matching a bit format of the input floating-point number.

11. The integrated circuit of claim 5, wherein the rounder is further configured to receive the first number and metadata associated with the first number via a data path, wherein the metadata identifies the first bit-length of the significand of the first number and the selected second significand bit-length.

12. The integrated circuit of claim 5, wherein the rounder is further configured to:
receive the first number and metadata associated with the first number via a data path, wherein the metadata identifies one or more characteristics of the first number; and
identify a data stream of the first number based on the one or more characteristics of the first number, wherein the rounder is further configured to select the random number generator further based on the data stream.

13. The integrated circuit of claim 5, wherein:
the rounder is further configured to:
receive a third number with a significand of a third bit-length;
determine that the rounder is not configured to convert numbers with a significand of the third bit-length; and
output an error identifier based on determining that the rounder is not configured to convert numbers with a significand of the third bit-length.

14. The integrated circuit of claim 5, wherein the random number generator is a first random number generator and the random number is a first random number, wherein the rounder is further configured to:
receive a third number with a significand of a third bit-length;
determine an additional selected second significand bit-length for the third number from the plurality of second significand bit-lengths;
select a second random number generator of the plurality of random number generators based on a bit-length of the second random number generator matching a difference in bit-length between the third bit-length of the significand of the third number and the additional selected second significand bit-length; and
perform a rounding operation to round the third number based on a second random number generated by the second random number generator.

15. The integrated circuit of claim 5, wherein the random number generator is a first random number generator and the random number is a first random number, wherein the rounder is further configured to:
receive a third number with a significand of a third bit-length;
determine the selected second significand bit-length for the third number from the plurality of second significand bit-lengths;
select a second random number generator of the plurality of random number generators based on a bit-length of the second random number generator matching a difference in bit-length between the third bit-length of the significand of the third number and the selected second significand bit-length; and
perform a rounding operation to round the third number based on a second random number generated by the second random number generator.

16. The integrated circuit of claim 5, wherein the random number generator is a first random number generator and the random number is a first random number, wherein the rounder is further configured to:
receive a third number with a significand of the first bit-length;
determine an additional selected second significand bit-length for the third number from the plurality of second significand bit-lengths;
select a second random number generator of the plurality of random number generators based on a bit-length of the second random number generator matching a difference in bit-length between the first bit-length of the significand of the third number and the additional selected second significand bit-length; and
perform a rounding operation to round the third number based on a second random number generated by the second random number generator.

17. The integrated circuit of claim 5, wherein the random number is a first random number, wherein the rounder is further configured to:
receive a third number with a significand of the first bit-length;
determine the selected second significand bit-length for the third number from the plurality of second significand bit-lengths;
select the random number generator of the plurality of random number generators based on the bit-length of the random number generator matching a difference in bit-length between the first bit-length of the significand of the third number and the selected second significand bit-length; and
perform a rounding operation to round the third number based on a second random number generated by the random number generator.

18. A method, comprising:
receiving a first number with a significand of a first bit-length;
determining a data type conversion associated with the first number from a plurality of data type conversions, wherein each of the plurality of data type conversions indicates a respective first significand bit-length and a respective second significand bit-length of a number, wherein the data type conversion indicates the first bit-length of the significand of the first number and a selected second significand bit-length of the first number;
selecting a random number generator of a plurality of random number generators based on the data type conversion, wherein the plurality of random number generators comprises, for each of the plurality of data type conversions, a respective random number generator of a bit-length associated with the data type conversion, wherein a bit-length of the random number generator is equal to a difference in bit-length between the first bit-length of the significand of the first number and the selected second significand bit-length; and
performing a rounding operation to round the first number based on a random number generated by the random number generator to result in a second number of the selected second significand bit-length.

19. The method of claim 18, wherein the random number generated by the random number generator is associated with at least one of:

the selected second significand bit-length; or the difference in bit-length between the first bit-length of the significand of the first number and the selected second significand bit-length.

20. The method of claim 18, wherein the plurality of random number generators comprises a plurality of maximal length LFSRs.

\* \* \* \* \*